United States Patent
Boccuzzi et al.

(10) Patent No.: US 12,452,104 B2
(45) Date of Patent: Oct. 21, 2025

(54) SHARED CELL SUPPORT FOR TELECOMMUNICATIONS

(71) Applicant: MELLANOX TECHNOLOGIES, LTD., Yokneam (IL)

(72) Inventors: Joseph Boccuzzi, Kingwood, TX (US); Dotan David Levi, Kiryat Motzkin (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 449 days.

(21) Appl. No.: 18/059,811

(22) Filed: Nov. 29, 2022

(65) Prior Publication Data
US 2024/0179029 A1 May 30, 2024

(51) Int. Cl.
  *H04L 25/02* (2006.01)
  *H04W 24/02* (2009.01)
(52) U.S. Cl.
  CPC ......... *H04L 25/0204* (2013.01); *H04W 24/02* (2013.01)
(58) Field of Classification Search
  CPC ................ H04L 25/0204; H04W 24/02
  See application file for complete search history.

(56) References Cited

U.S. PATENT DOCUMENTS

| | | | | |
|---|---|---|---|---|
| 2015/0372842 A1* | 12/2015 | Wicker, Jr. | .......... | H04L 25/0242 375/267 |
| 2023/0133992 A1* | 5/2023 | Ganju | .................... | H04B 17/23 370/252 |
| 2023/0292175 A1* | 9/2023 | Kong | .................... | H04W 28/06 |

* cited by examiner

*Primary Examiner* — Natasha W Cosme
(74) *Attorney, Agent, or Firm* — Hogan Lovells US LLP

(57) ABSTRACT

Approaches in accordance with various embodiments enable communication functionality to be added to an existing hardware component, such as a network interface controller (NIC), data processing unit (DPA), or network switch, rather than requiring an additional component such as a Front Haul Multiplexor (FHM)-type for cellular communications. Such an approach not only avoids the cost and complexity of managing additional hardware components, but can also reduce bandwidth needed for signal transmission. For downlink communications, data can be copied to the relevant radio units of a cell in a single cell deployment architecture to be transmitted to a target client device, such as a cellular handset. For uplink communications, data received from a client device to multiple radio units can undergo decompression and channel estimation before combining the data into a single signal or data stream.

20 Claims, 33 Drawing Sheets

SHARED CELL SUPPORT FOR TELECOMMUNICATIONS

BACKGROUND

In cellular communications, a typical deployment will include a number of cells each associated with a different cell identifier. A device attempting to communicate using a cellular communications signal from such a deployment will treat different cells independently. This can create problems near the boundaries or overlapping regions of cells, which are known to be at least somewhat problematic in terms of interference as the signals from one cell can interfere with the signals from another cell. In or near this boundary region, the signal power has been attenuated due to the propagation path length for multi-path communication deployment. Accordingly, the signal to interference-plus-noise ratio (SINR) is often the lowest at that cell boundary, and user equipment (UE) such as a cell phone can experience high levels of interference. This behavior is due to the fact that the UE devices only consider the signal from a single cell as the desired component, and the other cells are considered to be interference. Various UE devices include advanced signal processing techniques to attempt to combat this interference, but it remains problematic to provide both coverage and throughput in these areas, as well as to avoid reliability issues.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various illustrative embodiments enable communication functionality to be added to an existing hardware component, such as a network interface controller (NIC), data processing unit (DPU), or network switch, rather than requiring an additional component such as a Front Haul Multiplexor (FHM)-type for cellular communications such as 5G communications using a single cell deployment architecture. Such an approach not only avoids the cost and complexity of managing additional hardware components, but can also reduce bandwidth needed for signal transmission. For downlink communications, data can be copied to the relevant radio units of a cell in a single cell deployment architecture to be transmitted to a target client device, such as a cellular handset. For uplink communications, data received from a client device to multiple radio units can undergo decompression and channel estimation before combining the data into a single signal or data stream. Such an approach can improve quality by addressing changes in phase, or changes in phase and amplitude, of signals from different radio units in different physical locations.

Variations of this and other such functionality can be used as well within the scope of the various embodiments as would be apparent to one of ordinary skill in the art in light of the teachings and suggestions contained herein.

Figure 1:
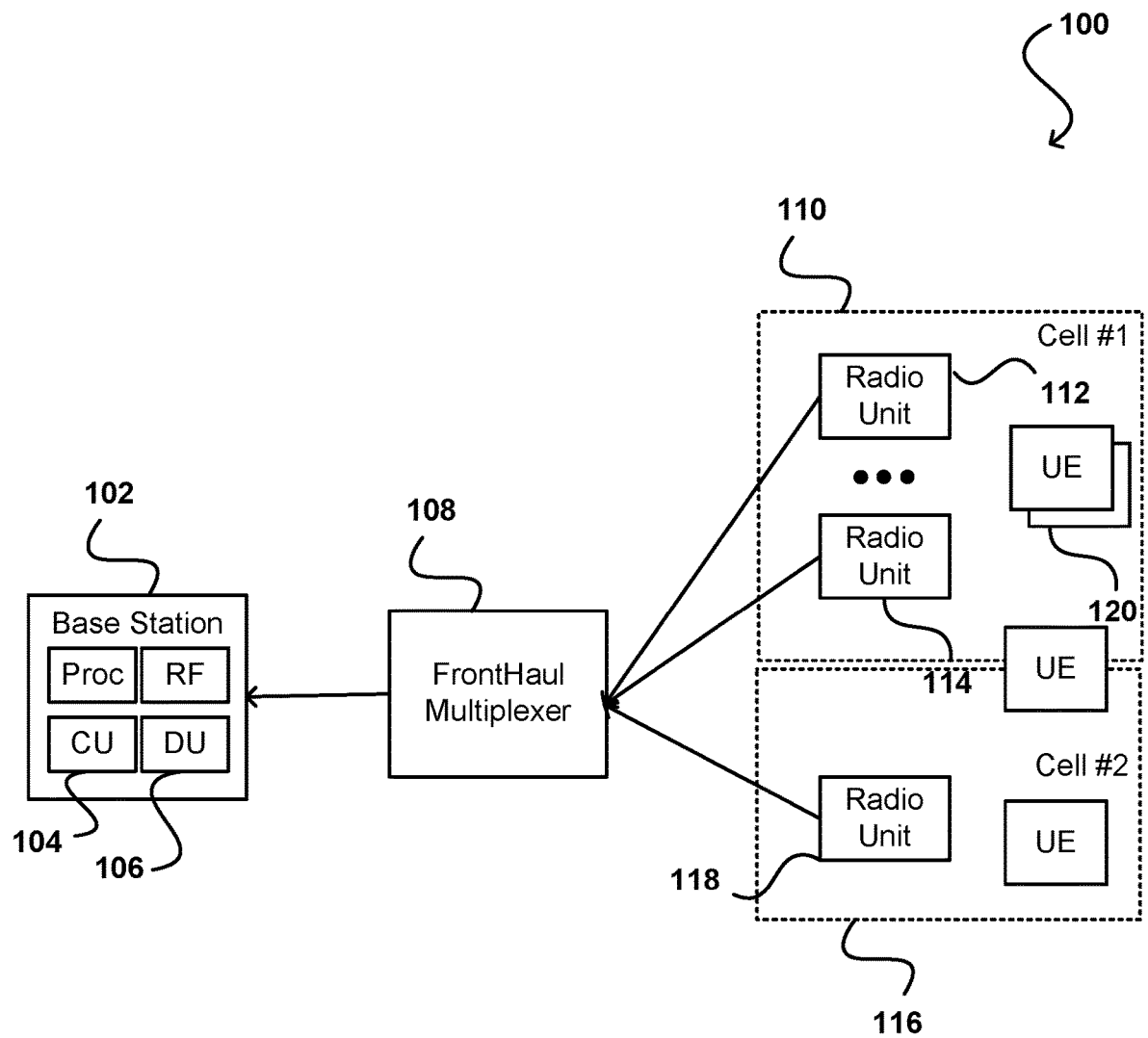
FIG. 1 illustrates an example multi-cell deployment using a fronthaul multiplexer, in accordance with various embodiments.

FIG. 1 illustrates an example deployment 100 that can be used for wireless communications in at least one embodiment. In this example, a base station 102 can send signals to be received by multiple radio units 112, 114, 118, where at least some of those radio units can be located in different communications cells 110, 116. The base station 102 can include both a centralized unit (CU) 104 and a distributed unit (DU) 106. The base station 102 can include other components as well, such as an RF front end that includes one or more transceivers, filters, or switches, as well as one or more digital signal processors (that may be part of a system on chip) with forward error correction, and one or more processors, such as CPUs, GPUs, or DPUs with hardware acceleration, among other such options. A DPU can be used to handle tasks such as networking and communication tasks, where a DPU may combine processing cores with hardware accelerator blocks and a high-performance network interface to handle data-centric workloads, ensuring that data is quickly and efficiently directed to the correct location in the correct format. The centralized unit 104 can provide support for higher layers of the protocol stack, such as for radio resource control (RRC), packet data convergence protocol (PDCP), and service data adaptation protocol (SDAP), while the distributed unit 106 can provide support for lower layers of the protocol stack, as may relate to media access control (MAC), radio link control (RLC), and a physical layer. In at least one embodiment, such as for a gNodeB base station for 5G communications, there may be a single CU for each gNodeB base station that controls multiple DUs, such as where 100 or more DUs can be controlled by a single CU of a gNodeB, and each DU can support one or more cells. While many examples presented herein will relate to 5G communications, it should be understood that various other communications protocols or standards, as may relate to (without limitation) 3G, 4G, 6G, and so on.

Such a cellular deployment can be based, at least in part, upon the concept of a single cell, where the adjacent cells do not behave or act separately, but act together as a single, unified cell. One such cell concept is often referred to as a shared cell concept. In a shared cell concept, the same signal can be sent on two or more base station antennas. If there are two neighboring cells, or three neighboring cells, and one were to envision partially overlapping spheres about those cells, the intersections that were problematic before now have the same signals coming from other base stations, so this improves the signal power if the device makes use of that information and combines them.

An approach in accordance with at least one embodiment is to treat these cells 110, 116 as part of a single cell deployment, such as is referred to as a "shared cell" deployment for an open radio access network (O-RAN), which provides a standardized interface supporting manufacturer interoperability. In such a deployment, neighboring cells 110, 116 in a downlink direction can transmit the same information to all the user equipment (UE) devices 120, with potentially modified MAC/destination addresses. The UE devices can be any appropriate devices that allow for, or support, this type of communication, as may include cell phones, smartphones, cameras, robots, drones, autonomous vehicles, desktop computers, notebook computers, set-top boxes, streaming devices, gaming consoles, tablet computers, VR headsets, AR goggles, wearable computers, or smart televisions, among other such options. This can be of benefit to the UE devices 120 in that all the signals received can be treated as valid or desired signals, and not interference. Even if there are two or three neighboring cells with radio units transmitting the data, the intersections that may previously have been problematic now have the same signals coming from other base stations or radio units. In an uplink direction, including signals received from the UE devices 120 to the radio units 112, 114, 118, the base stations (e.g., gNodeBs or "gNBs") need to combine the signals received from all the radio units since they consist of the same source of information. One example approach would be to use an additional hardware component, such as a Front Haul multiplexer (FHM) 108 as illustrated in FIG. 1, as used in existing systems, to provide such functionality.

Figure 2A:
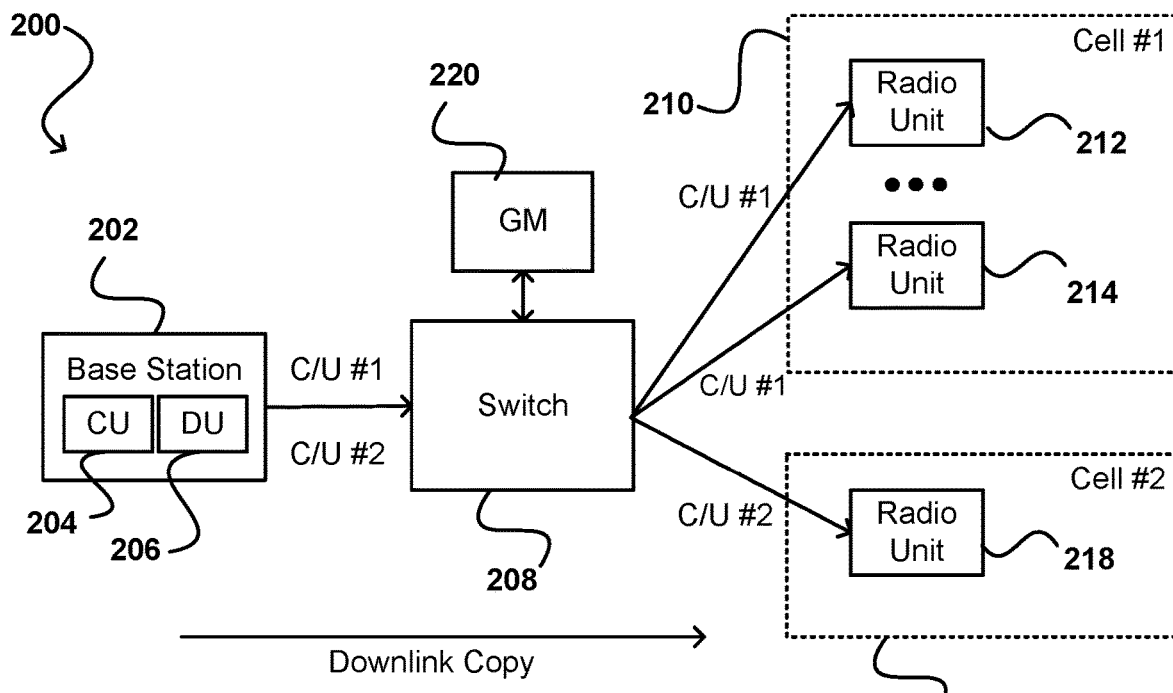
FIGS. 2A and 2B illustrate switch-based multicell deployment for both downlink and uplink, in accordance with various embodiments.
Figure 2B:
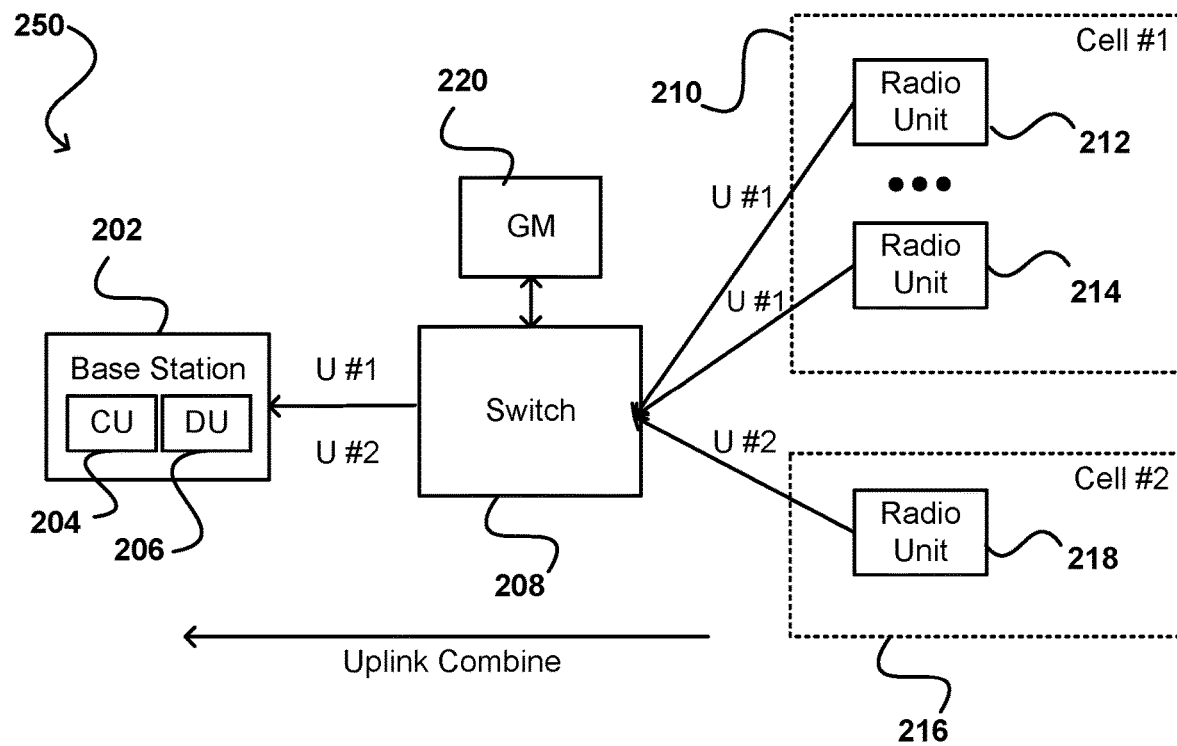
Figure 3A:
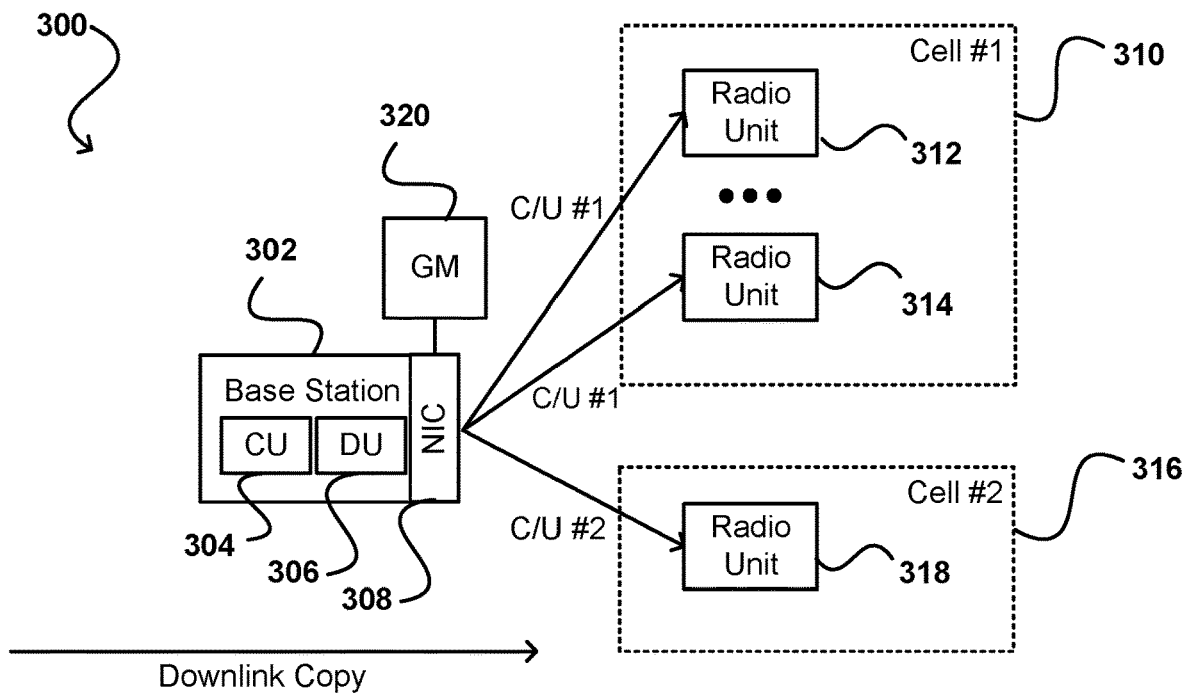
FIGS. 3A and 3B illustrate NIC-based multicell deployment for both downlink and uplink, in accordance with various embodiments.
Figure 3B:
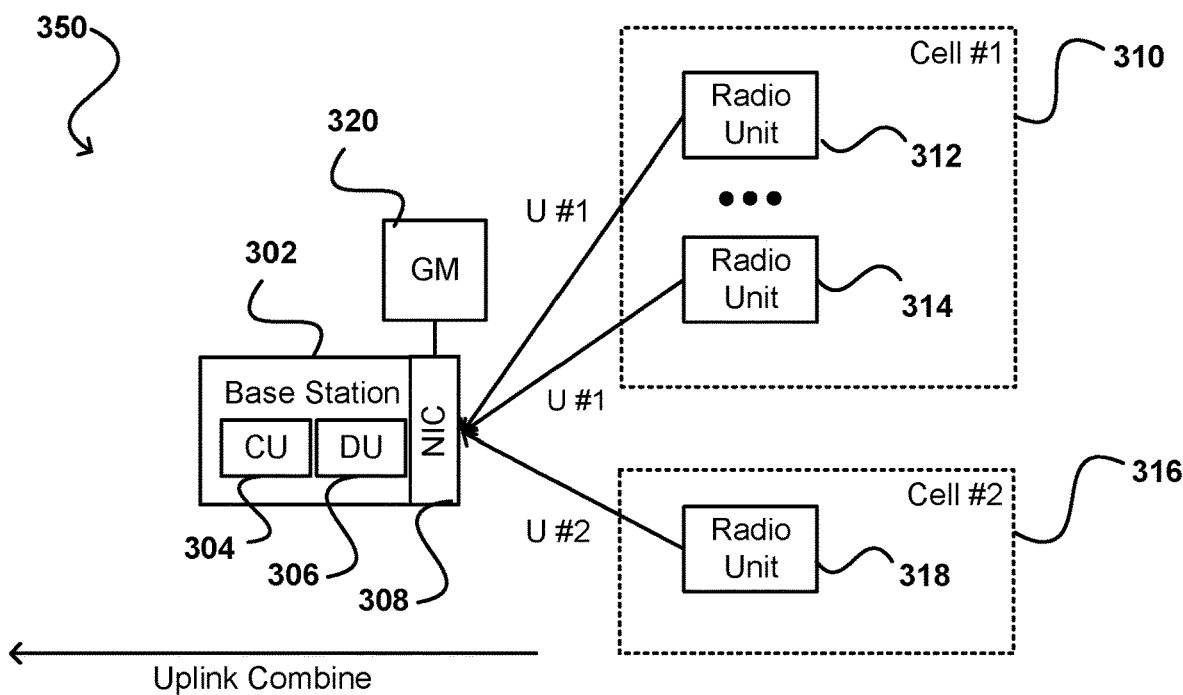

Approaches in accordance with various embodiments described herein, however, can provide such functionality through use of an existing hardware component, such as a network interface controller (NIC), data processing unit (DPU), or external network switch, such as is illustrated in FIGS. 2A and 2B, as well as FIGS. 3A and 3B. Implementing such functionality in a switch can remove the need to have additional hardware inserted into the network deployment, such that no FHM is needed if a switch is already present. Such an approach can also help to reduce the uplink bandwidth from the switch to the base station. Implementing such functionality in a NIC can provide this capability when there is no external switch in the network deployment, such as when the radio units (e.g., O-RUs) are directly connected to the base station. Such an approach can help to reduce the uplink bandwidth from the NIC to the processor (e.g., GPU).

In the downlink direction described with respect to the implementation of FIG. 1, there is a logical entity called Front Haul Multiplexor (FHM). The FHM can copy an entire message, such as an entire eCPRI message including an eCPRI header and payload, and can send this packet to all radio units (e.g., O-RUs) associated in the same cell, such as the radio units 112, 114 in cell #1 (110). A regular transmit flow can be modified to implement a multicell offload. In at least one embodiment, "smart" descriptors (e.g., WQEs) can be used in software to the hardware that the packet should be re-fetched and altered. Software performance can thus be coupled with the number of duplicated packets that needs to be transmitted. That packet can then be duplicated internally in the NIC/DPU, with packet duplications being re-written with their network address (e.g., MAC, VLAN, or eCPRI, etc.). Such an approach can imply that the performance cost for the software is zero. The transport may be unreliable, however, so the software stack should not wait for acknowledgements (e.g., "acks") from the other side (e.g., from a radio unit) and hence need not be aware of the fact that the packet is duplicated. The steering rules that include all the details on the duplications and address re-write can be performed by a software entity that is aware to the cell topology, and this can be done once for every cell configuration change (i.e., not "per packet" operation). In at least one embodiment, the hardware can recalculate all CRCs and checksums after re-writing the packets, and can guarantee authentication. In one example implementation, the data can be duplicated up to 64 times within the NIC. Using such an implementation can result in very minimal jitter, as the packets are duplicated very close (from a time perspective) to the actual transmit time on the wire, which can provide a significant advantage. In at least one embodiment, the duplication can be performed in the NIC or a data processing unit (DPU) in a transparent way, such that if this "plug in" is implemented in the NIC/DPU then the DU application does not have to be re-written to support this functionality, and in fact could be completely un-aware of the existence of this functionality.

In the uplink direction, the FHM 108 can combine the received in-phase and quadrature (I/Q) samples from the radio units (e.g., O-RUs) associated with the same cell and corresponding to the same resource element (RE) or user equipment 120 device. The FHM 108 can then create a single header (e.g., a eCPRI header) and payload to send to the base station 102.

In at least one embodiment, a multicell deployment 200, 250 can implement at least some of this functionality in a switch 208, as illustrated in FIGS. 2A and 2B. In these figures, a downlink copy process will be described with respect to FIG. 2A, while an uplink combine process will be described with respect to FIG. 2B. It should be understood that there can be different numbers and arrangements of radio units among similar or different numbers and arrangements of cells in accordance with various embodiments. In this example, a grandmaster (GM) 220 is used to provide consistent timing information across various geographical locations. Such a grandmaster can be implemented in the front haul, in the back haul, or in other appropriate locations in accordance with various embodiments. This existing switch 208 can be used to provide various downlink copy functionality. Instead of receiving all packets and doing the I/Q combination on the host memory, for example, this combination can be performed on the DPU. In such an embodiment, incoming packets can reside in DPU memory, and the DPU can be responsible for performing a vector add operation and combining multiple related packets into a single packet, which can be transmitted to the host. One advantage of such an approach is that only new packets traverse the PCIe, which can result in significant savings in the amount of PCIe bandwidth and memory bandwidth required. Further, performing the combination in the DPU in a transparent way means that if this "plug in" is implemented in the DPU, the radio unit (RU) application does not have to be re-written to support this functionality. There can be further benefits that come from the fact that this can be done in a "software based" system with commercial off-the-shelf hardware. As mentioned, such functionality can be implemented in existing hardware such as a switch or NIC, as per the network deployment.

Implementing such functionality in a switch 208, as illustrated in FIGS. 2A and 2B, removes the need to have additional hardware inserted into the network deployment, meaning no need to add an FHM when a switch is already present. The switch 208 can receive the communications (including control and user information (C/U)) from the base station 202 for downlink copy and can copy those communications to be transmitted to the relevant radio units 212, 214, 218 in the relevant cell(s) 210, 216. Downlink functionality can be performed in the switch 208 as illustrated in FIG. 2A, which is existing hardware in this network deployment. Such an approach can also reduce the uplink bandwidth needed from the switch 208 to the base station 208 (e.g., gNodeB) as illustrated in FIG. 2B. Uplink combine functionality can be performed in the switch 208, where this uplink processing can consist of tasks such as decompression, channel estimation (e.g., compensation and estimation), combination, and recompression. In various embodiments, the open radio unit (O-RU) functionality and the compensation can be performed in the NIC, switch, or DPU, while the estimation and compensation can also be performed in the NIC, switch, or DPU.

Such functionality for downlink and uplink communications can also be implemented in a hardware device such as a NIC 302, as illustrated in FIGS. 3A and 3B. Implementing this functionality in the NIC can enable this capability to be provided when there is no external switch in the network deployment, such as when the radio units 312, 314, 318 are directly connected to the base station 302. Such an approach can also reduce the uplink bandwidth requirements from the NIC 308 to the processor (e.g., GPU). Download copy functionality can thus be performed in the NIC 308 on the base station 302, as illustrated in the deployment 300 of FIG. 3A, depending at least in part upon the network deployment. Uplink combine functionality can also be performed in the NIC 308, as illustrated in the example deployment 350 of FIG. 3B. Here, the uplink processing can consist of decompression, channel estimation, combination, and then (potentially) compression. Channel estimation is used because two radio units in a cell may get incoming signals with different gain and phase offsets due, at least in part, to the differences in physical locations of those radio units and the different electrical path propagation lengths that the signals experience. Channel estimation can be used to accurately combine signals from these two radio units with different phase values, or phase and amplitude values, in a way that is efficient and reliable and that improves signal to noise ratio and throughput/coverage, etc. The phases of the different signals can be estimated, for example, then these signals can be combined in such a way that the combined signal is of higher quality than any of the individual signals that were combined. In some embodiments a final compression stage can be eliminated since the I/Q samples will only need to travel over the PCIe from the NIC to the GPU and compression is not necessary in at least some such implementations. Other interfaces (e.g., Ethernet) can be used as well, such as when the NIC functionality is located in the DPU.

Figure 4:
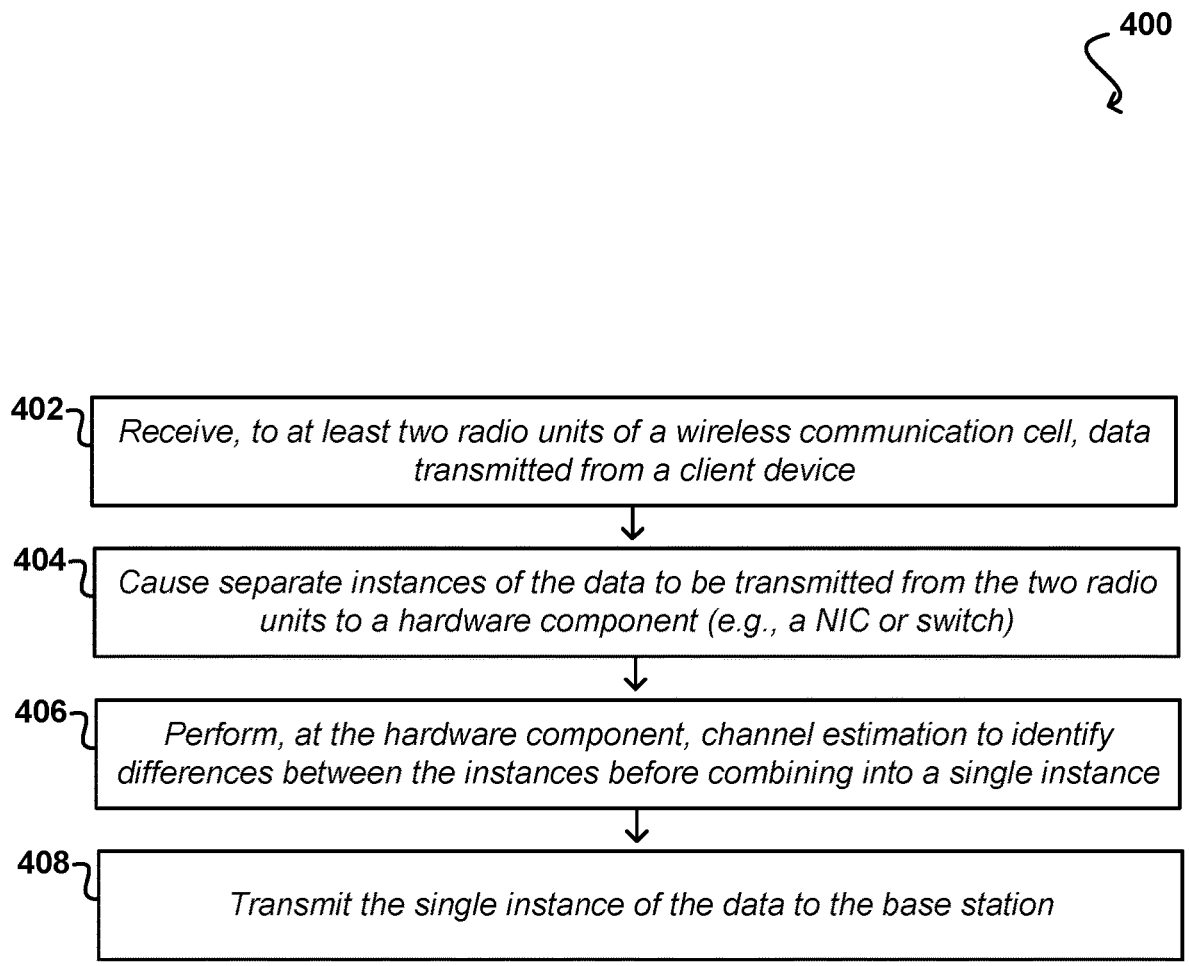
FIG. 4 illustrates an example process for performing uplink combination for a single cell deployment architecture, in accordance with various embodiments.

FIG. 4 illustrates an example process 400 for performing uplink communications in a single cell network architecture that can be performed in accordance with at least one embodiment. It should be understood that for this and other processes described herein that there may be additional, fewer, or alternative steps performed in similar or alternative orders, or at least partially in parallel, within the scope of various embodiments unless otherwise specifically stated. In this example, uplink functionality can be implemented into existing hardware rather than relying on an additional component, such as a front haul multiplexer. In this example, data transmitted from a client device is received 402 to at least two radio units of a wireless communications cell in this single cell network architecture. These separate instances can be caused 404 to be transmitted form the (at least) two radio units to a hardware component, such as a NIC or switch in different embodiments. Channel estimation can be performed 406 at the hardware component to identify differences between the instances before combining into a single instance (or single data stream). In at least some embodiments, the data is to be decompressed by the hardware component before channel estimation is performed, and may be recompressed depending, at least in part, upon the location and type of the hardware component in the given implementation. Once generated, this single instance of the data can be transmitted 408 to the base station for processing.

Figure 5:
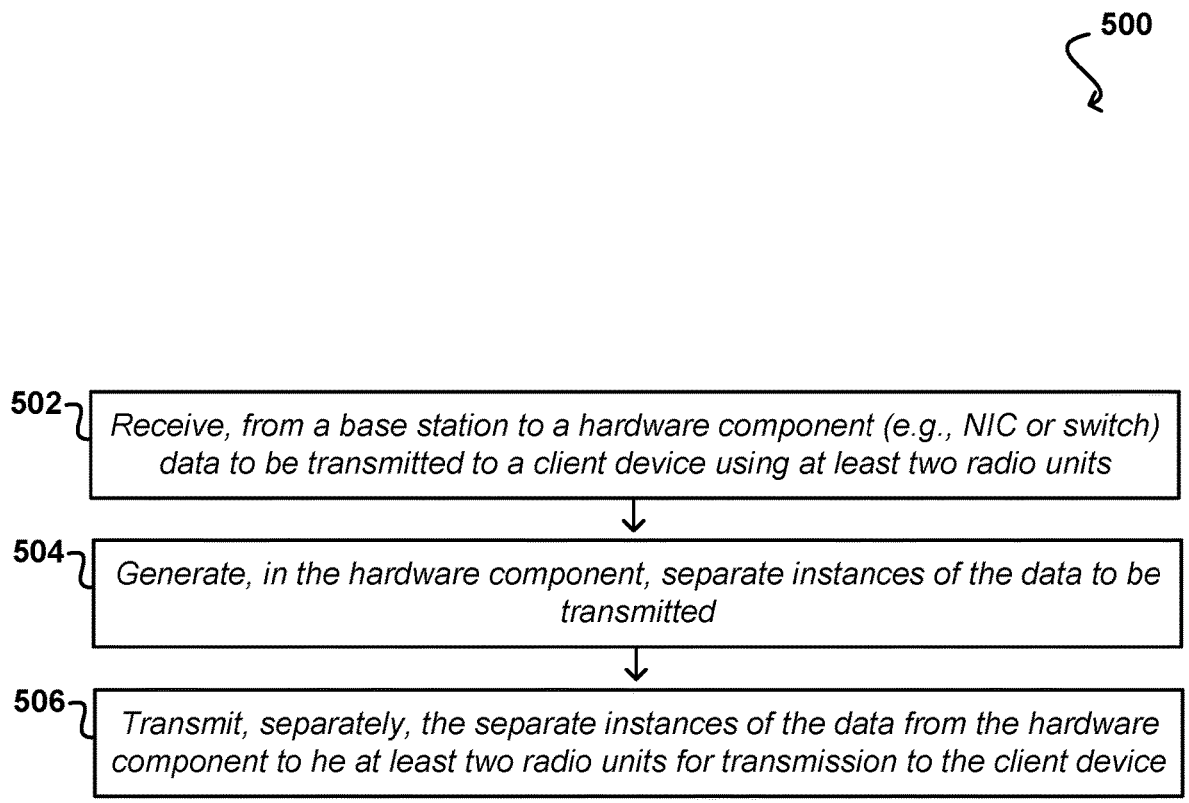
FIG. 5 illustrates an example process for performing downlink copying for a single cell deployment architecture, according to at least one embodiment.

FIG. 5 illustrates an example process 500 for performing downlink communications in a single cell network architecture that can be performed in accordance with at least one embodiment. In this example, data to be transmitted to a client device (or another recipient device) is received 502 from a base station to a hardware component, such as a NIC or switch. In this example, the data is to be transmitted to the client device using at least two radio units in this single cell architecture. Separate instances (or copies) of this data can be generated 504 in the hardware component. These separate instances can then be separately transmitted 506 from the hardware component to the at least two radio units for transmission to the client device. The client device can then receive the data from one or more of these radio units, depending at least in part upon a current location of the client device, where the received data should be substantially free of interference due to the mechanism used for transmission.

A hardware component as discussed herein can provide for additional functionality as well. For example, a hardware device can support a general high speed networking scheme through use of descriptors, or expanded descriptors. In at least one embodiment, a set of "send side" components can support both an application layer and an infrastructure layer. The application layer may include host memory, registered to a network device, that can be used to provide both a work queue and a send queue. The work queue can include various work queue entries (WQEs), which can each correspond to a descriptor that contains (or identifies) a job and its detail (e.g., a send packet), along with a pointer to the data. The data can be stored as a set of packets in the send queue. The infrastructure layer can include a hardware component such as a NIC or DPU, which can maintain queue context. Queue context in at least one embodiment refers to information that is associated with the queue, or a group of queues, or with a specific virtual function, and contains information that is related to all the jobs in that domain. This can be primarily configured by the infrastructure layer. This data from the hardware component of the send side can be transmitted to be received by a corresponding hardware component (e.g., NIC or DPU) of the receive side, which can also store relevant queue context. The data can be received to host memory, registered to a network device of the receive side. The work queue on the receive side can contain the job (e.g., packet send/receive) description for the hardware. A send/receive queue can store the actual data that is to be sent or received that is read or written by the hardware and written or read by the corresponding application.

In at least one embodiment, after initiation the hardware can read the job descriptor from the work queue. The hardware can then parse the data for the job and attempt to understand one or more tasks that are to be performed for the job, such as a location from which to fetch data and what to then do with the data. Some information may be correlated with a work queue entry and may appear as information in the work queue entry, while some information may instead be correlated with the queue, and may appear as queue context within the hardware (e.g., the NIC/DPU). The hardware can then fetch the data and perform the data manipulation that is associated in the work queue entry and/or queue context. The data can then be transmitted through the network and can arrive to the receive-side hardware (e.g., NIC or DPU). The receive side hardware can parse the data and correlate it with the proper queue. The hardware can then fetch the next in line work queue entry from the associated queue. The receive-side hardware can then handle the packet according to the information in the work queue entry and queue context, and can write the data to host memory.

As discussed, aspects of various approaches presented herein, or that utilize data or communications as transmitted herein, can be lightweight enough to execute on a device such as a client device, such as a personal computer or gaming console, in real time. Such processing can be performed on content (e.g., a rendered version of a unique asset) that is generated on, or received by, that client device or received from an external source, such as streaming data or other content received over at least one network. In some instances, the processing and/or determination of this content may be performed by one of these other devices, systems, or entities, then provided to the client device (or another such recipient) for presentation or another such use.

Figure 6:
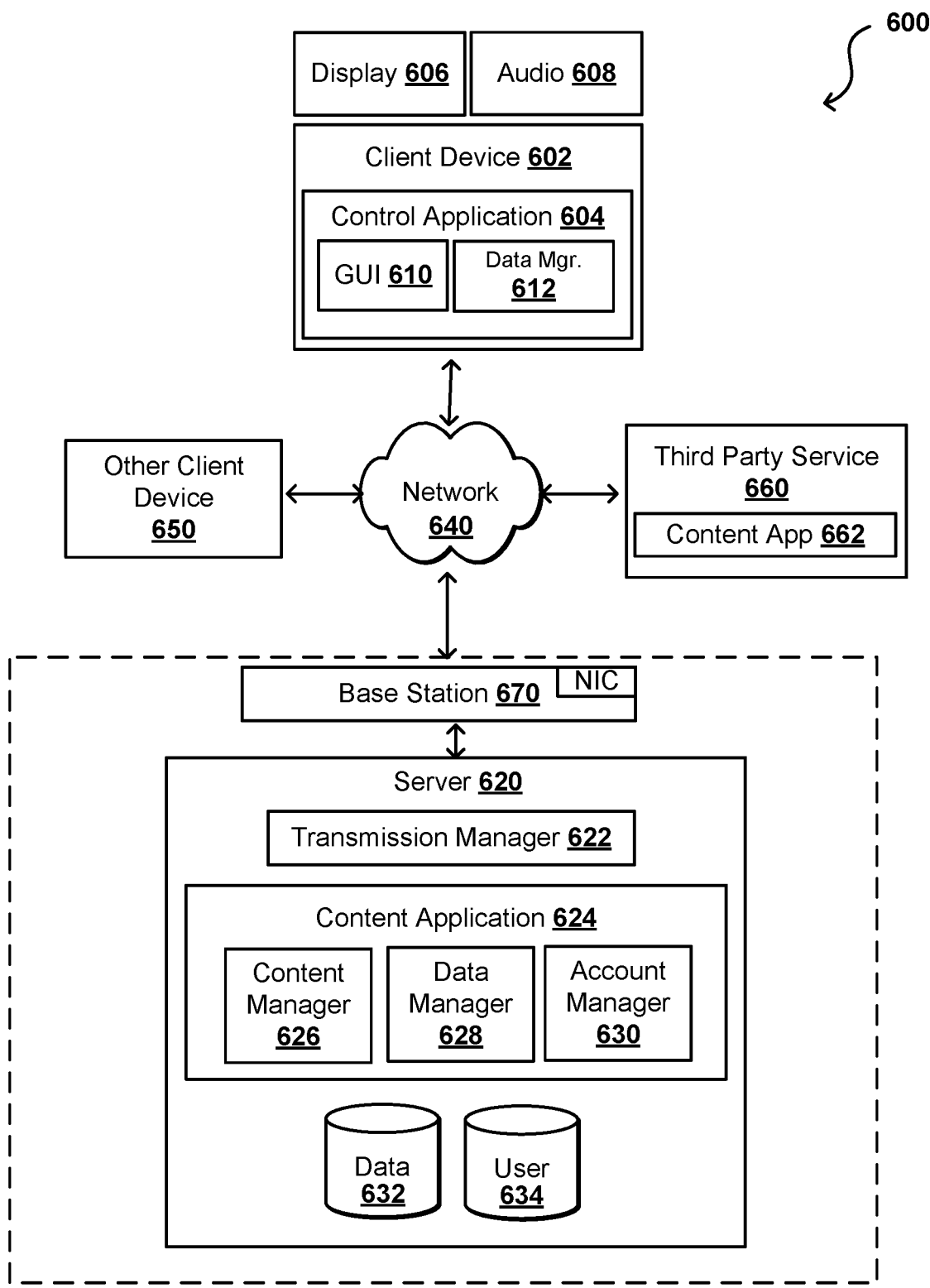
FIG. 6 illustrates an example network-based system in which aspects of at least one embodiment can be implemented.

As an example, FIG. 6 illustrates an example network configuration 600 that can be used to provide, generate, modify, encode, process, and/or transmit data or other such content. In this example, data can be encrypted for at least storage or transmission. In at least one embodiment, a client device 602 can generate or receive data for a session using components of a content application 604 on client device 602 and data stored locally on that client device. In at least one embodiment, a content application 624 executing on a server 620 (e.g., a cloud server or edge server) may initiate a session associated with at least client device 602, as may utilize a session manager and user data stored in a user database 634, and can cause data in a database 632 to be determined by a content manager 626. A content manager 626 may work with a data manager 628 to obtain or process (e.g., decrypt) data that is to be provided for presentation, or used in a process to generate content for presentation, via the client device 602. In at least one embodiment, this data manager 628 can work with an account manager 630 to ensure that the client device, or a user associated with the client device, has permission to access or receive the content. At least a portion of the data or content may be transmitted to the client device 602 using an appropriate transmission manager 622 to send by download, streaming, or another such transmission channel. An encoder may be used to encode and/or compress at least some of this data before transmitting to the client device 602. For wireless communications, such as over a cellular network, the communication may be sent to a base station 670 for transmission to the client device 602 via one or more radio units, which may be at different physical locations within a single cell communication deployment. Functionality for supporting the single cell deployment architecture can be added to existing hardware, such as a NIC installed in the base station 670 or another such hardware component as discussed and suggested herein.

In at least one embodiment, the client device 602 receiving such content can provide this content to a corresponding content application 604, which may also or alternatively include a graphical user interface 610 and data manager 612, for use in providing content for presentation via the client device 602. A decoder may also be used to decode data received over the network(s) 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 634, to client device 602. In at least one embodiment, at least a portion of this content can be obtained or streamed from another source, such as a third party service 660 or other client device 650, that may also include a content application 662 for generating or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Data Center

Figure 7:
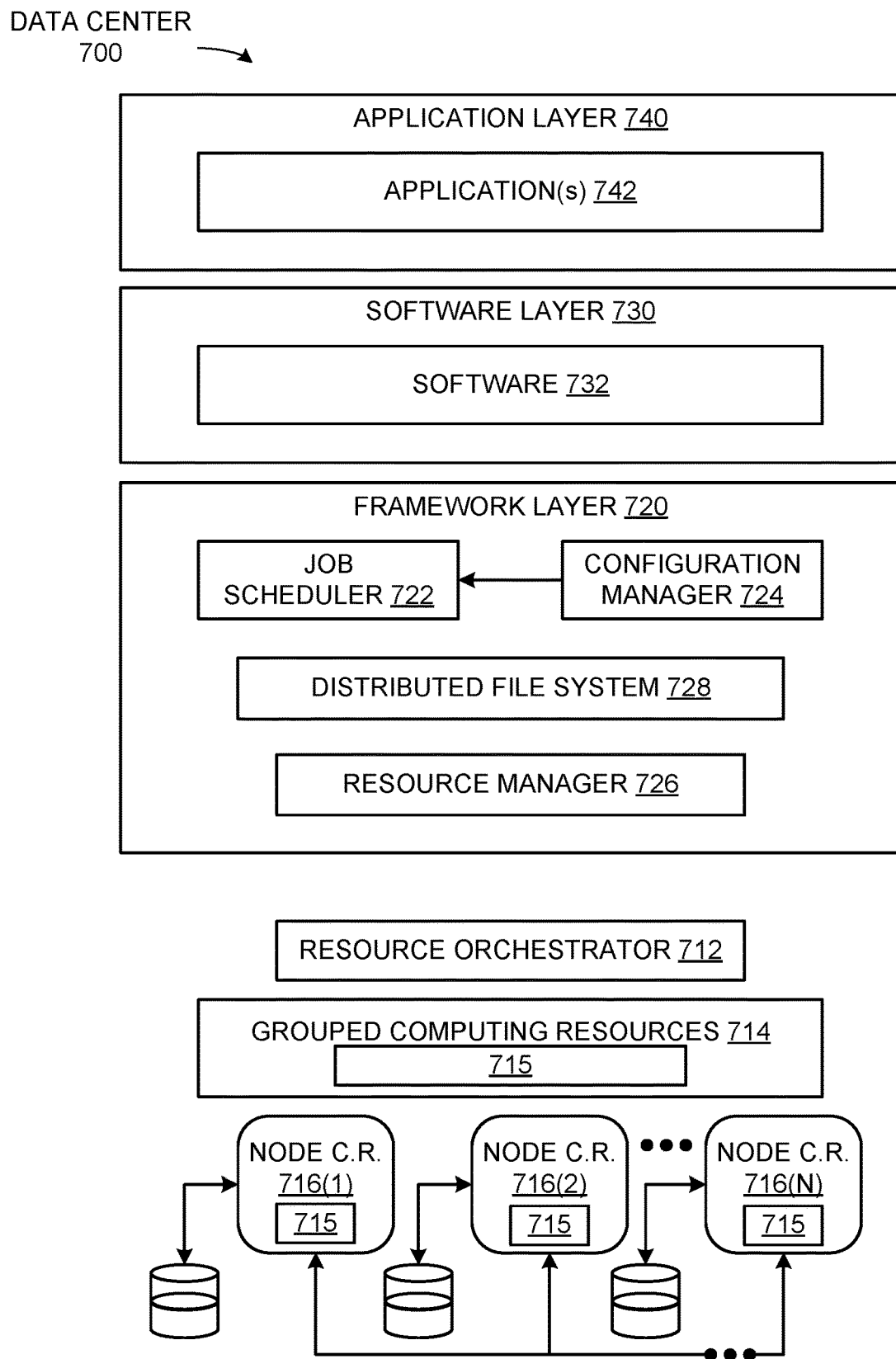
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730 and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents a positive integer (which may be a different integer "N" than used in other figures). In at least one embodiment, node C.R.s 716(1)-716(N) may include, but are not limited to, any number of central processing units ("CPUs") or other processors (including accelerators, field programmable gate arrays (FPGAs), graphics processors, etc.), memory storage devices 718(1)-718(N) (e.g., dynamic read-only memory, solid state storage or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). In at least one embodiment, separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, a resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resources 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. In at least one embodiment, one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. In at least one embodiment, one or more types of applications may include, but are not limited to, any number of a genomics application, a cognitive compute, application and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. In at least one embodiment, inference and/or training logic 715 may be used in system FIG. 7 for inferencing or predicting operations based, at least in part, on weight parameters calculated using neural network training operations, neural network functions and/or architectures, or neural network use cases described herein. Embodiments presented herein can allow for single cell architecture functionality to be added to existing hardware devices in a communications network deployment.

Computer Systems

Figure 8:
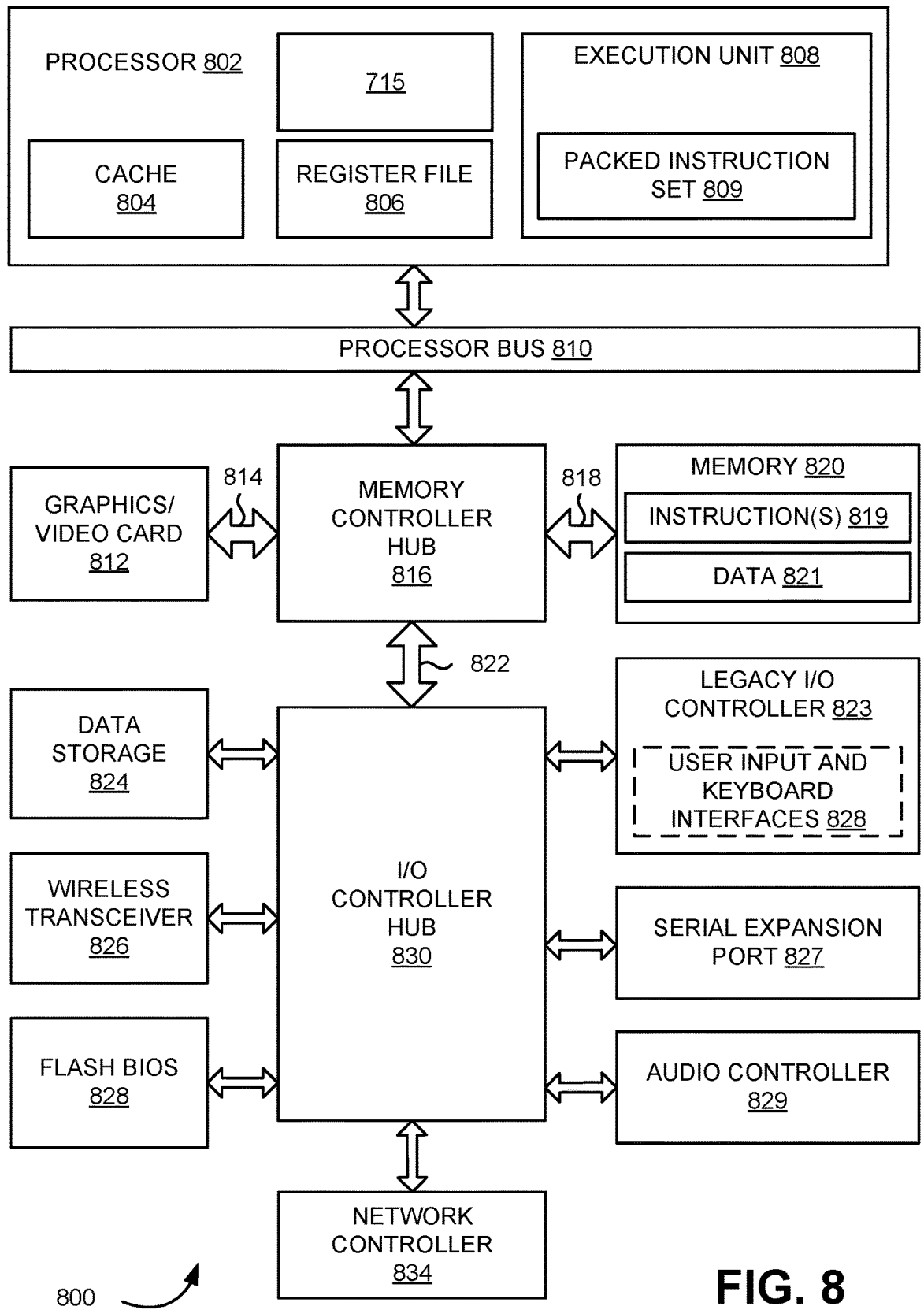
FIG. 8 is a block diagram illustrating a computer system, according to at least one embodiment.

FIG. 8 is a block diagram illustrating an exemplary computer system, which may be a system with interconnected devices and components, a system-on-a-chip (SOC) or some combination thereof formed with a processor that may include execution units to execute an instruction, according to at least one embodiment. In at least one embodiment, a computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™ Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS operating system available from Microsoft Corporation of Redmond, Wash., although other operating systems (UNIX and Linux, for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment, computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, a register file 806 may store different types of data in various registers including, without limitation, integer registers, floating point registers, status registers, and an instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor, along with associated circuitry to execute instructions, operations used by many multimedia applications may be performed using packed data in processor 802. In at least one embodiment, many multimedia applications may be accelerated and executed more efficiently by using a full width of a processor's data bus for performing operations on packed data, which may eliminate a need to transfer smaller units of data across that processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be a Dynamic Random Access Memory ("DRAM") device, a Static Random Access Memory ("SRAM") device, a flash memory device, or another memory device. In at least one embodiment, memory 820 may store instruction(s) 819 and/or data 821 represented by data signals that may be executed by processor 802.

In at least one embodiment, a system logic chip may be coupled to processor bus 810 and memory 820. In at least one embodiment, a system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O interface 822. In at least one embodiment, a system logic chip may provide a graphics port for coupling to a graphics controller. In at least one embodiment, MCH 816 may be coupled to memory 820 through high bandwidth memory path 818 and a graphics/video card 812 may be coupled to MCH 816 through an Accelerated Graphics Port ("AGP") interconnect 814.

In at least one embodiment, computer system 800 may use system I/O interface 822 as a proprietary hub interface bus to couple MCH 816 to an I/O controller hub ("ICH") 830. In at least one embodiment, ICH 830 may provide direct connections to some I/O devices via a local I/O bus. In at least one embodiment, a local I/O bus may include, without limitation, a high-speed I/O bus for connecting peripherals to memory 820, a chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as a Universal Serial Bus ("USB") port, and a network controller 834. In at least one embodiment, data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary SoC. In at least one embodiment, devices illustrated in FIG. 8 may be interconnected with proprietary interconnects, standardized interconnects (e.g., PCIe) or some combination thereof. In at least one embodiment, one or more components of computer system 800 are interconnected using compute express link (CXL) interconnects.

Inference and/or training logic 715 are used to perform inferencing and/or training operations associated with one or more embodiments. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Embodiments presented herein can allow for single cell architecture functionality to be added to existing hardware devices in a communications network deployment.

Figure 9:
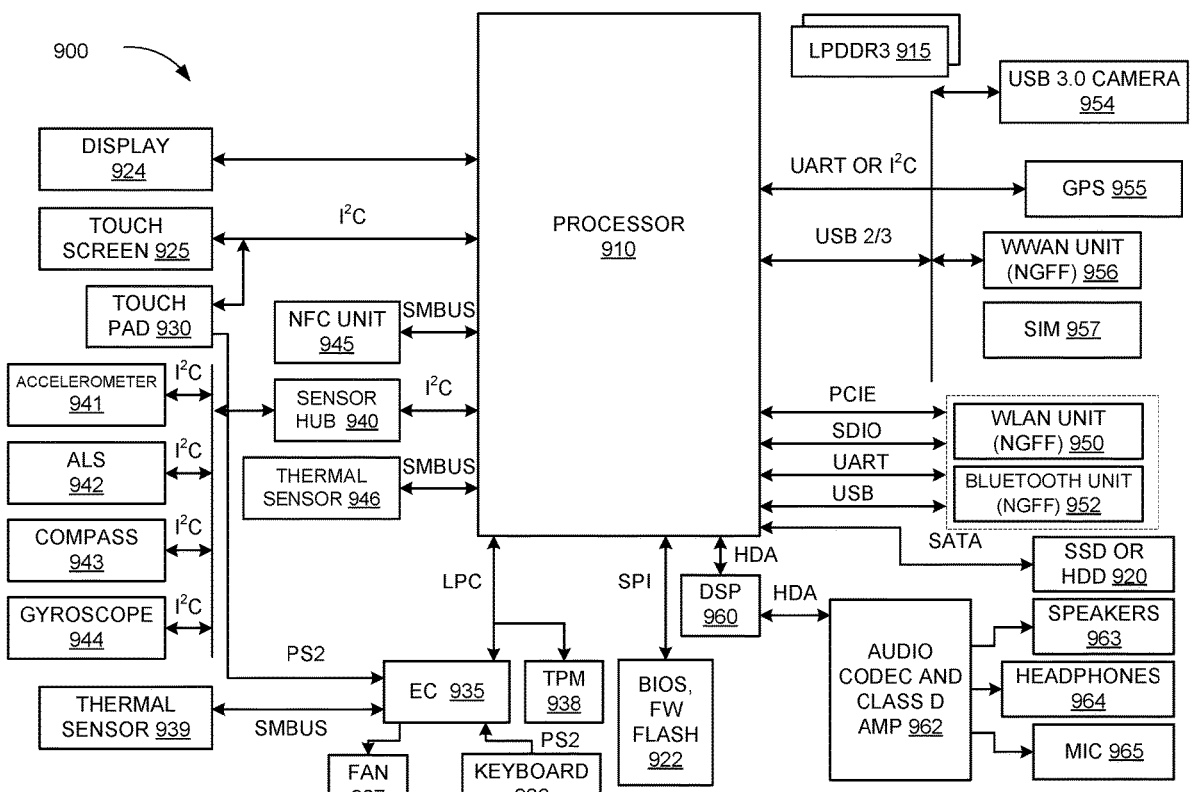
FIG. 9 is a block diagram illustrating a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 900 may include, without limitation, processor 910 communicatively coupled to any suitable number or kind of components, peripherals, modules, or devices. In at least one embodiment, processor 910 is coupled using a bus or interface, such as a I$^2$C bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3, etc.), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary SoC. In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) unit 955, a camera ("USB 3.0 camera") 954 such as a USB 3.0 camera, and/or a Low Power Double Data Rate ("LPDDR") memory unit ("LPDDR3") 915 implemented in, for example, an LPDDR3 standard. These components may each be implemented in any suitable manner.

In at least one embodiment, other components may be communicatively coupled to processor 910 through components described herein. In at least one embodiment, an accelerometer 941, an ambient light sensor ("ALS") 942, a compass 943, and a gyroscope 944 may be communicatively coupled to sensor hub 940. In at least one embodiment, a thermal sensor 939, a fan 937, a keyboard 936, and touch pad 930 may be communicatively coupled to EC 935. In at least one embodiment, speakers 963, headphones 964, and a microphone ("mic") 965 may be communicatively coupled to an audio unit ("audio codec and class D amp") 962, which may in turn be communicatively coupled to DSP 960. In at least one embodiment, audio unit 962 may include, for example and without limitation, an audio coder/decoder ("codec") and a class D amplifier. In at least one embodiment, a SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Inference and/or training logic 715 are used to perform inferencing and/or training operations associated with one or more embodiments. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein. Embodiments presented herein can allow for single cell architecture functionality to be added to existing hardware devices in a communications network deployment.

Figure 10:
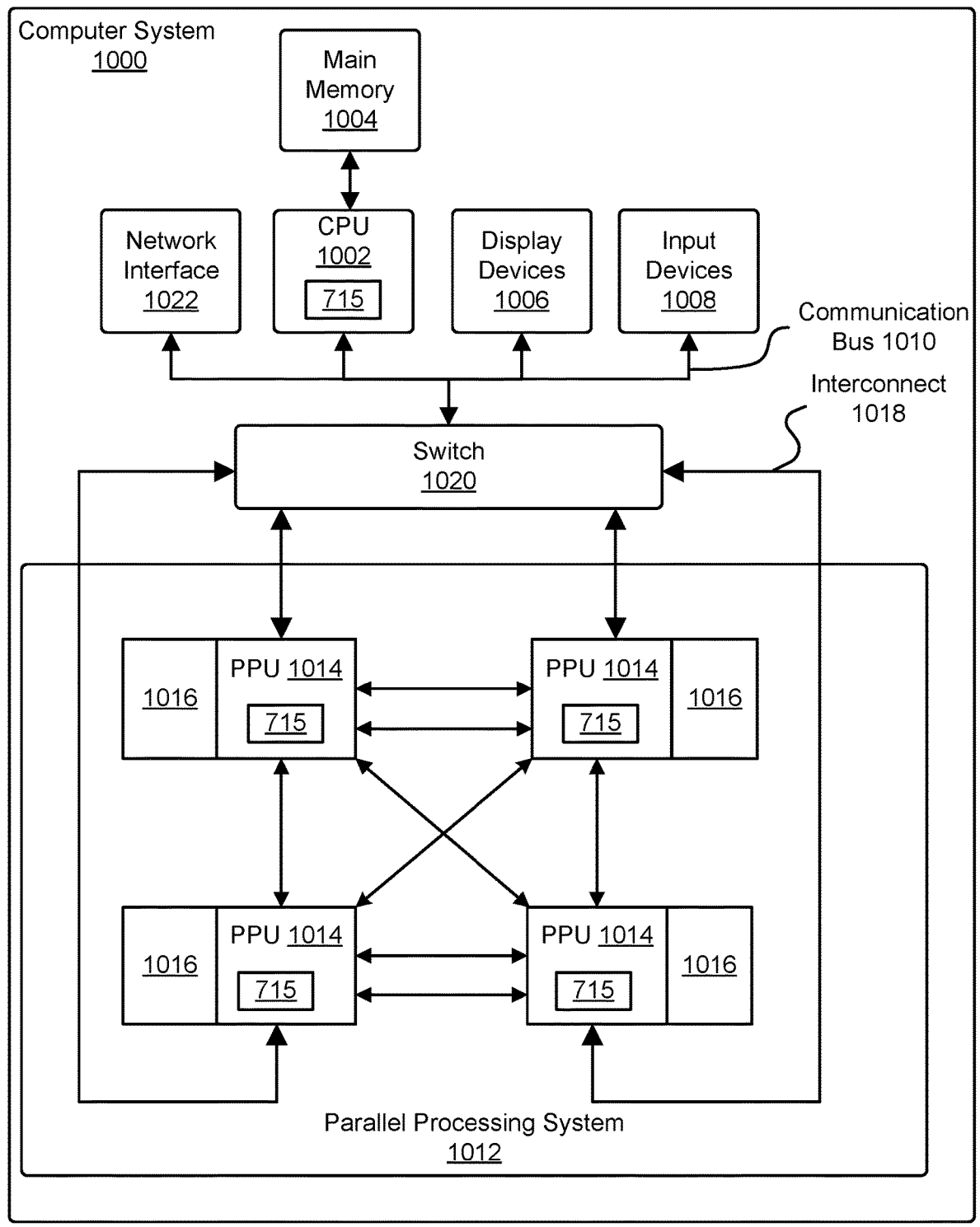
FIG. 10 illustrates a computer system, according to at least one embodiment.

FIG. 10 illustrates a computer system 1000, according to at least one embodiment. In at least one embodiment, computer system 1000 is configured to implement various processes and methods described throughout this disclosure.

In at least one embodiment, computer system 1000 comprises, without limitation, at least one central processing unit ("CPU") 1002 that is connected to a communication bus 1010 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1000 includes, without limitation, a main memory 1004 and control logic (e.g., implemented as hardware, software, or a combination thereof) and data are stored in main memory 1004, which may take form of random access memory ("RAM"). In at least one embodiment, a network interface subsystem ("network interface") 1022 provides an interface to other computing devices and networks for receiving data from and transmitting data to other systems with computer system 1000.

In at least one embodiment, computer system 1000, in at least one embodiment, includes, without limitation, input devices 1008, a parallel processing system 1012, and display devices 1006 that can be implemented using a conventional cathode ray tube ("CRT"), a liquid crystal display ("LCD"), a light emitting diode ("LED") display, a plasma display, or other suitable display technologies. In at least one embodiment, user input is received from input devices 1008 such as keyboard, mouse, touchpad, microphone, etc. In at least one embodiment, each module described herein can be situated on a single semiconductor platform to form a processing system.

Inference and/or training logic 715 are used to perform inferencing and/or training operations associated with one or more embodiments. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein. Embodiments presented herein can allow for single cell architecture functionality to be added to existing hardware devices in a communications network deployment.

Figure 11:
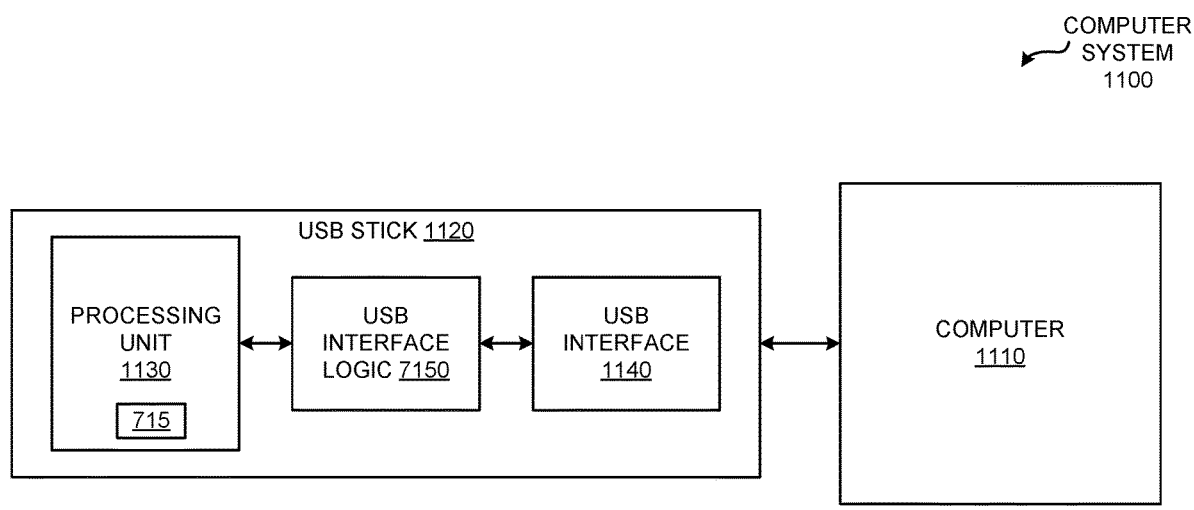
FIG. 11 illustrates a computer system, according to at least one embodiment.

FIG. 11 illustrates a computer system 1100, according to at least one embodiment. In at least one embodiment, computer system 1100 includes, without limitation, a computer 1110 and a USB stick 1120. In at least one embodiment, computer 1110 may include, without limitation, any number and type of processor(s) (not shown) and a memory (not shown). In at least one embodiment, computer 1110 includes, without limitation, a server, a cloud instance, a laptop, and a desktop computer.

In at least one embodiment, USB stick 1120 includes, without limitation, a processing unit 1130, a USB interface 1140, and USB interface logic 7150. In at least one embodiment, processing unit 1130 may be any instruction execution system, apparatus, or device capable of executing instructions. In at least one embodiment, processing unit 1130 may include, without limitation, any number and type of processing cores (not shown). In at least one embodiment, processing unit 1130 comprises an application specific integrated circuit ("ASIC") that is optimized to perform any amount and type of operations associated with machine learning. For instance, in at least one embodiment, processing unit 1130 is a tensor processing unit ("TPC") that is optimized to perform machine learning inference operations. In at least one embodiment, processing unit 1130 is a vision processing unit ("VPU") that is optimized to perform machine vision and machine learning inference operations.

In at least one embodiment, USB interface 1140 may be any type of USB connector or USB socket. For instance, in at least one embodiment, USB interface 1140 is a USB 3.0 Type-C socket for data and power. In at least one embodiment, USB interface 1140 is a USB 3.0 Type-A connector. In at least one embodiment, USB interface logic 7150 may include any amount and type of logic that enables processing unit 1130 to interface with devices (e.g., computer 1110) via USB connector 1140.

Inference and/or training logic 715 are used to perform inferencing and/or training operations associated with one or more embodiments. In at least one embodiment, inference and/or training logic 715 may be used in system FIG. 11 for inferencing or predicting operations based, at least in part, on weight parameters calculated using neural network training operations, neural network functions and/or architectures, or neural network use cases described herein. Embodiments presented herein can allow for single cell architecture functionality to be added to existing hardware devices in a communications network deployment.

Figure 12:
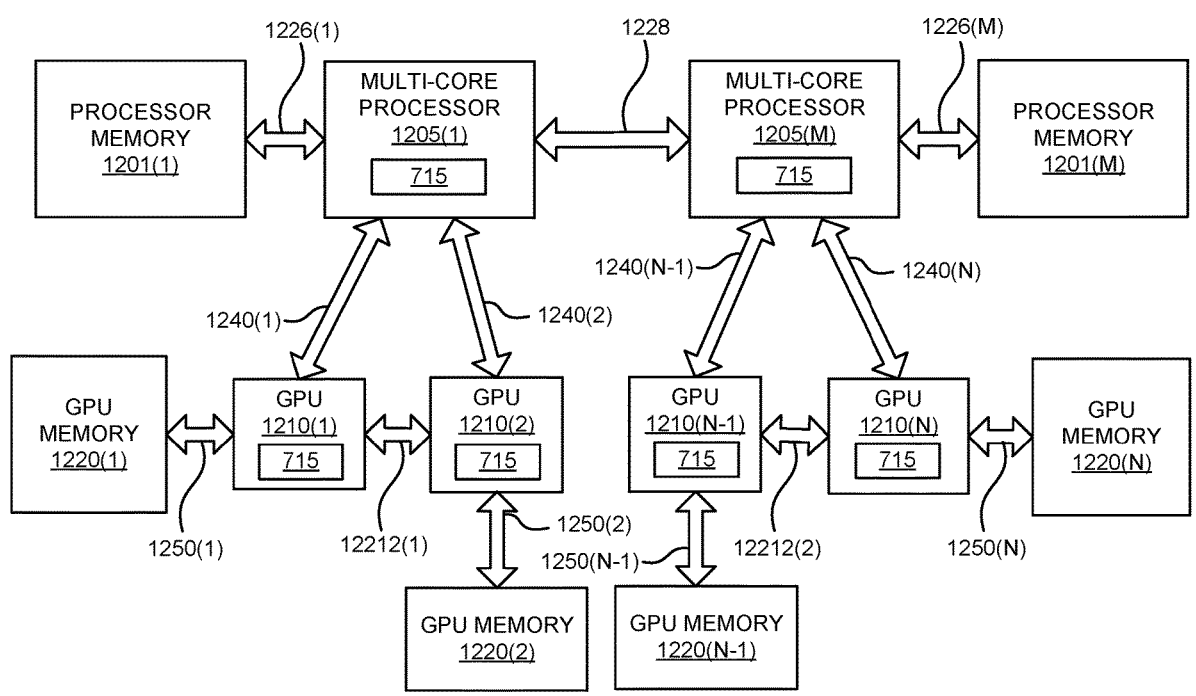
FIG. 12A illustrates a computer system, according to at least one embodiment.
FIG. 12B illustrates a computer system, according to at least one embodiment.
FIG. 12C illustrates a computer system, according to at least one embodiment.
FIG. 12D illustrates a computer system, according to at least one embodiment.
FIGS. 12E and 12F illustrate a shared programming model, according to at least one embodiment.
Figure 12:
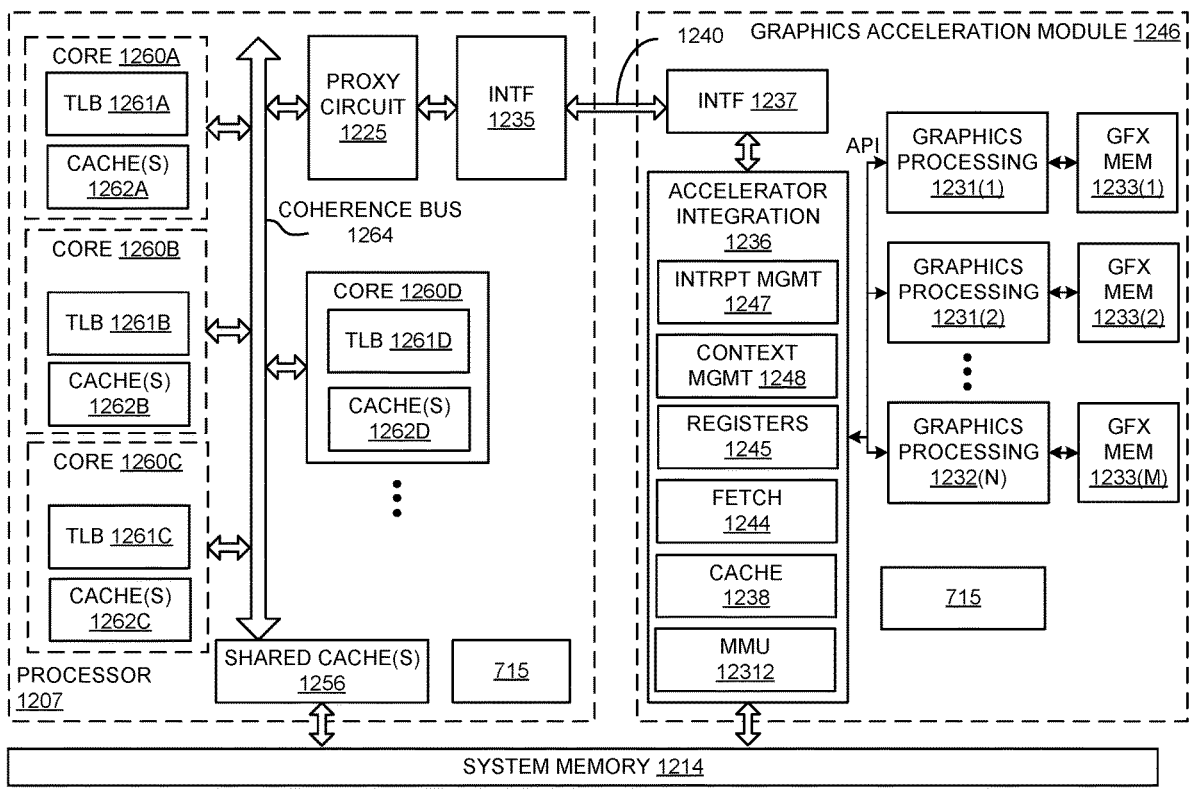
Figure 12:
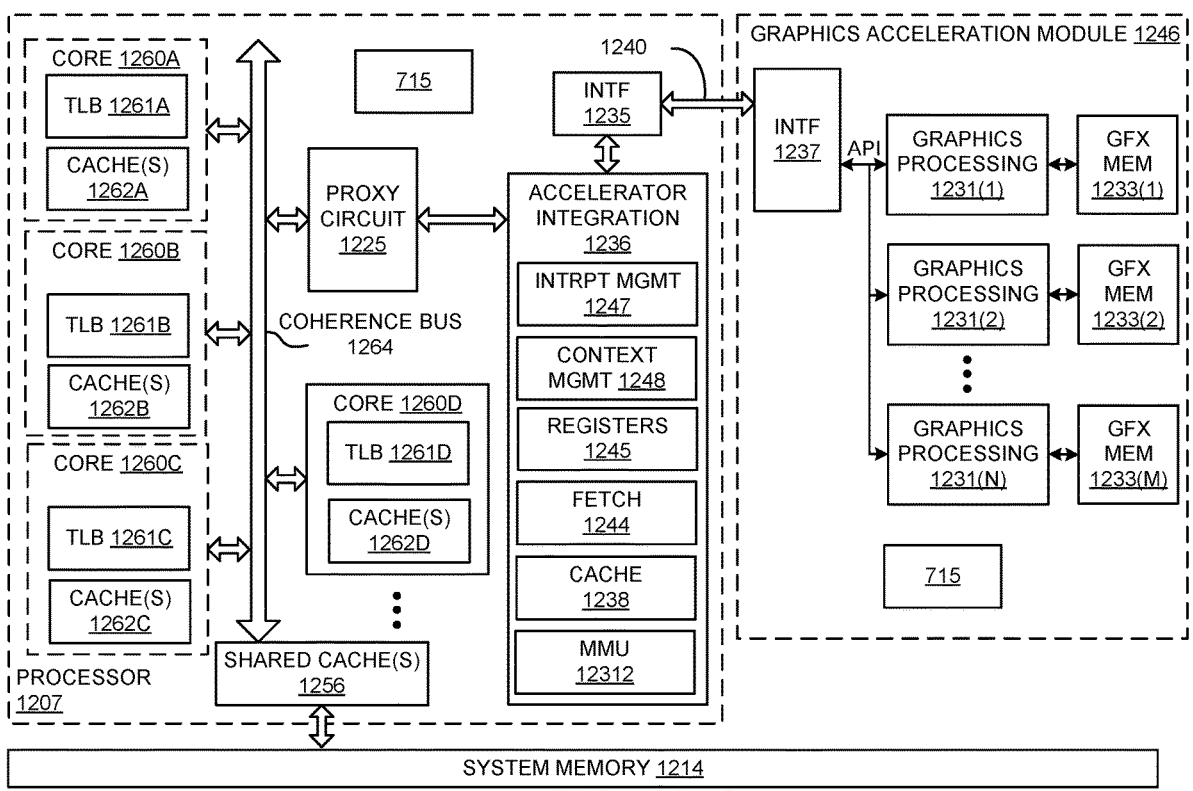
Figure 12:
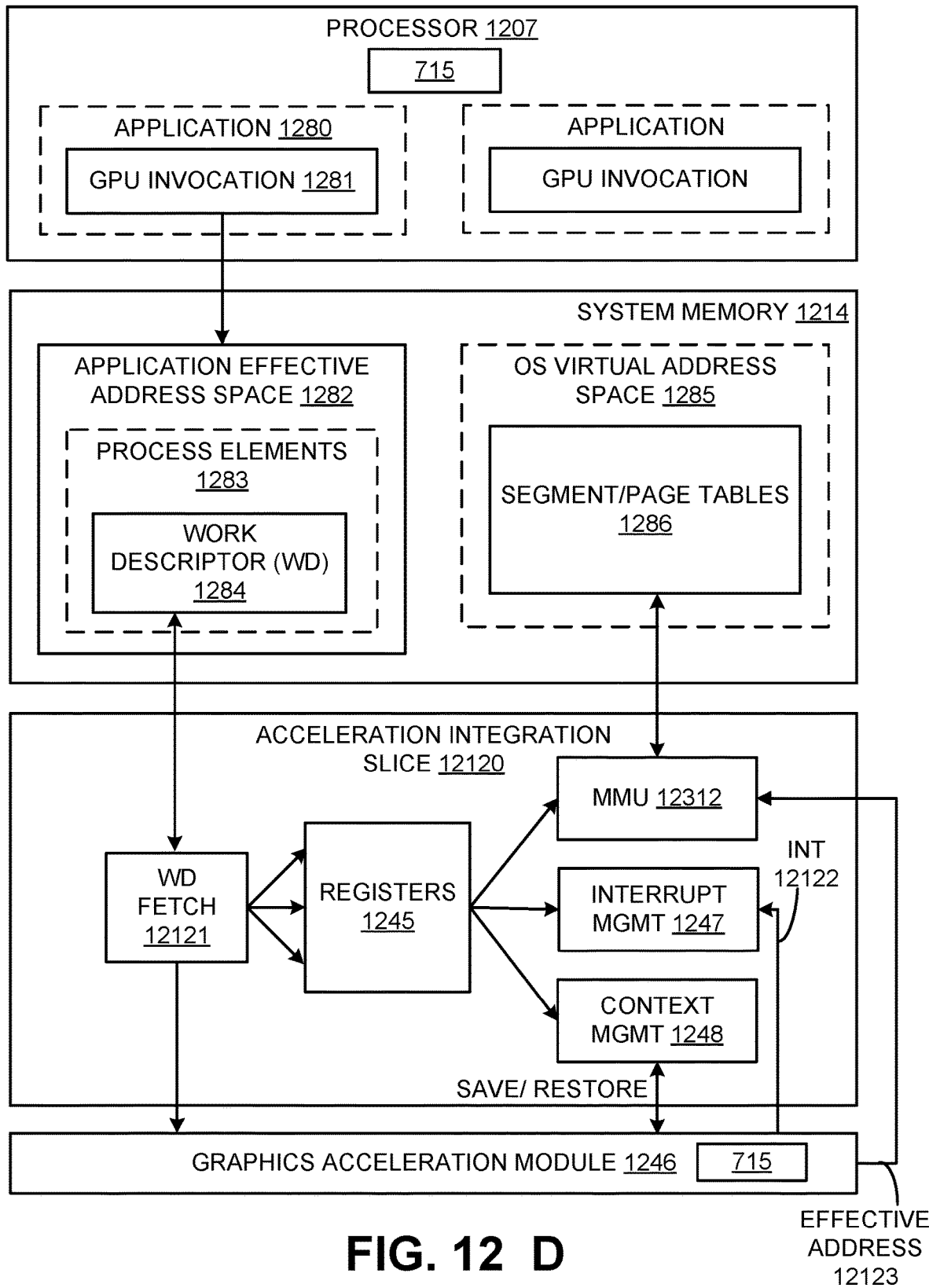
Figure 12:
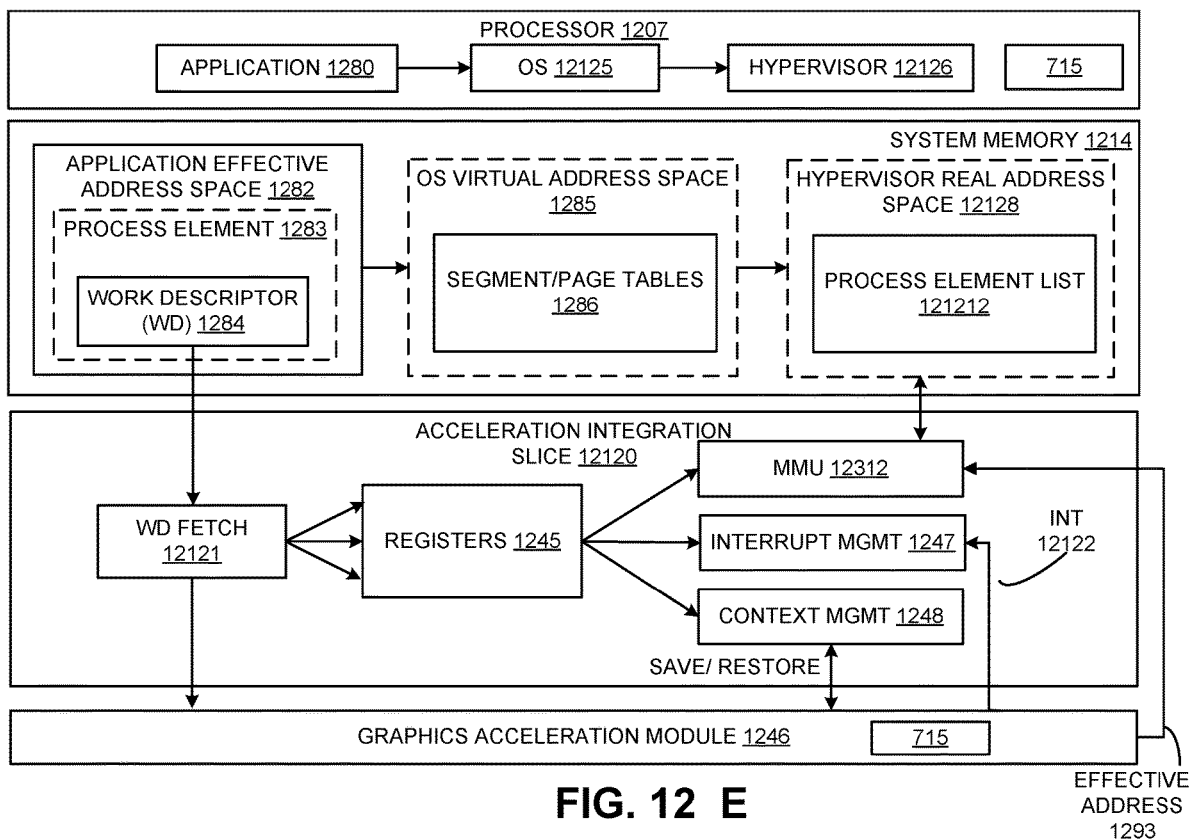
Figure 12:
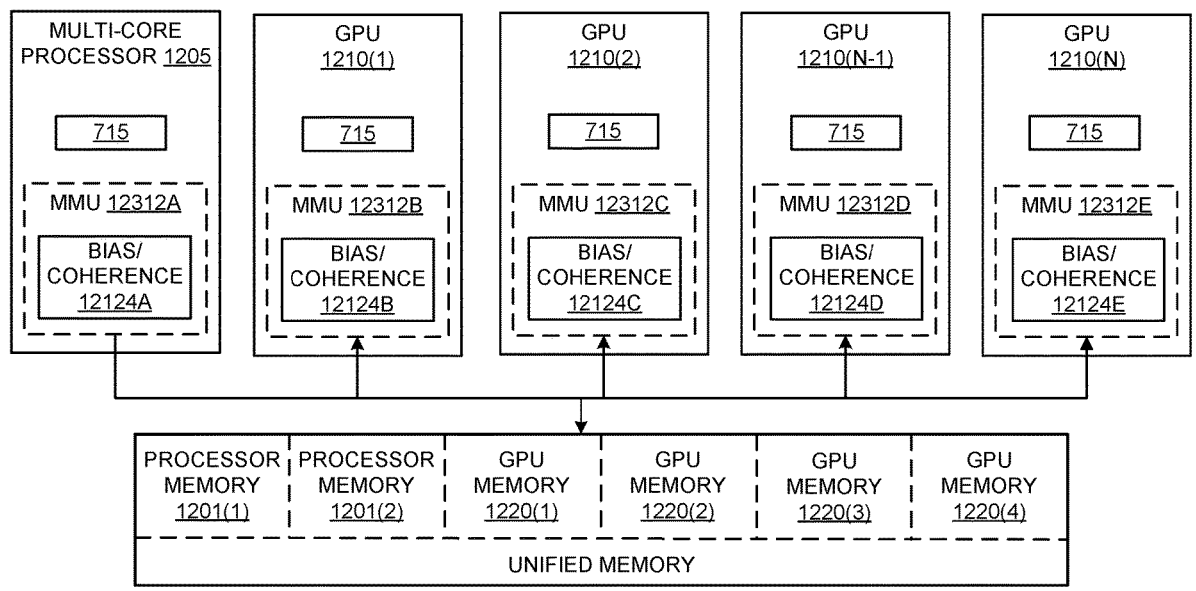

FIG. 12A illustrates an exemplary architecture in which a plurality of GPUs 1210(1)-1210(N) is communicatively coupled to a plurality of multi-core processors 1205(1)-1205(M) over high-speed links 1240(1)-1240(N) (e.g., buses, point-to-point interconnects, etc.). In at least one embodiment, high-speed links 1240(1)-1240(N) support a communication throughput of 4 GB/s, 30 GB/s, 80 GB/s or higher. In at least one embodiment, various interconnect protocols may be used including, but not limited to, PCIe 4.0 or 5.0 and NVLink 2.0. In various figures, "N" and "M" represent positive integers, values of which may be different from figure to figure. In at least one embodiment, one or more GPUs in a plurality of GPUs 1210(1)-1210(N) includes one or more graphics cores (also referred to simply as "cores") 1500 as disclosed in FIGS. 15A and 15B. In at least one embodiment, one or more graphics cores 1500 may be referred to as streaming multiprocessors ("SMs"), stream processors ("SPs"), stream processing units ("SPUs"), compute units ("CUs"), execution units ("EUs"), and/or slices, where a slice in this context can refer to a portion of processing resources in a processing unit (e.g., 16 cores, a ray tracing unit, a thread director or scheduler).

In addition, and in at least one embodiment, two or more of GPUs 1210 are interconnected over high-speed links 1229(1)-1229(2), which may be implemented using similar or different protocols/links than those used for high-speed links 1240(1)-1240(N). Similarly, two or more of multi-core processors 1205 may be connected over a high-speed link 1228 which may be symmetric multi-processor (SMP) buses operating at 20 GB/s, 30 GB/s, 120 GB/s or higher. Alternatively, all communication between various system components shown in FIG. 12A may be accomplished using similar protocols/links (e.g., over a common interconnection fabric).

In at least one embodiment, each multi-core processor 1205 is communicatively coupled to a processor memory 1201(1)-1201(M), via memory interconnects 1226(1)-1226(M), respectively, and each GPU 1210(1)-1210(N) is communicatively coupled to GPU memory 1220(1)-1220(N) over GPU memory interconnects 1250(1)-1250(N), respectively. In at least one embodiment, memory interconnects 1226 and 1250 may utilize similar or different memory access technologies. By way of example, and not limitation, processor memories 1201(1)-1201(M) and GPU memories 1220 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In at least one embodiment, some portion of processor memories 1201 may be volatile memory and another portion may be non-volatile memory (e.g., using a two-level memory (2LM) hierarchy).

As described herein, although various multi-core processors 1205 and GPUs 1210 may be physically coupled to a particular memory 1201, 1220, respectively, and/or a unified memory architecture may be implemented in which a virtual system address space (also referred to as "effective address" space) is distributed among various physical memories. For example, processor memories 1201(1)-1201(M) may each comprise 64 GB of system memory address space and GPU memories 1220(1)-1220(N) may each comprise 32 GB of system memory address space resulting in a total of 256 GB addressable memory when M=2 and N=4. Other values for N and M are possible.

FIG. 12B illustrates additional details for an interconnection between a multi-core processor 1207 and a graphics acceleration module 1246 in accordance with one exemplary embodiment. In at least one embodiment, graphics acceleration module 1246 may include one or more GPU chips integrated on a line card which is coupled to processor 1207 via high-speed link 1240 (e.g., a PCIe bus, NVLink, etc.). In at least one embodiment, graphics acceleration module 1246 may alternatively be integrated on a package or chip with processor 1207.

In at least one embodiment, processor 1207 includes a plurality of cores 1260A-1260D (which may be referred to as "execution units"), each with a translation lookaside buffer ("TLB") 1261A-1261D and one or more caches 1262A-1262D. In at least one embodiment, cores 1260A-1260D may include various other components for executing instructions and processing data that are not illustrated. In at least one embodiment, caches 1262A-1262D may comprise Level 1 (L1) and Level 2 (L2) caches. In addition, one or more shared caches 1256 may be included in caches 1262A-1262D and shared by sets of cores 1260A-1260D. For example, one embodiment of processor 1207 includes 24 cores, each with its own L1 cache, twelve shared L2 caches, and twelve shared L3 caches. In this embodiment, one or more L2 and L3 caches are shared by two adjacent cores. In at least one embodiment, processor 1207 and graphics acceleration module 1246 connect with system memory 1214, which may include processor memories 1201(1)-1201(M) of FIG. 12A.

In at least one embodiment, coherency is maintained for data and instructions stored in various caches 1262A-1262D, 1256 and system memory 1214 via inter-core communication over a coherence bus 1264. In at least one embodiment, for example, each cache may have cache coherency logic/circuitry associated therewith to communicate to over coherence bus 1264 in response to detected reads or writes to particular cache lines. In at least one embodiment, a cache snooping protocol is implemented over coherence bus 1264 to snoop cache accesses.

In at least one embodiment, a proxy circuit 1225 communicatively couples graphics acceleration module 1246 to coherence bus 1264, allowing graphics acceleration module 1246 to participate in a cache coherence protocol as a peer of cores 1260A-1260D. In particular, in at least one embodiment, an interface 1235 provides connectivity to proxy circuit 1225 over high-speed link 1240 and an interface 1237 connects graphics acceleration module 1246 to high-speed link 1240.

In at least one embodiment, an accelerator integration circuit 1236 provides cache management, memory access, context management, and interrupt management services on behalf of a plurality of graphics processing engines 1231(1)-1231(N) of graphics acceleration module 1246. In at least one embodiment, graphics processing engines 1231(1)-1231(N) may each comprise a separate graphics processing unit (GPU). In at least one embodiment, plurality of graphics processing engines 1231(1)-1231(N) of graphics acceleration module 1246 include one or more graphics cores 1500 as discussed in connection with FIGS. 15A and 15B. In at least one embodiment, graphics processing engines 1231(1)-1231(N) alternatively may comprise different types of graphics processing engines within a GPU, such as graphics execution units, media processing engines (e.g., video encoders/decoders), samplers, and blit engines. In at least one embodiment, graphics acceleration module 1246 may be a GPU with a plurality of graphics processing engines 1231(1)-1231(N) or graphics processing engines 1231(1)-1231(N) may be individual GPUs integrated on a common package, line card, or chip.

In at least one embodiment, accelerator integration circuit 1236 includes a memory management unit (MMU) 1239 for performing various memory management functions such as virtual-to-physical memory translations (also referred to as effective-to-real memory translations) and memory access protocols for accessing system memory 1214. In at least one embodiment, MMU 1239 may also include a translation lookaside buffer (TLB) (not shown) for caching virtual/effective to physical/real address translations. In at least one embodiment, a cache 1238 can store commands and data for efficient access by graphics processing engines 1231(1)-1231(N). In at least one embodiment, data stored in cache 1238 and graphics memories 1233(1)-1233(M) is kept coherent with core caches 1262A-1262D, 1256 and system memory 1214, possibly using a fetch unit 1244. As mentioned, this may be accomplished via proxy circuit 1225 on behalf of cache 1238 and memories 1233(1)-1233(M) (e.g., sending updates to cache 1238 related to modifications/accesses of cache lines on processor caches 1262A-1262D, 1256 and receiving updates from cache 1238).

In at least one embodiment, a set of registers 1245 store context data for threads executed by graphics processing engines 1231(1)-1231(N) and a context management circuit 1248 manages thread contexts. For example, context management circuit 1248 may perform save and restore operations to save and restore contexts of various threads during contexts switches (e.g., where a first thread is saved and a second thread is stored so that a second thread can be execute by a graphics processing engine). For example, on a context switch, context management circuit 1248 may store current register values to a designated region in memory (e.g., identified by a context pointer). It may then restore register values when returning to a context. In at least one embodiment, an interrupt management circuit 1247 receives and processes interrupts received from system devices.

In at least one embodiment, virtual/effective addresses from a graphics processing engine 1231 are translated to real/physical addresses in system memory 1214 by MMU 1239. In at least one embodiment, accelerator integration circuit 1236 supports multiple (e.g., 4, 8, 16) graphics accelerator modules 1246 and/or other accelerator devices. In at least one embodiment, graphics accelerator module 1246 may be dedicated to a single application executed on processor 1207 or may be shared between multiple applications. In at least one embodiment, a virtualized graphics execution environment is presented in which resources of graphics processing engines 1231(1)-1231(N) are shared with multiple applications or virtual machines (VMs). In at least one embodiment, resources may be subdivided into "slices" which are allocated to different VMs and/or applications based on processing requirements and priorities associated with VMs and/or applications.

In at least one embodiment, accelerator integration circuit 1236 performs as a bridge to a system for graphics acceleration module 1246 and provides address translation and system memory cache services. In addition, in at least one embodiment, accelerator integration circuit 1236 may provide virtualization facilities for a host processor to manage virtualization of graphics processing engines 1231(1)-1231(N), interrupts, and memory management.

In at least one embodiment, because hardware resources of graphics processing engines 1231(1)-1231(N) are mapped explicitly to a real address space seen by host processor 1207, any host processor can address these resources directly using an effective address value. In at least one embodiment, one function of accelerator integration circuit 1236 is physical separation of graphics processing engines 1231(1)-1231(N) so that they appear to a system as independent units.

In at least one embodiment, one or more graphics memories 1233(1)-1233(M) are coupled to each of graphics processing engines 1231(1)-1231(N), respectively and N=M. In at least one embodiment, graphics memories 1233(1)-1233(M) store instructions and data being processed by each of graphics processing engines 1231(1)-1231(N). In at least one embodiment, graphics memories 1233(1)-1233(M) may be volatile memories such as DRAMs (including stacked DRAMs), GDDR memory (e.g., GDDR5, GDDR6), or HBM, and/or may be non-volatile memories such as 3D XPoint or Nano-Ram.

In at least one embodiment, to reduce data traffic over high-speed link 1240, biasing techniques can be used to ensure that data stored in graphics memories 1233(1)-1233(M) is data that will be used most frequently by graphics processing engines 1231(1)-1231(N) and preferably not used by cores 1260A-1260D (at least not frequently). Similarly, in at least one embodiment, a biasing mechanism attempts to keep data needed by cores (and preferably not graphics processing engines 1231(1)-1231(N)) within caches 1262A-1262D, 1256 and system memory 1214.

FIG. 12C illustrates another exemplary embodiment in which accelerator integration circuit 1236 is integrated within processor 1207. In this embodiment, graphics processing engines 1231(1)-1231(N) communicate directly over high-speed link 1240 to accelerator integration circuit 1236 via interface 1237 and interface 1235 (which, again, may be any form of bus or interface protocol). In at least one embodiment, accelerator integration circuit 1236 may perform similar operations as those described with respect to FIG. 12B, but potentially at a higher throughput given its close proximity to coherence bus 1264 and caches 1262A-1262D, 1256. In at least one embodiment, an accelerator integration circuit supports different programming models including a dedicated-process programming model (no graphics acceleration module virtualization) and shared programming models (with virtualization), which may include programming models which are controlled by accelerator integration circuit 1236 and programming models which are controlled by graphics acceleration module 1246.

In at least one embodiment, graphics processing engines 1231(1)-1231(N) are dedicated to a single application or process under a single operating system. In at least one embodiment, a single application can funnel other application requests to graphics processing engines 1231(1)-1231(N), providing virtualization within a VM/partition.

In at least one embodiment, graphics processing engines 1231(1)-1231(N), may be shared by multiple VM/application partitions. In at least one embodiment, shared models may use a system hypervisor to virtualize graphics processing engines 1231(1)-1231(N) to allow access by each operating system. In at least one embodiment, for single-partition systems without a hypervisor, graphics processing engines 1231(1)-1231(N) are owned by an operating system. In at least one embodiment, an operating system can virtualize graphics processing engines 1231(1)-1231(N) to provide access to each process or application.

In at least one embodiment, graphics acceleration module 1246 or an individual graphics processing engine 1231(1)-1231(N) selects a process element using a process handle. In at least one embodiment, process elements are stored in system memory 1214 and are addressable using an effective address to real address translation technique described herein. In at least one embodiment, a process handle may be an implementation-specific value provided to a host process when registering its context with graphics processing engine 1231(1)-1231(N) (that is, calling system software to add a process element to a process element linked list). In at least one embodiment, a lower 16-bits of a process handle may be an offset of a process element within a process element linked list.

FIG. 12D illustrates an exemplary accelerator integration slice 1290. In at least one embodiment, a "slice" comprises a specified portion of processing resources of accelerator integration circuit 1236. In at least one embodiment, an application is effective address space 1282 within system memory 1214 stores process elements 1283. In at least one embodiment, process elements 1283 are stored in response to GPU invocations 1281 from applications 1280 executed on processor 1207. In at least one embodiment, a process element 1283 contains process state for corresponding application 1280. In at least one embodiment, a work descriptor (WD) 1284 contained in process element 1283 can be a single job requested by an application or may contain a pointer to a queue of jobs. In at least one embodiment, WD 1284 is a pointer to a job request queue in an application's effective address space 1282.

In at least one embodiment, graphics acceleration module 1246 and/or individual graphics processing engines 1231(1)-1231(N) can be shared by all or a subset of processes in a system. In at least one embodiment, an infrastructure for setting up process states and sending a WD 1284 to a graphics acceleration module 1246 to start a job in a virtualized environment may be included.

In at least one embodiment, a dedicated-process programming model is implementation-specific. In at least one embodiment, in this model, a single process owns graphics acceleration module 1246 or an individual graphics processing engine 1231. In at least one embodiment, when graphics acceleration module 1246 is owned by a single process, a hypervisor initializes accelerator integration circuit 1236 for an owning partition and an operating system initializes accelerator integration circuit 1236 for an owning process when graphics acceleration module 1246 is assigned.

In at least one embodiment, in operation, a WD fetch unit 1291 in accelerator integration slice 1290 fetches next WD 1284, which includes an indication of work to be done by one or more graphics processing engines of graphics acceleration module 1246. In at least one embodiment, data from WD 1284 may be stored in registers 1245 and used by MMU 1239, interrupt management circuit 1247 and/or context management circuit 1248 as illustrated. For example, one embodiment of MMU 1239 includes segment/page walk circuitry for accessing segment/page tables 1286 within an OS virtual address space 1285. In at least one embodiment, interrupt management circuit 1247 may process interrupt events 1292 received from graphics acceleration module 1246. In at least one embodiment, when performing graphics operations, an effective address 1293 generated by a graphics processing engine 1231(1)-1231(N) is translated to a real address by MMU 1239.

In at least one embodiment, registers 1245 are duplicated for each graphics processing engine 1231(1)-1231(N) and/or graphics acceleration module 1246 and may be initialized by a hypervisor or an operating system. In at least one embodiment, each of these duplicated registers may be included in an accelerator integration slice 1290. Exemplary registers that may be initialized by a hypervisor are shown in Table 1.

TABLE 1

Hypervisor Initialized Registers

| Register # | Description |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

Operating System Initialized Registers

| Register # | Description |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |
| 5 | Authority Mask |
| 6 | Work descriptor |

In at least one embodiment, each WD 1284 is specific to a particular graphics acceleration module 1246 and/or graphics processing engines 1231(1)-1231(N). In at least one embodiment, it contains all information required by a graphics processing engine 1231(1)-1231(N) to do work, or it can be a pointer to a memory location where an application has set up a command queue of work to be completed.

FIG. 12E illustrates additional details for one exemplary embodiment of a shared model. This embodiment includes a hypervisor real address space 1298 in which a process element list 1299 is stored. In at least one embodiment, hypervisor real address space 1298 is accessible via a hypervisor 1296 which virtualizes graphics acceleration module engines for operating system 1295.

In at least one embodiment, shared programming models allow for all or a subset of processes from all or a subset of partitions in a system to use a graphics acceleration module 1246. In at least one embodiment, there are two programming models where graphics acceleration module 1246 is shared by multiple processes and partitions, namely time-sliced shared and graphics directed shared.

In at least one embodiment, in this model, system hypervisor 1296 owns graphics acceleration module 1246 and makes its function available to all operating systems 1295. In at least one embodiment, for a graphics acceleration module 1246 to support virtualization by system hypervisor 1296, graphics acceleration module 1246 may adhere to certain requirements, such as (1) an application's job request must be autonomous (that is, state does not need to be maintained between jobs), or graphics acceleration module 1246 must provide a context save and restore mechanism, (2) an application's job request is guaranteed by graphics acceleration module 1246 to complete in a specified amount of time, including any translation faults, or graphics acceleration module 1246 provides an ability to preempt processing of a job, and (3) graphics acceleration module 1246 must be guaranteed fairness between processes when operating in a directed shared programming model.

In at least one embodiment, application 1280 is required to make an operating system 1295 system call with a graphics acceleration module type, a work descriptor (WD), an authority mask register (AMR) value, and a context save/restore area pointer (CSRP). In at least one embodiment, graphics acceleration module type describes a targeted acceleration function for a system call. In at least one embodiment, graphics acceleration module type may be a system-specific value. In at least one embodiment, WD is formatted specifically for graphics acceleration module 1246 and can be in a form of a graphics acceleration module 1246 command, an effective address pointer to a user-defined structure, an effective address pointer to a queue of commands, or any other data structure to describe work to be done by graphics acceleration module 1246.

In at least one embodiment, an AMR value is an AMR state to use for a current process. In at least one embodiment, a value passed to an operating system is similar to an application setting an AMR. In at least one embodiment, if accelerator integration circuit 1236 (not shown) and graphics acceleration module 1246 implementations do not support a User Authority Mask Override Register (UAMOR), an operating system may apply a current UAMOR value to an AMR value before passing an AMR in a hypervisor call. In at least one embodiment, hypervisor 1296 may optionally apply a current Authority Mask Override Register (AMOR) value before placing an AMR into process element 1283. In at least one embodiment, CSRP is one of registers 1245 containing an effective address of an area in an application's effective address space 1282 for graphics acceleration module 1246 to save and restore context state. In at least one embodiment, this pointer is optional if no state is required to be saved between jobs or when a job is preempted. In at least one embodiment, context save/restore area may be pinned system memory.

Upon receiving a system call, operating system 1295 may verify that application 1280 has registered and been given authority to use graphics acceleration module 1246. In at least one embodiment, operating system 1295 then calls hypervisor 1296 with information shown in Table 3.

TABLE 3

OS to Hypervisor Call Parameters

| Parameter # | Description |
| --- | --- |
| 1 | A work descriptor (WD) |
| 2 | An Authority Mask Register (AMR) value (potentially masked) |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |

In at least one embodiment, upon receiving a hypervisor call, hypervisor 1296 verifies that operating system 1295 has registered and been given authority to use graphics acceleration module 1246. In at least one embodiment, hypervisor 1296 then puts process element 1283 into a process element linked list for a corresponding graphics acceleration module 1246 type. In at least one embodiment, a process element may include information shown in Table 4.

TABLE 4

Process Element Information

| Element # | Description |
| --- | --- |
| 1 | A work descriptor (WD) |
| 2 | An Authority Mask Register (AMR) value (potentially masked). |
| 3 | An effective address (EA) Context Save/Restore Area Pointer (CSRP) |
| 4 | A process ID (PID) and optional thread ID (TID) |
| 5 | A virtual address (VA) accelerator utilization record pointer (AURP) |
| 6 | Virtual address of storage segment table pointer (SSTP) |
| 7 | A logical interrupt service number (LISN) |
| 8 | Interrupt vector table, derived from hypervisor call parameters |
| 9 | A state register (SR) value |
| 10 | A logical partition ID (LPID) |
| 11 | A real address (RA) hypervisor accelerator utilization record pointer |
| 12 | Storage Descriptor Register (SDR) |

In at least one embodiment, hypervisor initializes a plurality of accelerator integration slice 1290 registers 1245.

As illustrated in FIG. 12F, in at least one embodiment, a unified memory is used, addressable via a common virtual memory address space used to access physical processor memories 1201(1)-1201(N) and GPU memories 1220(1)-1220(N). In this implementation, operations executed on GPUs 1210(1)-1210(N) utilize a same virtual/effective memory address space to access processor memories 1201(1)-1201(M) and vice versa, thereby simplifying programmability. In at least one embodiment, a first portion of a virtual/effective address space is allocated to processor memory 1201(1), a second portion to second processor memory 1201(N), a third portion to GPU memory 1220(1), and so on. In at least one embodiment, an entire virtual/effective memory space (sometimes referred to as an effective address space) is thereby distributed across each of processor memories 1201 and GPU memories 1220, allowing any processor or GPU to access any physical memory with a virtual address mapped to that memory.

In at least one embodiment, bias/coherence management circuitry 1294A-1294E within one or more of MMUs 1239A-1239E ensures cache coherence between caches of one or more host processors (e.g., 1205) and GPUs 1210 and implements biasing techniques indicating physical memories in which certain types of data should be stored. In at least one embodiment, while multiple instances of bias/coherence management circuitry 1294A-1294E are illustrated in FIG. 12F, bias/coherence circuitry may be implemented within an MMU of one or more host processors 1205 and/or within accelerator integration circuit 1236.

One embodiment allows GPU memories 1220 to be mapped as part of system memory, and accessed using shared virtual memory (SVM) technology, but without suffering performance drawbacks associated with full system cache coherence. In at least one embodiment, an ability for GPU memories 1220 to be accessed as system memory without onerous cache coherence overhead provides a beneficial operating environment for GPU offload. In at least one embodiment, this arrangement allows software of host processor 1205 to setup operands and access computation results, without overhead of tradition I/O DMA data copies. In at least one embodiment, such traditional copies involve driver calls, interrupts and memory mapped I/O (MMIO) accesses that are all inefficient relative to simple memory accesses. In at least one embodiment, an ability to access GPU memories 1220 without cache coherence overheads can be critical to execution time of an offloaded computation. In at least one embodiment, in cases with substantial streaming write memory traffic, for example, cache coherence overhead can significantly reduce an effective write bandwidth seen by a GPU 1210. In at least one embodiment, efficiency of operand setup, efficiency of results access, and efficiency of GPU computation may play a role in determining effectiveness of a GPU offload.

In at least one embodiment, selection of GPU bias and host processor bias is driven by a bias tracker data structure. In at least one embodiment, a bias table may be used, for example, which may be a page-granular structure (e.g., controlled at a granularity of a memory page) that includes 1 or 2 bits per GPU-attached memory page. In at least one embodiment, a bias table may be implemented in a stolen memory range of one or more GPU memories 1220, with or without a bias cache in a GPU 1210 (e.g., to cache frequently/recently used entries of a bias table). Alternatively, in at least one embodiment, an entire bias table may be maintained within a GPU.

In at least one embodiment, a bias table entry associated with each access to a GPU attached memory 1220 is accessed prior to actual access to a GPU memory, causing following operations. In at least one embodiment, local requests from a GPU 1210 that find their page in GPU bias are forwarded directly to a corresponding GPU memory 1220. In at least one embodiment, local requests from a GPU that find their page in host bias are forwarded to processor 1205 (e.g., over a high-speed link as described herein). In at least one embodiment, requests from processor 1205 that find a requested page in host processor bias complete a request like a normal memory read. Alternatively, requests directed to a GPU-biased page may be forwarded to a GPU 1210. In at least one embodiment, a GPU may then transition a page to a host processor bias if it is not currently using a page. In at least one embodiment, a bias state of a page can be changed either by a software-based mechanism, a hardware-assisted software-based mechanism, or, for a limited set of cases, a purely hardware-based mechanism.

In at least one embodiment, one mechanism for changing bias state employs an API call (e.g., OpenCL), which, in turn, calls a GPU's device driver which, in turn, sends a message (or enqueues a command descriptor) to a GPU directing it to change a bias state and, for some transitions, perform a cache flushing operation in a host. In at least one embodiment, a cache flushing operation is used for a transition from host processor 1205 bias to GPU bias, but is not for an opposite transition.

In at least one embodiment, cache coherency is maintained by temporarily rendering GPU-biased pages uncacheable by host processor 1205. In at least one embodiment, to access these pages, processor 1205 may request access from GPU 1210, which may or may not grant access right away. In at least one embodiment, thus, to reduce communication between processor 1205 and GPU 1210 it is beneficial to ensure that GPU-biased pages are those which are required by a GPU but not host processor 1205 and vice versa.

Figure 13:
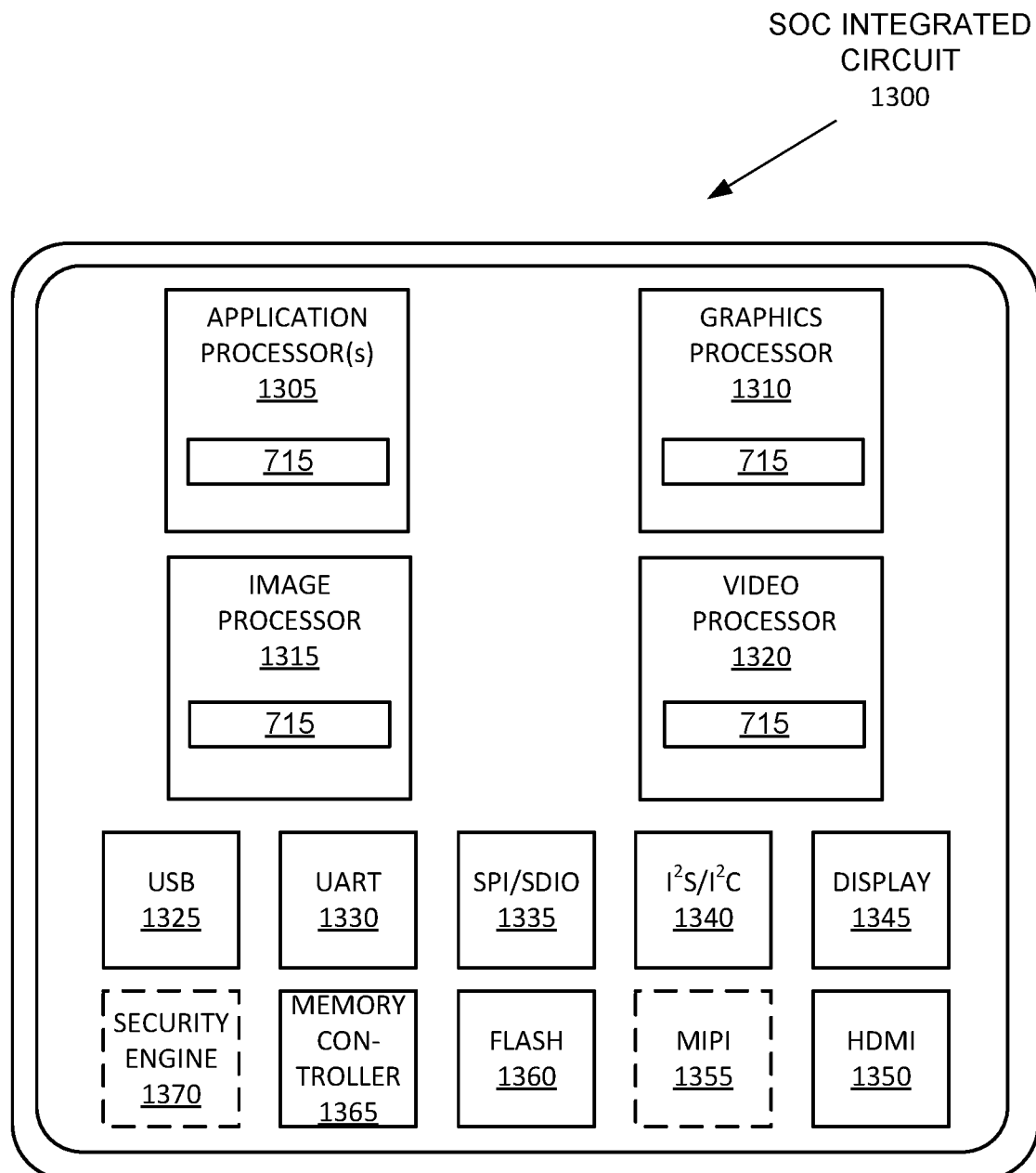
FIG. 13 illustrates exemplary integrated circuits and associated graphics processors, according to at least one embodiment.

FIG. 13 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 13 is a block diagram illustrating an exemplary system on a chip integrated circuit 1300 that may be fabricated using one or more IP cores, according to at least one embodiment. In at least one embodiment, integrated circuit 1300 includes one or more application processor(s) 1305 (e.g., CPUs), at least one graphics processor 1310, and may additionally include an image processor 1315 and/or a video processor 1320, any of which may be a modular IP core. In at least one embodiment, integrated circuit 1300 includes peripheral or bus logic including a USB controller 1325, a UART controller 1330, an SPI/SDIO controller 1335, and an I²S/I²C controller 1340. In at least one embodiment, integrated circuit 1300 can include a display device 1345 coupled to one or more of a high-definition multimedia interface (HDMI) controller 1350 and a mobile industry processor interface (MIPI) display interface 1355. In at least one embodiment, storage may be provided by a flash memory subsystem 1360 including flash memory and a flash memory controller. In at least one embodiment, a memory interface may be provided via a memory controller 1365 for access to SDRAM or SRAM memory devices. In at least one embodiment, some integrated circuits additionally include an embedded security engine 1370.

Inference and/or training logic 715 are used to perform inferencing and/or training operations associated with one or more embodiments. In at least one embodiment, inference and/or training logic 715 may be used in integrated circuit 1300 for inferencing or predicting operations based, at least in part, on weight parameters calculated using neural network training operations, neural network functions and/or architectures, or neural network use cases described herein.

Embodiments presented herein can allow for single cell architecture functionality to be added to existing hardware devices in a communications network deployment.

Figure 14A:
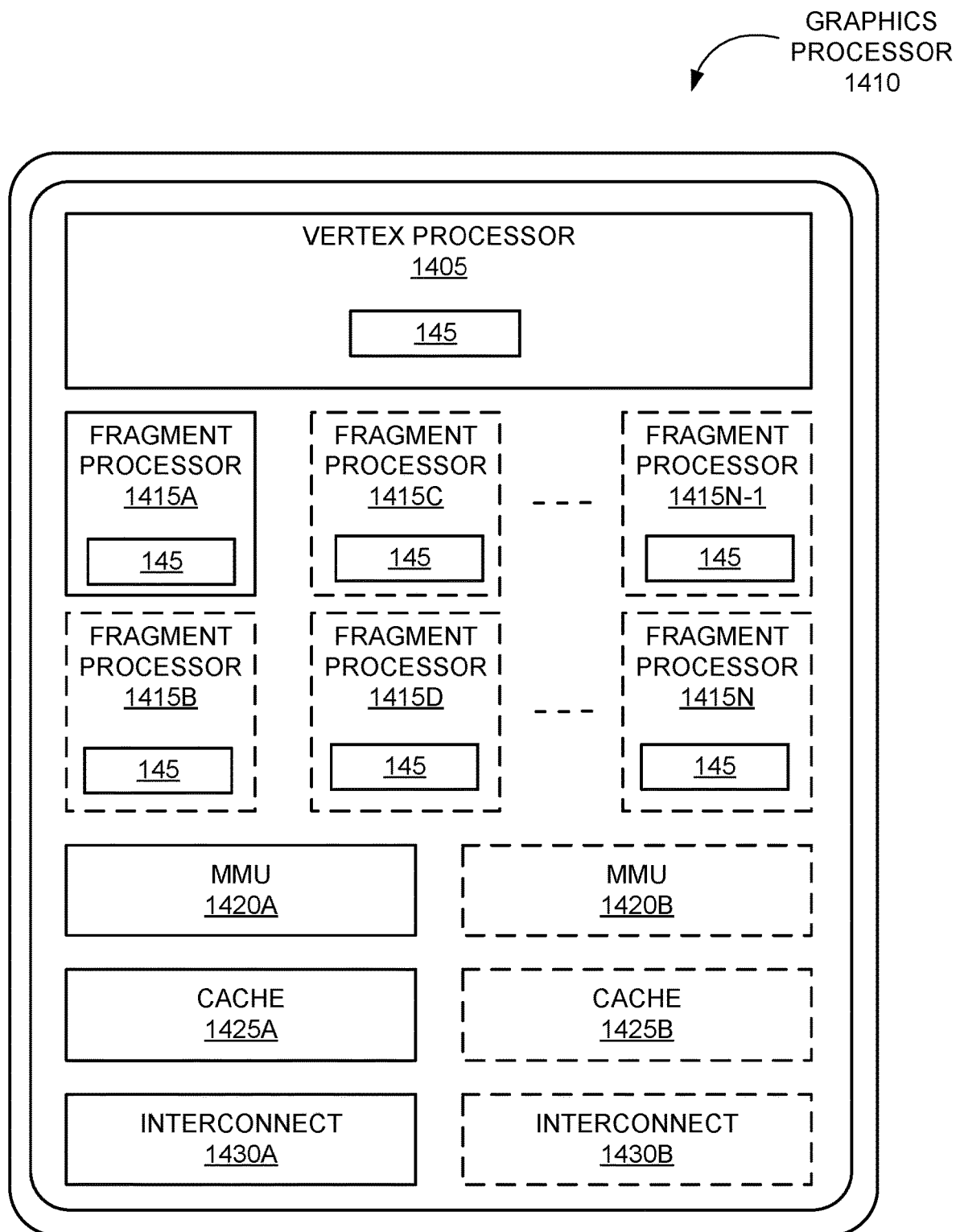
FIGS. 14A-14B illustrate exemplary integrated circuits and associated graphics processors, according to at least one embodiment.
Figure 14B:
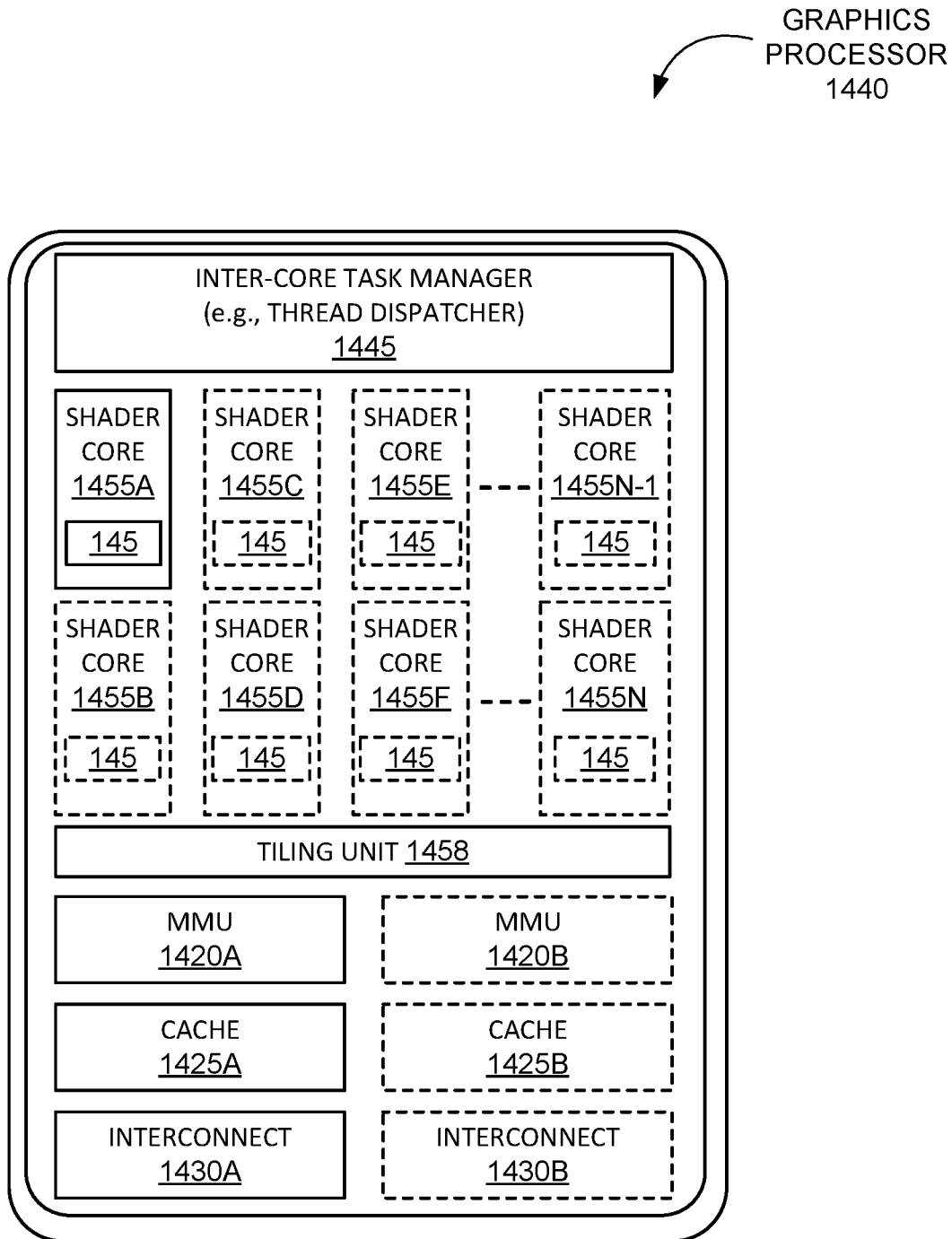

FIGS. 14A-14B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 14A-14B are block diagrams illustrating exemplary graphics processors for use within an SoC, according to embodiments described herein. FIG. 14A illustrates an exemplary graphics processor 1410 of a system on a chip integrated circuit that may be fabricated using one or more IP cores, according to at least one embodiment. FIG. 14B illustrates an additional exemplary graphics processor 1440 of a system on a chip integrated circuit that may be fabricated using one or more IP cores, according to at least one embodiment. In at least one embodiment, graphics processor 1410 of FIG. 14A is a low power graphics processor core. In at least one embodiment, graphics processor 1440 of FIG. 14B is a higher performance graphics processor core. In at least one embodiment, each of graphics processors 1410, 1440 can be variants of graphics processor 1310 of FIG. 13.

In at least one embodiment, graphics processor 1410 includes a vertex processor 1405 and one or more fragment processor(s) 1415A-1415N (e.g., 1415A, 1415B, 1415C, 1415D, through 1415N-1, and 1415N). In at least one embodiment, graphics processor 1410 can execute different shader programs via separate logic, such that vertex processor 1405 is optimized to execute operations for vertex shader programs, while one or more fragment processor(s) 1415A-1415N execute fragment (e.g., pixel) shading operations for fragment or pixel shader programs. In at least one embodiment, vertex processor 1405 performs a vertex processing stage of a 3D graphics pipeline and generates primitives and vertex data. In at least one embodiment, fragment processor(s) 1415A-1415N use primitive and vertex data generated by vertex processor 1405 to produce a framebuffer that is displayed on a display device. In at least one embodiment, fragment processor(s) 1415A-1415N are optimized to execute fragment shader programs as provided for in an OpenGL API, which may be used to perform similar operations as a pixel shader program as provided for in a Direct 3D API.

In at least one embodiment, graphics processor 1410 additionally includes one or more memory management units (MMUs) 1420A-1420B, cache(s) 1425A-1425B, and circuit interconnect(s) 1430A-1430B. In at least one embodiment, one or more MMU(s) 1420A-1420B provide for virtual to physical address mapping for graphics processor 1410, including for vertex processor 1405 and/or fragment processor(s) 1415A-1415N, which may reference vertex or image/texture data stored in memory, in addition to vertex or image/texture data stored in one or more cache(s) 1425A-1425B. In at least one embodiment, one or more MMU(s) 1420A-1420B may be synchronized with other MMUs within a system, including one or more MMUs associated with one or more application processor(s) 1305, image processors 1315, and/or video processors 1320 of FIG. 13, such that each processor 1305-1320 can participate in a shared or unified virtual memory system. In at least one embodiment, one or more circuit interconnect(s) 1430A-1430B enable graphics processor 1410 to interface with other IP cores within SoC, either via an internal bus of SoC or via a direct connection.

In at least one embodiment, graphics processor 1440 includes one or more shader core(s) 1455A-1455N (e.g., 1455A, 1455B, 1455C, 1455D, 1455E, 1455F, through 1455N-1, and 1455N) as shown in FIG. 14B, which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1440 includes an inter-core task manager 1445, which acts as a thread dispatcher to dispatch execution threads to one or more shader cores 1455A-1455N and a tiling unit 1458 to accelerate tiling operations for tile-based rendering, in which rendering operations for a scene are subdivided in image space, for example to exploit local spatial coherence within a scene or to optimize use of internal caches.

Inference and/or training logic 715 are used to perform inferencing and/or training operations associated with one or more embodiments. In at least one embodiment, inference and/or training logic 715 may be used in integrated circuit 14A and/or 14B for inferencing or predicting operations based, at least in part, on weight parameters calculated using neural network training operations, neural network functions and/or architectures, or neural network use cases described herein.

Embodiments presented herein can allow for single cell architecture functionality to be added to existing hardware devices in a communications network deployment.

Figure 15A:
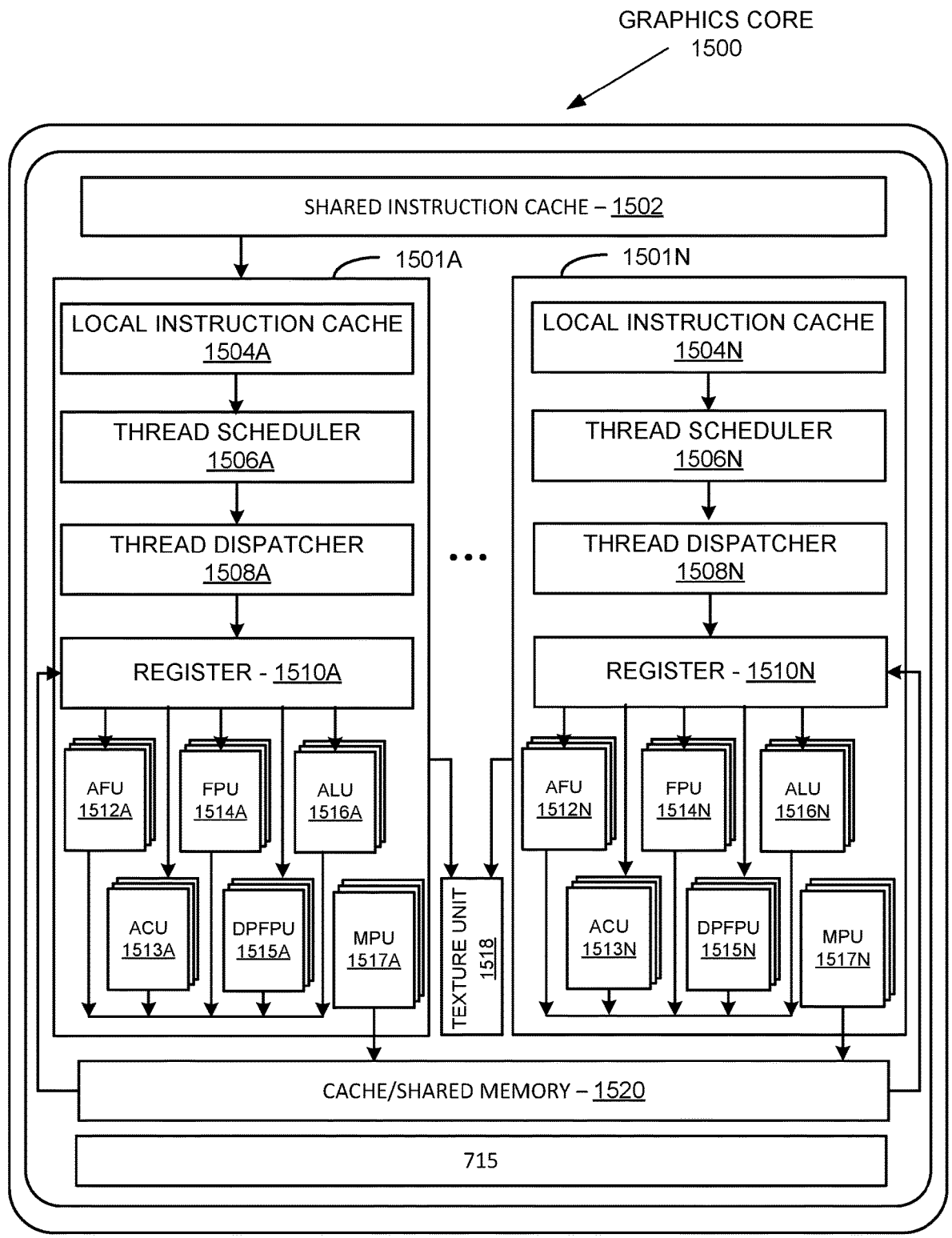
FIGS. 15A-15B illustrate additional exemplary graphics processor logic according to at least one embodiment.
Figure 15B:
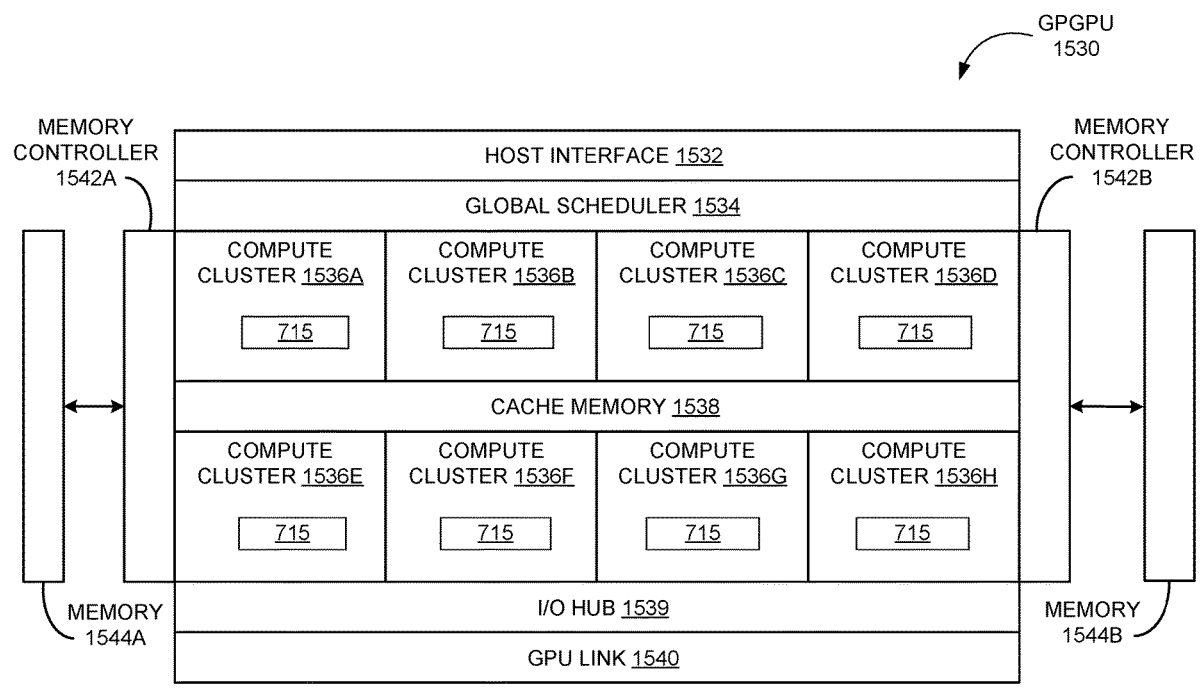

FIGS. 15A-15B illustrate additional exemplary graphics processor logic according to embodiments described herein. FIG. 15A illustrates a graphics core 1500 that may be included within graphics processor 1310 of FIG. 13, in at least one embodiment, and may be a unified shader core 1455A-1455N as in FIG. 14B in at least one embodiment. FIG. 15B illustrates a highly-parallel general-purpose graphics processing unit ("GPGPU") 1530 suitable for deployment on a multi-chip module in at least one embodiment.

In at least one embodiment, graphics core 1500 includes a shared instruction cache 1502, a texture unit 1518, and a cache/shared memory 1520 (e.g., including L1, L2, L3, last level cache, or other caches) that are common to execution resources within graphics core 1500. In at least one embodiment, graphics core 1500 can include multiple slices 1501A-1501N or a partition for each core, and a graphics processor can include multiple instances of graphics core 1500. In at least one embodiment, each slice 1501A-1501N refers to graphics core 1500. In at least one embodiment, slices 1501A-1501N have sub-slices, which are part of a slice 1501A-1501N. In at least one embodiment, slices 1501A-1501N are independent of other slices or dependent on other slices. In at least one embodiment, slices 1501A-1501N can include support logic including a local instruction cache 1504A-1504N, a thread scheduler (sequencer) 1506A-1506N, a thread dispatcher 1508A-1508N, and a set of registers 1510A-1510N. In at least one embodiment, slices 1501A-1501N can include a set of additional function units (AFUs 1512A-1512N), floating-point units (FPUs 1514A-1514N), integer arithmetic logic units (ALUs 1516A-1516N), address computational units (ACUs 1513A-1513N), double-precision floating-point units (DPFPUs 1515A-1515N), and matrix processing units (MPUs 1517A-1517N).

In at least one embodiment, each slice 1501A-1501N includes one or more engines for floating point and integer vector operations and one or more engines to accelerate convolution and matrix operations in AI, machine learning, or large dataset workloads. In at least one embodiment, one or more slices 1501A-1501N include one or more vector engines to compute a vector (e.g., compute mathematical operations for vectors). In at least one embodiment, a vector engine can compute a vector operation in 16-bit floating point (also referred to as "FP16"), 32-bit floating point (also referred to as "FP32"), or 64-bit floating point (also referred to as "FP64"). In at least one embodiment, one or more slices 1501A-1501N includes 16 vector engines that are paired with 16 matrix math units to compute matrix/tensor operations, where vector engines and math units are exposed via matrix extensions. In at least one embodiment, a slice a specified portion of processing resources of a processing unit, e.g., 16 cores and a ray tracing unit or 8 cores, a thread scheduler, a thread dispatcher, and additional functional units for a processor. In at least one embodiment, graphics core 1500 includes one or more matrix engines to compute matrix operations, e.g., when computing tensor operations.

In at least one embodiment, one or more slices 1501A-1501N includes one or more ray tracing units to compute ray tracing operations (e.g., 16 ray tracing units per slice slices 1501A-1501N). In at least one embodiment, a ray tracing unit computes ray traversal, triangle intersection, bounding box intersect, or other ray tracing operations.

In at least one embodiment, one or more slices 1501A-1501N includes a media slice that encodes, decodes, and/or transcodes data; scales and/or format converts data; and/or performs video quality operations on video data.

In at least one embodiment, one or more slices 1501A-1501N are linked to L2 cache and memory fabric, link connectors, high-bandwidth memory (HBM) (e.g., HBM2e, HDM3) stacks, and a media engine. In at least one embodiment, one or more slices 1501A-1501N include multiple cores (e.g., 16 cores) and multiple ray tracing units (e.g., 16) paired to each core. In at least one embodiment, one or more slices 1501A-1501N has one or more L1 caches. In at least one embodiment, one or more slices 1501A-1501N include one or more vector engines; one or more instruction caches to store instructions; one or more L1 caches to cache data; one or more shared local memories (SLMs) to store data, e.g., corresponding to instructions; one or more samplers to sample data; one or more ray tracing units to perform ray tracing operations; one or more geometries to perform operations in geometry pipelines and/or apply geometric transformations to vertices or polygons; one or more rasterizers to describe an image in vector graphics format (e.g., shape) and convert it into a raster image (e.g., a series of pixels, dots, or lines, which when displayed together, create an image that is represented by shapes); one or more a Hierarchical Depth Buffer (Hiz) to buffer data; and/or one or more pixel backends. In at least one embodiment, a slice 1501A-1501N includes a memory fabric, e.g., an L2 cache.

In at least one embodiment, FPUs 1514A-1514N can perform single-precision (32-bit) and half-precision (16-bit) floating point operations, while DPFPUs 1515A-1515N perform double precision (64-bit) floating point operations. In at least one embodiment, ALUs 1516A-1516N can perform variable precision integer operations at 8-bit, 16-bit, and 32-bit precision, and can be configured for mixed precision operations. In at least one embodiment, MPUs 1517A-1517N can also be configured for mixed precision matrix operations, including half-precision floating point and 8-bit integer operations. In at least one embodiment, MPUs 1517-1517N can perform a variety of matrix operations to accelerate machine learning application frameworks, including enabling support for accelerated general matrix to matrix multiplication (GEMM). In at least one embodiment, AFUs 1512A-1512N can perform additional logic operations not supported by floating-point or integer units, including trigonometric operations (e.g., sine, cosInference and/or training logic 715 are used to perform inferencing and/or training operations associated with one or more embodiments. In at least one embodiment, inference and/or training logic 715 may be used in graphics core 1500 for inferencing or predicting operations based, at least in part, on weight parameters calculated using neural network training operations, neural network functions and/or architectures, or neural network use cases described herein.

In at least one embodiment, graphics core 1500 includes an interconnect and a link fabric sublayer that is attached to a switch and a GPU-GPU bridge that enables multiple graphics processors 1500 (e.g., 8) to be interlinked without glue to each other with load/store units (LSUs), data transfer units, and sync semantics across multiple graphics processors 1500. In at least one embodiment, interconnects include standardized interconnects (e.g., PCIe) or some combination thereof.

In at least one embodiment, graphics core 1500 includes multiple tiles. In at least one embodiment, a tile is an individual die or one or more dies, where individual dies can be connected with an interconnect (e.g., embedded multi-die interconnect bridge (EMIB)). In at least one embodiment, graphics core 1500 includes a compute tile, a memory tile (e.g., where a memory tile can be exclusively accessed by different tiles or different chipsets such as a Rambo tile), substrate tile, a base tile, a HMB tile, a link tile, and EMIB tile, where all tiles are packaged together in graphics core 1500 as part of a GPU. In at least one embodiment, graphics core 1500 can include multiple tiles in a single package (also referred to as a "multi tile package"). In at least one embodiment, a compute tile can have 8 graphics cores 1500, an L1 cache; and a base tile can have a host interface with PCIe 5.0, HBM2e, MDFI, and EMIB, a link tile with 8 links, 8 ports with an embedded switch. In at least one embodiment, tiles are connected with face-to-face (F2F) chip-on-chip bonding through fine-pitched, 36-micron, microbumps (e.g., copper pillars). In at least one embodiment, graphics core 1500 includes memory fabric, which includes memory, and is tile that is accessible by multiple tiles. In at least one embodiment, graphics core 1500 stores, accesses, or loads its own hardware contexts in memory, where a hardware context is a set of data loaded from registers before a process resumes, and where a hardware context can indicate a state of hardware (e.g., state of a GPU).

In at least one embodiment, graphics core 1500 includes serializer/deserializer (SERDES) circuitry that converts a serial data stream to a parallel data stream, or converts a parallel data stream to a serial data stream.

In at least one embodiment, graphics core 1500 includes a high speed coherent unified fabric (GPU to GPU), load/store units, bulk data transfer and sync semantics, and connected GPUs through an embedded switch, where a GPU-GPU bridge is controlled by a controller.

In at least one embodiment, graphics core 1500 performs an API, where said API abstracts hardware of graphics core 1500 and access libraries with instructions to perform math operations (e.g., math kernel library), deep neural network operations (e.g., deep neural network library), vector operations, collective communications, thread building blocks, video processing, data analytics library, and/or ray tracing operations.

Embodiments presented herein can allow for single cell architecture functionality to be added to existing hardware devices in a communications network deployment.

FIG. 15B illustrates a general-purpose processing unit (GPGPU) 1530 that can be configured to enable highly-parallel compute operations to be performed by an array of graphics processing units, in at least one embodiment. In at least one embodiment, GPGPU 1530 can be linked directly to other instances of GPGPU 1530 to create a multi-GPU cluster to improve training speed for deep neural networks. In at least one embodiment, GPGPU 1530 includes a host interface 1532 to enable a connection with a host processor. In at least one embodiment, host interface 1532 is a PCI Express interface. In at least one embodiment, host interface 1532 can be a vendor-specific communications interface or communications fabric. In at least one embodiment, GPGPU 1530 receives commands from a host processor and uses a global scheduler 1534 (which may be referred to as a thread sequencer and/or asynchronous compute engine) to distribute execution threads associated with those commands to a set of compute clusters 1536A-1536H. In at least one embodiment, compute clusters 1536A-1536H share a cache memory 1538. In at least one embodiment, cache memory 1538 can serve as a higher-level cache for cache memories within compute clusters 1536A-1536H.

In at least one embodiment, GPGPU 1530 includes memory 1544A-1544B coupled with compute clusters 1536A-1536H via a set of memory controllers 1542A-1542B (e.g., one or more controllers for HBM2e). In at least one embodiment, memory 1544A-1544B can include various types of memory devices including dynamic random access memory (DRAM) or graphics random access memory, such as synchronous graphics random access memory (SGRAM), including graphics double data rate (GDDR) memory.

In at least one embodiment, compute clusters 1536A-1536H each include a set of graphics cores, such as graphics core 1500 of FIG. 15A, which can include multiple types of integer and floating point logic units that can perform computational operations at a range of precisions including suited for machine learning computations. For example, in at least one embodiment, at least a subset of floating point units in each of compute clusters 1536A-1536H can be configured to perform 16-bit or 32-bit floating point operations, while a different subset of floating point units can be configured to perform 64-bit floating point operations.

In at least one embodiment, multiple instances of GPGPU 1530 can be configured to operate as a compute cluster. In at least one embodiment, communication used by compute clusters 1536A-1536H for synchronization and data exchange varies across embodiments. In at least one embodiment, multiple instances of GPGPU 1530 communicate over host interface 1532. In at least one embodiment, GPGPU 1530 includes an I/O hub 1539 that couples GPGPU 1530 with a GPU link 1540 that enables a direct connection to other instances of GPGPU 1530. In at least one embodiment, GPU link 1540 is coupled to a dedicated GPU-to-GPU bridge that enables communication and synchronization between multiple instances of GPGPU 1530. In at least one embodiment, GPU link 1540 couples with a high-speed interconnect to transmit and receive data to other GPGPUs or parallel processors. In at least one embodiment, multiple instances of GPGPU 1530 are located in separate data processing systems and communicate via a network device that is accessible via host interface 1532. In at least one embodiment GPU link 1540 can be configured to enable a connection to a host processor in addition to or as an alternative to host interface 1532.

In at least one embodiment, GPGPU 1530 can be configured to train neural networks. In at least one embodiment, GPGPU 1530 can be used within an inferencing platform. In at least one embodiment, in which GPGPU 1530 is used for inferencing, GPGPU 1530 may include fewer compute clusters 1536A-1536H relative to when GPGPU 1530 is used for training a neural network. In at least one embodiment, memory technology associated with memory 1544A-1544B may differ between inferencing and training configurations, with higher bandwidth memory technologies devoted to training configurations. In at least one embodiment, an inferencing configuration of GPGPU 1530 can support inferencing specific instructions. For example, in at least one embodiment, an inferencing configuration can provide support for one or more 8-bit integer dot product instructions, which may be used during inferencing operations for deployed neural networks.

Inference and/or training logic 715 are used to perform inferencing and/or training operations associated with one or more embodiments. In at least one embodiment, inference and/or training logic 715 may be used in GPGPU 1530 for inferencing or predicting operations based, at least in part, on weight parameters calculated using neural network training operations, neural network functions and/or architectures, or neural network use cases described herein. Embodiments presented herein can allow for single cell architecture functionality to be added to existing hardware devices in a communications network deployment.

Figure 16:
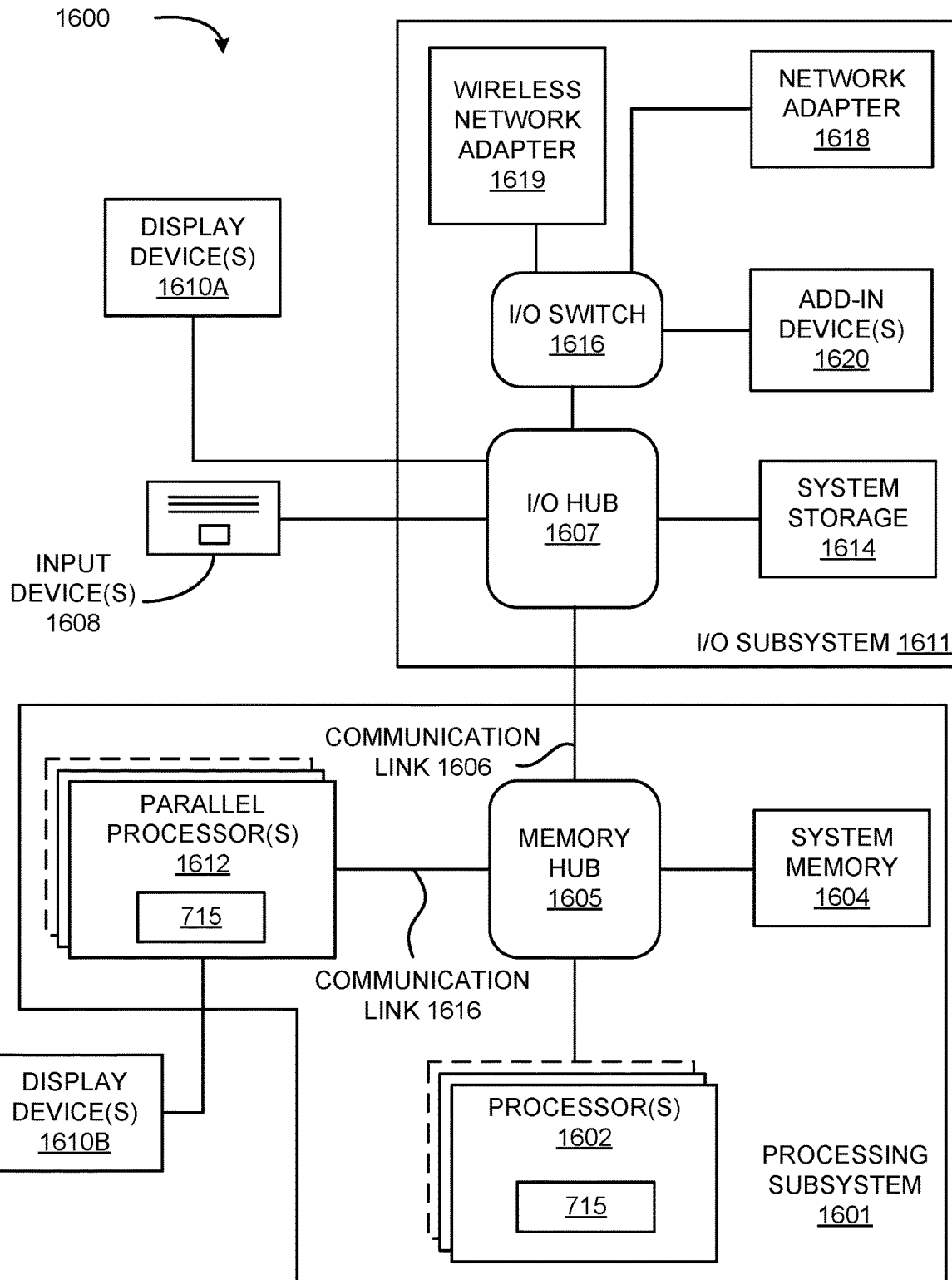
FIG. 16 illustrates a computer system, according to at least one embodiment.

FIG. 16 is a block diagram illustrating a computing system 1600 according to at least one embodiment. In at least one embodiment, computing system 1600 includes a processing subsystem 1601 having one or more processor(s) 1602 and a system memory 1604 communicating via an interconnection path that may include a memory hub 1605. In at least one embodiment, memory hub 1605 may be a separate component within a chipset component or may be integrated within one or more processor(s) 1602. In at least one embodiment, memory hub 1605 couples with an I/O subsystem 1611 via a communication link 1606. In at least one embodiment, I/O subsystem 1611 includes an I/O hub 1607 that can enable computing system 1600 to receive input from one or more input device(s) 1608. In at least one embodiment, I/O hub 1607 can enable a display controller, which may be included in one or more processor(s) 1602, to provide outputs to one or more display device(s) 1610A. In at least one embodiment, one or more display device(s) 1610A coupled with I/O hub 1607 can include a local, internal, or embedded display device.

In at least one embodiment, processing subsystem 1601 includes one or more parallel processor(s) 1612 coupled to memory hub 1605 via a bus or other communication link 1613. In at least one embodiment, communication link 1613 may use one of any number of standards based communication link technologies or protocols, such as, but not limited to PCI Express, or may be a vendor-specific communications interface or communications fabric. In at least one embodiment, one or more parallel processor(s) 1612 form a computationally focused parallel or vector processing system that can include a large number of processing cores and/or processing clusters, such as a many-integrated core (MIC) processor. In at least one embodiment, some or all of parallel processor(s) 1612 form a graphics processing subsystem that can output pixels to one of one or more display device(s) 1610A coupled via I/O Hub 1607. In at least one embodiment, parallel processor(s) 1612 can also include a display controller and display interface (not shown) to enable a direct connection to one or more display device(s) 1610B. In at least one embodiment, parallel processor(s) 1612 include one or more cores, such as graphics cores 1500 discussed herein.

In at least one embodiment, a system storage unit 1614 can connect to I/O hub 1607 to provide a storage mechanism for computing system 1600. In at least one embodiment, an I/O switch 1616 can be used to provide an interface mechanism to enable connections between I/O hub 1607 and other components, such as a network adapter 1618 and/or a wireless network adapter 1619 that may be integrated into platform, and various other devices that can be added via one or more add-in device(s) 1620. In at least one embodiment, network adapter 1618 can be an Ethernet adapter or another wired network adapter. In at least one embodiment, wireless network adapter 1619 can include one or more of a Wi-Fi, Bluetooth, near field communication (NFC), or other network device that includes one or more wireless radios.

In at least one embodiment, computing system 1600 can include other components not explicitly shown, including USB or other port connections, optical storage drives, video capture devices, and like, may also be connected to I/O hub 1607. In at least one embodiment, communication paths interconnecting various components in FIG. 16 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, parallel processor(s) 1612 incorporate circuitry optimized for graphics and video processing, including, for example, video output circuitry, and constitutes a graphics processing unit (GPU), e.g., parallel processor(s) 1612 includes graphics core 1500. In at least one embodiment, parallel processor(s) 1612 incorporate circuitry optimized for general purpose processing. In at least embodiment, components of computing system 1600 may be integrated with one or more other system elements on a single integrated circuit. For example, in at least one embodiment, parallel processor(s) 1612, memory hub 1605, processor(s) 1602, and I/O hub 1607 can be integrated into a system on chip (SoC) integrated circuit. In at least one embodiment, components of computing system 1600 can be integrated into a single package to form a system in package (SIP) configuration. In at least one embodiment, at least a portion of components of computing system 1600 can be integrated into a multi-chip module (MCM), which can be interconnected with other multi-chip modules into a modular computing system.

Inference and/or training logic 715 are used to perform inferencing and/or training operations associated with one or more embodiments. In at least one embodiment, inference and/or training logic 715 may be used in system FIG. 1600 for inferencing or predicting operations based, at least in part, on weight parameters calculated using neural network training operations, neural network functions and/or architectures, or neural network use cases described herein.

Embodiments presented herein can allow for single cell architecture functionality to be added to existing hardware devices in a communications network deployment.

Processors

FIG. 17A illustrates a parallel processor 1700 according to at least one embodiment. In at least one embodiment, various components of parallel processor 1700 may be implemented using one or more integrated circuit devices, such as programmable processors, application specific integrated circuits (ASICs), or field programmable gate arrays (FPGA). In at least one embodiment, illustrated parallel processor 1700 is a variant of one or more parallel processor(s) 1612 shown in FIG. 16 according to an exemplary embodiment. In at least one embodiment, a parallel processor 1700 includes one or more graphics cores 1500.

In at least one embodiment, parallel processor 1700 includes a parallel processing unit 1702. In at least one embodiment, parallel processing unit 1702 includes an I/O unit 1704 that enables communication with other devices, including other instances of parallel processing unit 1702. In at least one embodiment, I/O unit 1704 may be directly connected to other devices. In at least one embodiment, I/O unit 1704 connects with other devices via use of a hub or switch interface, such as a memory hub 1705. In at least one embodiment, connections between memory hub 1705 and I/O unit 1704 form a communication link 1713. In at least one embodiment, I/O unit 1704 connects with a host interface 1706 and a memory crossbar 1716, where host interface 1706 receives commands directed to performing processing operations and memory crossbar 1716 receives commands directed to performing memory operations.

In at least one embodiment, when host interface 1706 receives a command buffer via I/O unit 1704, host interface 1706 can direct work operations to perform those commands to a front end 1708. In at least one embodiment, front end 1708 couples with a scheduler 1710 (which may be referred to as a sequencer), which is configured to distribute commands or other work items to a processing cluster array 1712. In at least one embodiment, scheduler 1710 ensures that processing cluster array 1712 is properly configured and in a valid state before tasks are distributed to a cluster of processing cluster array 1712. In at least one embodiment, scheduler 1710 is implemented via firmware logic executing on a microcontroller. In at least one embodiment, microcontroller implemented scheduler 1710 is configurable to perform complex scheduling and work distribution operations at coarse and fine granularity, enabling rapid preemption and context switching of threads executing on processing array 1712. In at least one embodiment, host software can prove workloads for scheduling on processing cluster array 1712 via one of multiple graphics processing paths. In at least one embodiment, workloads can then be automatically distributed across processing array cluster 1712 by scheduler 1710 logic within a microcontroller including scheduler 1710.

In at least one embodiment, processing cluster array 1712 can include up to "N" processing clusters (e.g., cluster 1714A, cluster 1714B, through cluster 1714N), where "N" represents a positive integer (which may be a different integer "N" than used in other figures). In at least one embodiment, each cluster 1714A-1714N of processing cluster array 1712 can execute a large number of concurrent threads. In at least one embodiment, scheduler 1710 can allocate work to clusters 1714A-1714N of processing cluster array 1712 using various scheduling and/or work distribution algorithms, which may vary depending on workload arising for each type of program or computation. In at least one embodiment, scheduling can be handled dynamically by scheduler 1710, or can be assisted in part by compiler logic during compilation of program logic configured for execution by processing cluster array 1712. In at least one embodiment, different clusters 1714A-1714N of processing cluster array 1712 can be allocated for processing different types of programs or for performing different types of computations.

In at least one embodiment, processing cluster array 1712 can be configured to perform various types of parallel processing operations. In at least one embodiment, processing cluster array 1712 is configured to perform general-purpose parallel compute operations. For example, in at least one embodiment, processing cluster array 1712 can include logic to execute processing tasks including filtering of video and/or audio data, performing modeling operations, including physics operations, and performing data transformations.

In at least one embodiment, processing cluster array 1712 is configured to perform parallel graphics processing operations. In at least one embodiment, processing cluster array 1712 can include additional logic to support execution of such graphics processing operations, including but not limited to, texture sampling logic to perform texture operations, as well as tessellation logic and other vertex processing logic. In at least one embodiment, processing cluster array 1712 can be configured to execute graphics processing related shader programs such as, but not limited to, vertex shaders, tessellation shaders, geometry shaders, and pixel shaders. In at least one embodiment, parallel processing unit 1702 can transfer data from system memory via I/O unit 1704 for processing. In at least one embodiment, during processing, transferred data can be stored to on-chip memory (e.g., parallel processor memory 1722) during processing, then written back to system memory.

In at least one embodiment, when parallel processing unit 1702 is used to perform graphics processing, scheduler 1710 can be configured to divide a processing workload into approximately equal sized tasks, to better enable distribution of graphics processing operations to multiple clusters 1714A-1714N of processing cluster array 1712. In at least one embodiment, portions of processing cluster array 1712 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 1714A-1714N may be stored in buffers to allow intermediate data to be transmitted between clusters 1714A-1714N for further processing.

In at least one embodiment, processing cluster array 1712 can receive processing tasks to be executed via scheduler 1710, which receives commands defining processing tasks from front end 1708. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 1710 may be configured to fetch indices corresponding to tasks or may receive indices from front end 1708. In at least one embodiment, front end 1708 can be configured to ensure processing cluster array 1712 is configured to a valid state before a workload specified by incoming command buffers (e.g., batch-buffers, push buffers, etc.) is initiated.

In at least one embodiment, each of one or more instances of parallel processing unit 1702 can couple with a parallel processor memory 1722. In at least one embodiment, parallel processor memory 1722 can be accessed via memory crossbar 1716, which can receive memory requests from processing cluster array 1712 as well as I/O unit 1704. In at least one embodiment, memory crossbar 1716 can access parallel processor memory 1722 via a memory interface 1718. In at least one embodiment, memory interface 1718 can include multiple partition units (e.g., partition unit 1720A, partition unit 1720B, through partition unit 1720N) that can each couple to a portion (e.g., memory unit) of parallel processor memory 1722. In at least one embodiment, a number of partition units 1720A-1720N is configured to be equal to a number of memory units, such that a first partition unit 1720A has a corresponding first memory unit 1724A, a second partition unit 1720B has a corresponding memory unit 1724B, and an N-th partition unit 1720N has a corresponding N-th memory unit 1724N. In at least one embodiment, a number of partition units 1720A-1720N may not be equal to a number of memory units.

In at least one embodiment, memory units 1724A-1724N can include various types of memory devices, including dynamic random access memory (DRAM) or graphics random access memory, such as synchronous graphics random access memory (SGRAM), including graphics double data rate (GDDR) memory. In at least one embodiment, memory units 1724A-1724N may also include 3D stacked memory, including but not limited to high bandwidth memory (HBM), HBM2e, or HDM3. In at least one embodiment, render targets, such as frame buffers or texture maps may be stored across memory units 1724A-1724N, allowing partition units 1720A-1720N to write portions of each render target in parallel to efficiently use available bandwidth of parallel processor memory 1722. In at least one embodiment, a local instance of parallel processor memory 1722 may be excluded in favor of a unified memory design that utilizes system memory in conjunction with local cache memory.

In at least one embodiment, any one of clusters 1714A-1714N of processing cluster array 1712 can process data that will be written to any of memory units 1724A-1724N within parallel processor memory 1722. In at least one embodiment, memory crossbar 1716 can be configured to transfer an output of each cluster 1714A-1714N to any partition unit 1720A-1720N or to another cluster 1714A-1714N, which can perform additional processing operations on an output. In at least one embodiment, each cluster 1714A-1714N can communicate with memory interface 1718 through memory crossbar 1716 to read from or write to various external memory devices. In at least one embodiment, memory crossbar 1716 has a connection to memory interface 1718 to communicate with I/O unit 1704, as well as a connection to a local instance of parallel processor memory 1722, enabling processing units within different processing clusters 1714A-1714N to communicate with system memory or other memory that is not local to parallel processing unit 1702. In at least one embodiment, memory crossbar 1716 can use virtual channels to separate traffic streams between clusters 1714A-1714N and partition units 1720A-1720N.

In at least one embodiment, multiple instances of parallel processing unit 1702 can be provided on a single add-in card, or multiple add-in cards can be interconnected. In at least one embodiment, different instances of parallel processing unit 1702 can be configured to interoperate even if different instances have different numbers of processing cores, different amounts of local parallel processor memory, and/or other configuration differences. For example, in at least one embodiment, some instances of parallel processing unit 1702 can include higher precision floating point units relative to other instances. In at least one embodiment, systems incorporating one or more instances of parallel processing unit 1702 or parallel processor 1700 can be implemented in a variety of configurations and form factors, including but not limited to desktop, laptop, or handheld personal computers, servers, workstations, game consoles, and/or embedded systems.

Figure 17:
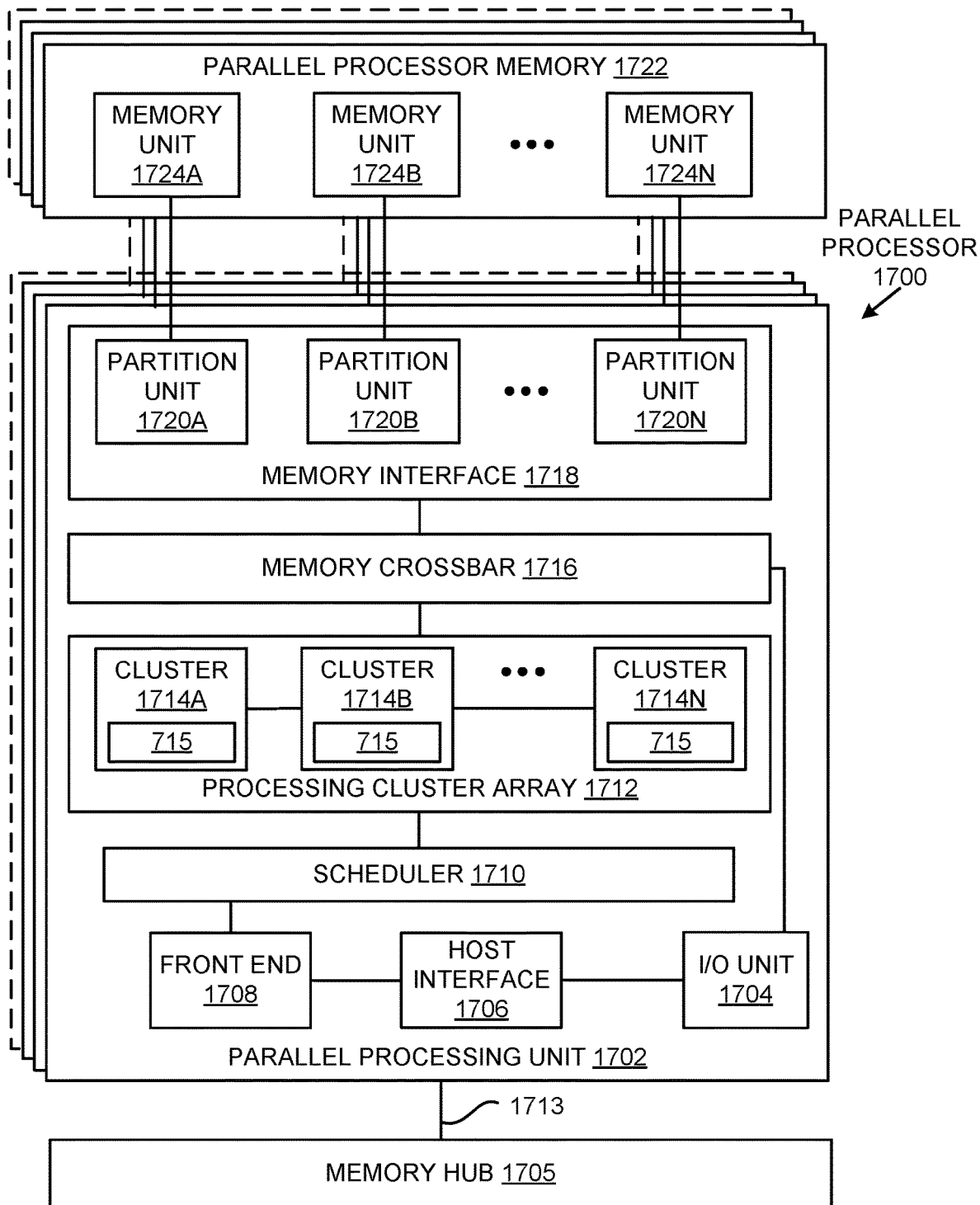
FIG. 17A illustrates a parallel processor, according to at least one embodiment.
FIG. 17B illustrates a partition unit, according to at least one embodiment.
FIG. 17C illustrates a processing cluster, according to at least one embodiment.
FIG. 17D illustrates a graphics multiprocessor, according to at least one embodiment.
Figure 17:
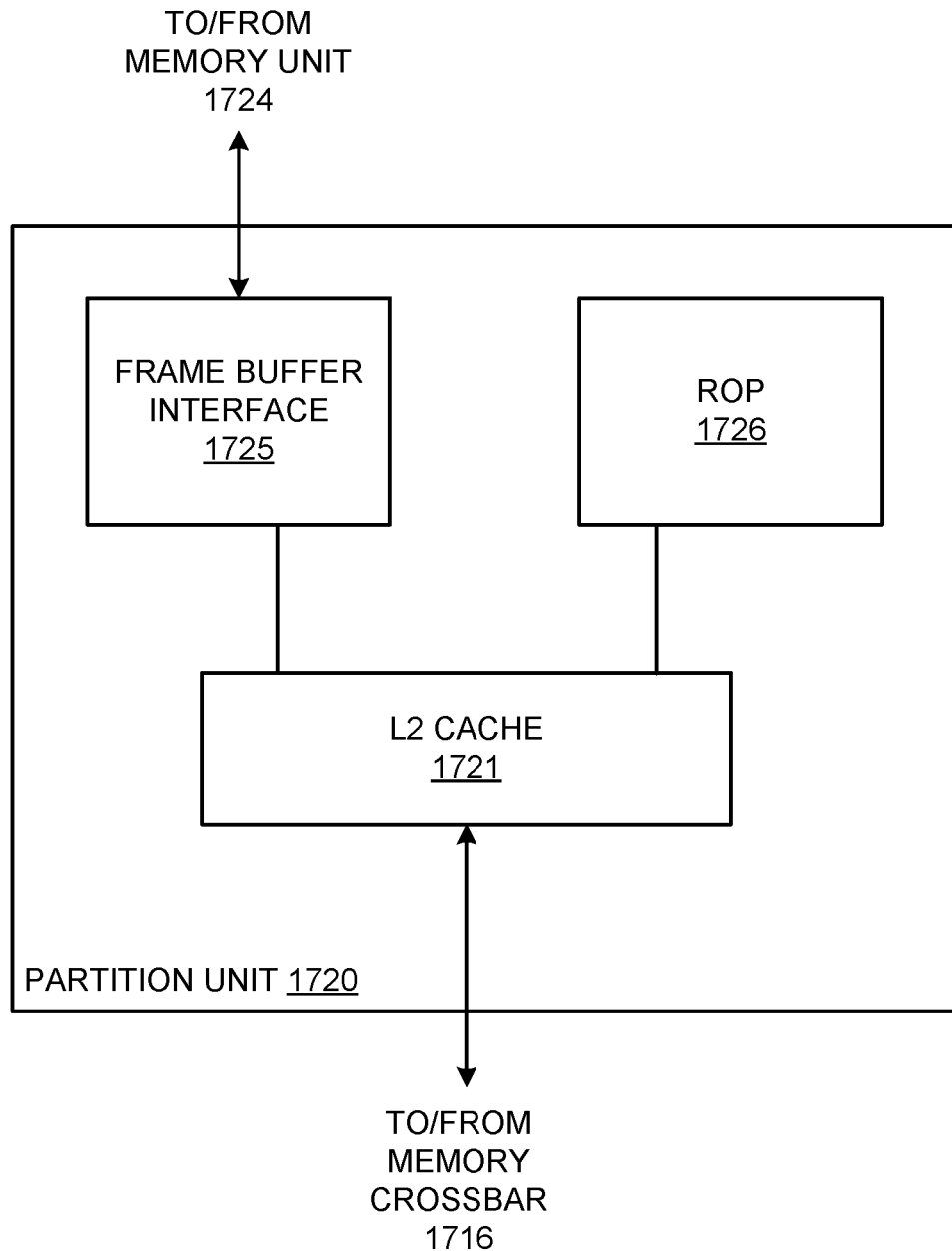
Figure 17:
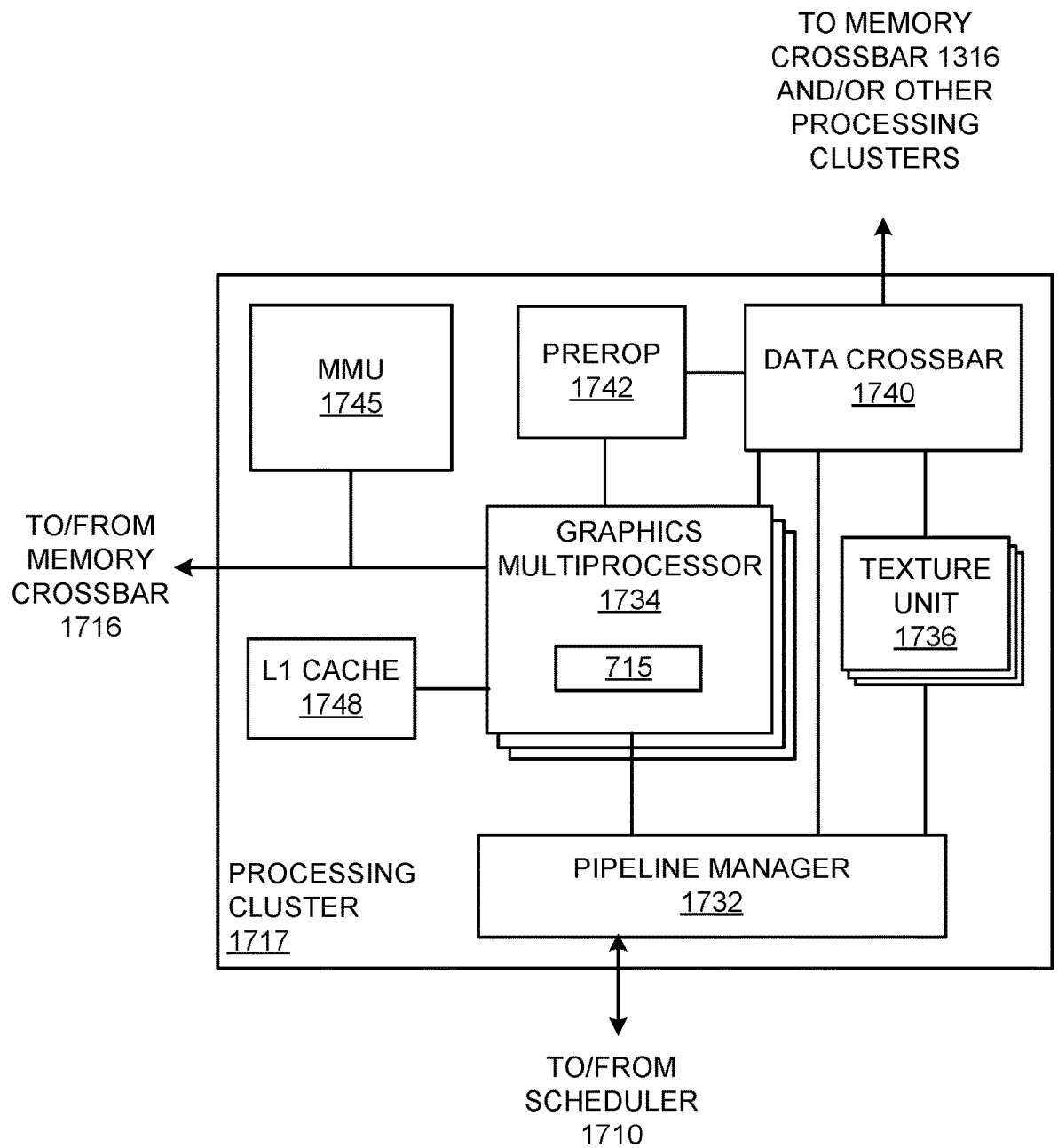
Figure 17:
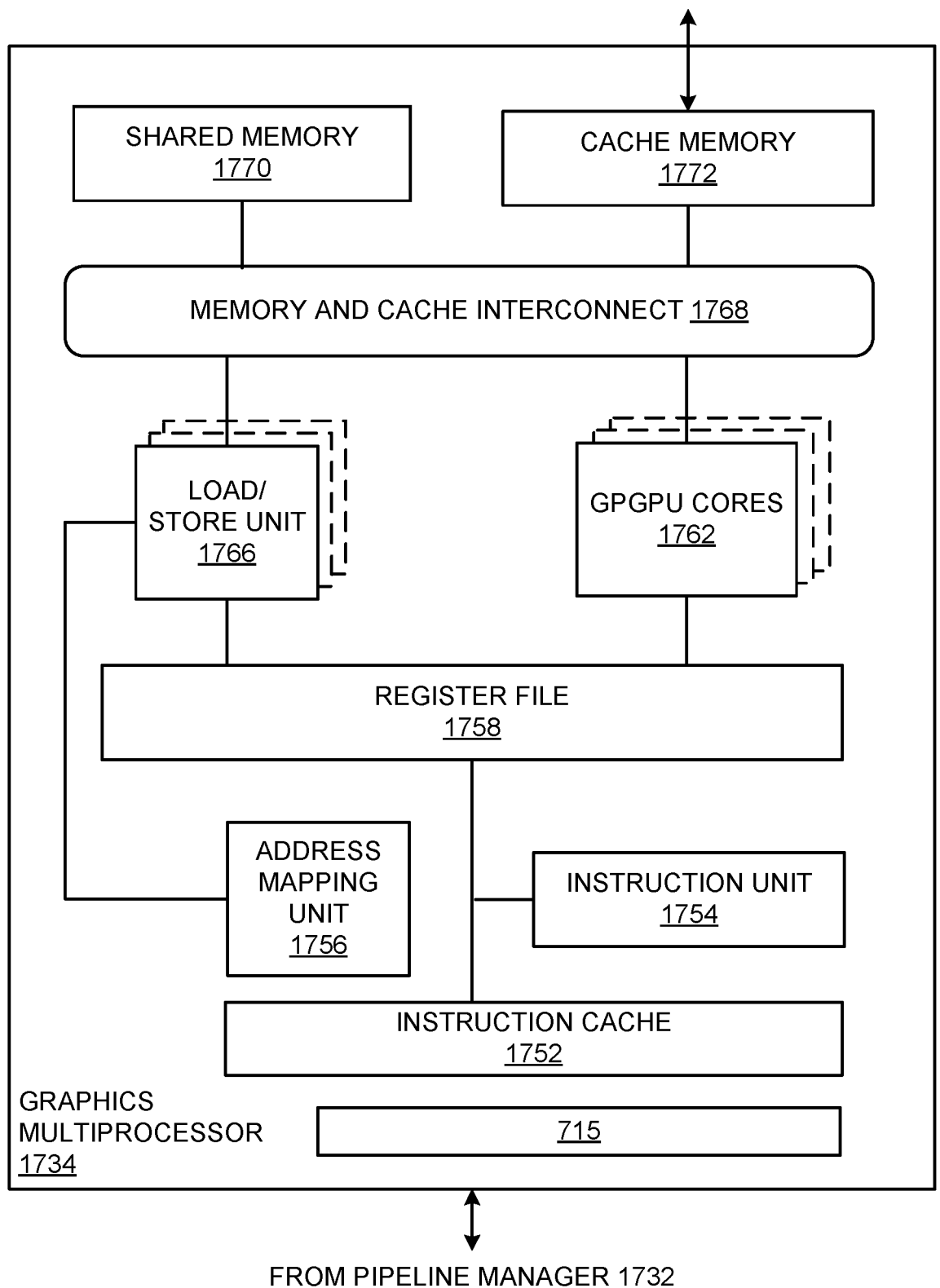

FIG. 17B is a block diagram of a partition unit 1720 according to at least one embodiment. In at least one embodiment, partition unit 1720 is an instance of one of partition units 1720A-1720N of FIG. 17A. In at least one embodiment, partition unit 1720 includes an L2 cache 1721, a frame buffer interface 1725, and a ROP 1726 (raster operations unit). In at least one embodiment, L2 cache 1721 is a read/write cache that is configured to perform load and store operations received from memory crossbar 1716 and ROP 1726. In at least one embodiment, read misses and urgent write-back requests are output by L2 cache 1721 to frame buffer interface 1725 for processing. In at least one embodiment, updates can also be sent to a frame buffer via frame buffer interface 1725 for processing. In at least one embodiment, frame buffer interface 1725 interfaces with one of memory units in parallel processor memory, such as memory units 1724A-1724N of FIG. 17 (e.g., within parallel processor memory 1722).

In at least one embodiment, ROP 1726 is a processing unit that performs raster operations such as stencil, z test, blending, etc. In at least one embodiment, ROP 1726 then outputs processed graphics data that is stored in graphics memory. In at least one embodiment, ROP 1726 includes compression logic to compress depth or color data that is written to memory and decompress depth or color data that is read from memory. In at least one embodiment, compression logic can be lossless compression logic that makes use of one or more of multiple compression algorithms. In at least one embodiment, a type of compression that is performed by ROP 1726 can vary based on statistical characteristics of data to be compressed. For example, in at least one embodiment, delta color compression is performed on depth and color data on a per-tile basis.

In at least one embodiment, ROP 1726 is included within each processing cluster (e.g., cluster 1714A-1714N of FIG. 17A) instead of within partition unit 1720. In at least one embodiment, read and write requests for pixel data are transmitted over memory crossbar 1716 instead of pixel fragment data. In at least one embodiment, processed graphics data may be displayed on a display device, such as one of one or more display device(s) 1610 of FIG. 16, routed for further processing by processor(s) 1602, or routed for further processing by one of processing entities within parallel processor 1700 of FIG. 17A.

FIG. 17C is a block diagram of a processing cluster 1714 within a parallel processing unit according to at least one embodiment. In at least one embodiment, a processing cluster is an instance of one of processing clusters 1714A-1714N of FIG. 17A. In at least one embodiment, processing cluster 1714 can be configured to execute many threads in parallel, where "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 1714 can be controlled via a pipeline manager 1732 that distributes processing tasks to SIMT parallel processors. In at least one embodiment, pipeline manager 1732 receives instructions from scheduler 1710 of FIG. 17A and manages execution of those instructions via a graphics multiprocessor 1734 and/or a texture unit 1736. In at least one embodiment, graphics multiprocessor 1734 is an exemplary instance of a SIMT parallel processor. However, in at least one embodiment, various types of SIMT parallel processors of differing architectures may be included within processing cluster 1714. In at least one embodiment, one or more instances of graphics multiprocessor 1734 can be included within a processing cluster 1714. In at least one embodiment, graphics multiprocessor 1734 can process data and a data crossbar 1740 can be used to distribute processed data to one of multiple possible destinations, including other shader units. In at least one embodiment, pipeline manager 1732 can facilitate distribution of processed data by specifying destinations for processed data to be distributed via data crossbar 1740.

In at least one embodiment, each graphics multiprocessor 1734 within processing cluster 1714 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 1714 constitute a thread. In at least one embodiment, a set of threads executing across a set of parallel processing engines is a thread group. In at least one embodiment, a thread group executes a common program on different input data. In at least one embodiment, each thread within a thread group can be assigned to a different processing engine within a graphics multiprocessor 1734. In at least one embodiment, a thread group may include fewer threads than a number of processing engines within graphics multiprocessor 1734. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 1734. In at least one embodiment, when a thread group includes more threads than number of processing engines within graphics multiprocessor 1734, processing can be performed over consecutive clock cycles. In at least one embodiment, multiple thread groups can be executed concurrently on a graphics multiprocessor 1734.

In at least one embodiment, graphics multiprocessor 1734 includes an internal cache memory to perform load and store operations. In at least one embodiment, graphics multiprocessor 1734 can forego an internal cache and use a cache memory (e.g., L1 cache 1748) within processing cluster 1714. In at least one embodiment, each graphics multiprocessor 1734 also has access to L2 caches within partition units (e.g., partition units 1720A-1720N of FIG. 17A) that are shared among all processing clusters 1714 and may be used to transfer data between threads. In at least one embodiment, graphics multiprocessor 1734 may also access off-chip global memory, which can include one or more of local parallel processor memory and/or system memory. In at least one embodiment, any memory external to parallel processing unit 1702 may be used as global memory. In at least one embodiment, processing cluster 1714 includes multiple instances of graphics multiprocessor 1734 and can share common instructions and data, which may be stored in L1 cache 1748.

In at least one embodiment, each processing cluster 1714 may include an MMU 1745 (memory management unit) that is configured to map virtual addresses into physical addresses. In at least one embodiment, one or more instances of MMU 1745 may reside within memory interface 1718 of FIG. 17A. In at least one embodiment, MMU 1745 includes a set of page table entries (PTEs) used to map a virtual address to a physical address of a tile and optionally a cache line index. In at least one embodiment, MMU 1745 may include address translation lookaside buffers (TLB) or caches that may reside within graphics multiprocessor 1734 or L1 1748 cache or processing cluster 1714. In at least one embodiment, a physical address is processed to distribute surface data access locally to allow for efficient request interleaving among partition units. In at least one embodiment, a cache line index may be used to determine whether a request for a cache line is a hit or miss.

In at least one embodiment, a processing cluster 1714 may be configured such that each graphics multiprocessor 1734 is coupled to a texture unit 1736 for performing texture mapping operations, e.g., determining texture sample positions, reading texture data, and filtering texture data. In at least one embodiment, texture data is read from an internal texture L1 cache (not shown) or from an L1 cache within graphics multiprocessor 1734 and is fetched from an L2 cache, local parallel processor memory, or system memory, as needed. In at least one embodiment, each graphics multiprocessor 1734 outputs processed tasks to data crossbar 1740 to provide processed task to another processing cluster 1714 for further processing or to store processed task in an L2 cache, local parallel processor memory, or system memory via memory crossbar 1716. In at least one embodiment, a preROP 1742 (pre-raster operations unit) is configured to receive data from graphics multiprocessor 1734, and direct data to ROP units, which may be located with partition units as described herein (e.g., partition units 1720A-1720N of FIG. 17A). In at least one embodiment, preROP 1742 unit can perform optimizations for color blending, organizing pixel color data, and performing address translations.

Inference and/or training logic 715 are used to perform inferencing and/or training operations associated with one or more embodiments. In at least one embodiment, inference and/or training logic 715 may be used in graphics processing cluster 1714 for inferencing or predicting operations based, at least in part, on weight parameters calculated using neural network training operations, neural network functions and/or architectures, or neural network use cases described herein.

Embodiments presented herein can allow for single cell architecture functionality to be added to existing hardware devices in a communications network deployment.

FIG. 17D shows a graphics multiprocessor 1734 according to at least one embodiment. In at least one embodiment, graphics multiprocessor 1734 couples with pipeline manager 1732 of processing cluster 1714. In at least one embodiment, graphics multiprocessor 1734 has an execution pipeline including but not limited to an instruction cache 1752, an instruction unit 1754, an address mapping unit 1756, a register file 1758, one or more general purpose graphics processing unit (GPGPU) cores 1762, and one or more load/store units 1766, where one or more load/store units 1766 can perform load/store operations to load/store instructions corresponding to performing an operation. In at least one embodiment, GPGPU cores 1762 and load/store units 1766 are coupled with cache memory 1772 and shared memory 1770 via a memory and cache interconnect 1768.

In at least one embodiment, instruction cache 1752 receives a stream of instructions to execute from pipeline manager 1732. In at least one embodiment, instructions are cached in instruction cache 1752 and dispatched for execution by an instruction unit 1754. In at least one embodiment, instruction unit 1754 can dispatch instructions as thread groups (e.g., warps, wavefronts, waves), with each thread of thread group assigned to a different execution unit within GPGPU cores 1762. In at least one embodiment, an instruction can access any of a local, shared, or global address space by specifying an address within a unified address space. In at least one embodiment, address mapping unit 1756 can be used to translate addresses in a unified address space into a distinct memory address that can be accessed by load/store units 1766.

In at least one embodiment, register file 1758 provides a set of registers for functional units of graphics multiprocessor 1734. In at least one embodiment, register file 1758 provides temporary storage for operands connected to data paths of functional units (e.g., GPGPU cores 1762, load/store units 1766) of graphics multiprocessor 1734. In at least one embodiment, register file 1758 is divided between each of functional units such that each functional unit is allocated a dedicated portion of register file 1758. In at least one embodiment, register file 1758 is divided between different warps (which may be referred to as wavefronts and/or waves) being executed by graphics multiprocessor 1734.

In at least one embodiment, GPGPU cores 1762 can each include floating point units (FPUs) and/or integer arithmetic logic units (ALUs) that are used to execute instructions of graphics multiprocessor 1734. In at least one embodiment, GPGPU cores 1762 can be similar in architecture or can differ in architecture. In at least one embodiment, a first portion of GPGPU cores 1762 include a single precision FPU and an integer ALU while a second portion of GPGPU cores include a double precision FPU. In at least one embodiment, FPUs can implement IEEE 754-2008 standard floating point arithmetic or enable variable precision floating point arithmetic. In at least one embodiment, graphics multiprocessor 1734 can additionally include one or more fixed function or special function units to perform specific functions such as copy rectangle or pixel blending operations. In at least one embodiment, one or more of GPGPU cores 1762 can also include fixed or special function logic.

In at least one embodiment, GPGPU cores 1762 include SIMD logic capable of performing a single instruction on multiple sets of data. In at least one embodiment, GPGPU cores 1762 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform same or similar operations can be executed in parallel via a single SIMD8 logic unit.

In at least one embodiment, memory and cache interconnect 1768 is an interconnect network that connects each functional unit of graphics multiprocessor 1734 to register file 1758 and to shared memory 1770. In at least one embodiment, memory and cache interconnect 1768 is a crossbar interconnect that allows load/store unit 1766 to implement load and store operations between shared memory 1770 and register file 1758. In at least one embodiment, register file 1758 can operate at a same frequency as GPGPU cores 1762, thus data transfer between GPGPU cores 1762 and register file 1758 can have very low latency. In at least one embodiment, shared memory 1770 can be used to enable communication between threads that execute on functional units within graphics multiprocessor 1734. In at least one embodiment, cache memory 1772 can be used as a data cache for example, to cache texture data communicated between functional units and texture unit 1736. In at least one embodiment, shared memory 1770 can also be used as a program managed cache. In at least one embodiment, threads executing on GPGPU cores 1762 can programmatically store data within shared memory in addition to automatically cached data that is stored within cache memory 1772.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high-speed interconnect such as PCIe or NVLink). In at least one embodiment, a GPU may be integrated on a package or chip as cores and communicatively coupled to cores over an internal processor bus/interconnect internal to a package or chip. In at least one embodiment, regardless a manner in which a GPU is connected, processor cores may allocate work to such GPU in a form of sequences of commands/instructions contained in a work descriptor. In at least one embodiment, that GPU then uses dedicated circuitry/logic for efficiently processing these commands/instructions.

Inference and/or training logic 715 are used to perform inferencing and/or training operations associated with one or more embodiments. In at least one embodiment, inference and/or training logic 715 may be used in graphics multiprocessor 1734 for inferencing or predicting operations based, at least in part, on weight parameters calculated using neural network training operations, neural network functions and/or architectures, or neural network use cases described herein.

Embodiments presented herein can allow for single cell architecture functionality to be added to existing hardware devices in a communications network deployment.

Figure 18:
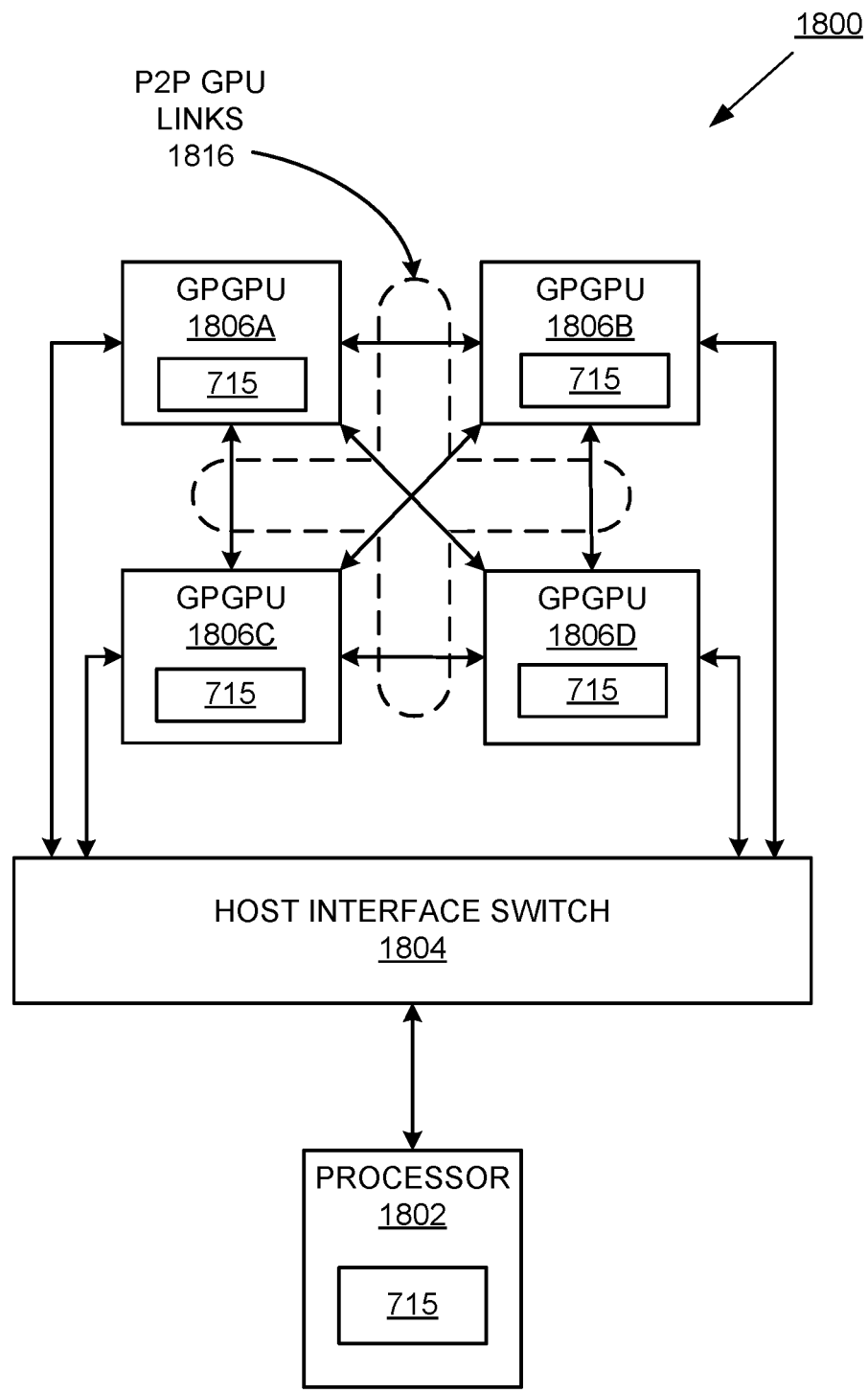
FIG. 18 illustrates a multi-graphics processing unit (GPU) system, according to at least one embodiment.

FIG. 18 illustrates a multi-GPU computing system 1800, according to at least one embodiment. In at least one embodiment, multi-GPU computing system 1800 can include a processor 1802 coupled to multiple general purpose graphics processing units (GPGPUs) 1806A-D via a host interface switch 1804. In at least one embodiment, host interface switch 1804 is a PCI express switch device that couples processor 1802 to a PCI express bus over which processor 1802 can communicate with GPGPUs 1806A-D. In at least one embodiment, GPGPUs 1806A-D can interconnect via a set of high-speed point-to-point GPU-to-GPU links 1816. In at least one embodiment, GPU-to-GPU links 1816 connect to each of GPGPUs 1806A-D via a dedicated GPU link. In at least one embodiment, P2P GPU links 1816 enable direct communication between each of GPGPUs 1806A-D without requiring communication over host interface bus 1804 to which processor 1802 is connected. In at least one embodiment, with GPU-to-GPU traffic directed to P2P GPU links 1816, host interface bus 1804 remains available for system memory access or to communicate with other instances of multi-GPU computing system 1800, for example, via one or more network devices. While in at least one embodiment GPGPUs 1806A-D connect to processor 1802 via host interface switch 1804, in at least one embodiment processor 1802 includes direct support for P2P GPU links 1816 and can connect directly to GPGPUs 1806A-D.

Inference and/or training logic 715 are used to perform inferencing and/or training operations associated with one or more embodiments. In at least one embodiment, inference and/or training logic 715 may be used in multi-GPU computing system 1800 for inferencing or predicting operations based, at least in part, on weight parameters calculated using neural network training operations, neural network functions and/or architectures, or neural network use cases described herein. In at least one embodiment, multi-GPU computing system 1800 includes one or more graphics cores 1500.

Embodiments presented herein can allow for single cell architecture functionality to be added to existing hardware devices in a communications network deployment.

Figure 19:
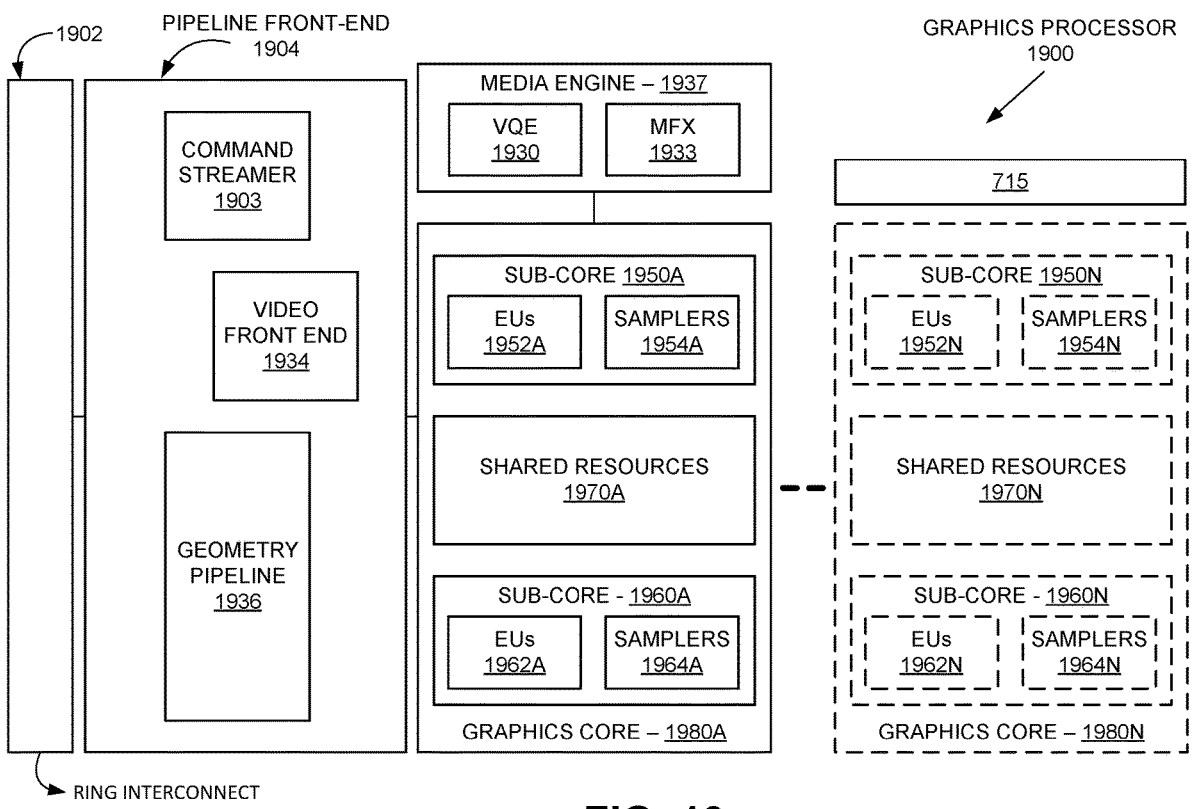
FIG. 19 illustrates a graphics processor, according to at least one embodiment.

FIG. 19 is a block diagram of a graphics processor 1900, according to at least one embodiment. In at least one embodiment, graphics processor 1900 includes a ring interconnect 1902, a pipeline front-end 1904, a media engine 1937, and graphics cores 1980A-1980N. In at least one embodiment, ring interconnect 1902 couples graphics processor 1900 to other processing units, including other graphics processors or one or more general-purpose processor cores. In at least one embodiment, graphics processor 1900 is one of many processors integrated within a multi-core processing system. In at least one embodiment, graphics processor 1900 includes graphics core 1500.

In at least one embodiment, graphics processor 1900 receives batches of commands via ring interconnect 1902. In at least one embodiment, incoming commands are interpreted by a command streamer 1903 in pipeline front-end 1904. In at least one embodiment, graphics processor 1900 includes scalable execution logic to perform 3D geometry processing and media processing via graphics core(s) 1980A-1980N. In at least one embodiment, for 3D geometry processing commands, command streamer 1903 supplies commands to geometry pipeline 1936. In at least one embodiment, for at least some media processing commands, command streamer 1903 supplies commands to a video front end 1934, which couples with media engine 1937. In at least one embodiment, media engine 1937 includes a Video Quality Engine (VQE) 1930 for video and image post-processing and a multi-format encode/decode (MFX) 1933 engine to provide hardware-accelerated media data encoding and decoding. In at least one embodiment, geometry pipeline 1936 and media engine 1937 each generate execution threads for thread execution resources provided by at least one graphics core 1980.

In at least one embodiment, graphics processor 1900 includes scalable thread execution resources featuring graphics cores 1980A-1980N (which can be modular and are sometimes referred to as core slices), each having multiple sub-cores 1950A-50N, 1960A-1960N (sometimes referred to as core sub-slices). In at least one embodiment, graphics processor 1900 can have any number of graphics cores 1980A. In at least one embodiment, graphics processor 1900 includes a graphics core 1980A having at least a first sub-core 1950A and a second sub-core 1960A. In at least one embodiment, graphics processor 1900 is a low power processor with a single sub-core (e.g., 1950A). In at least one embodiment, graphics processor 1900 includes multiple graphics cores 1980A-1980N, each including a set of first sub-cores 1950A-1950N and a set of second sub-cores 1960A-1960N. In at least one embodiment, each sub-core in first sub-cores 1950A-1950N includes at least a first set of execution units 1952A-1952N and media/texture samplers 1954A-1954N. In at least one embodiment, each sub-core in second sub-cores 1960A-1960N includes at least a second set of execution units 1962A-1962N and samplers 1964A-1964N. In at least one embodiment, each sub-core 1950A-1950N, 1960A-1960N shares a set of shared resources 1970A-1970N. In at least one embodiment, shared resources include shared cache memory and pixel operation logic. In at least one embodiment, graphics processor 1900 includes load/store units in pipeline front-end 1904.

Inference and/or training logic 715 are used to perform inferencing and/or training operations associated with one or more embodiments. In at least one embodiment, inference and/or training logic 715 may be used in graphics processor 1900 for inferencing or predicting operations based, at least in part, on weight parameters calculated using neural network training operations, neural network functions and/or architectures, or neural network use cases described herein.

Embodiments presented herein can allow for single cell architecture functionality to be added to existing hardware devices in a communications network deployment.

Figure 20:
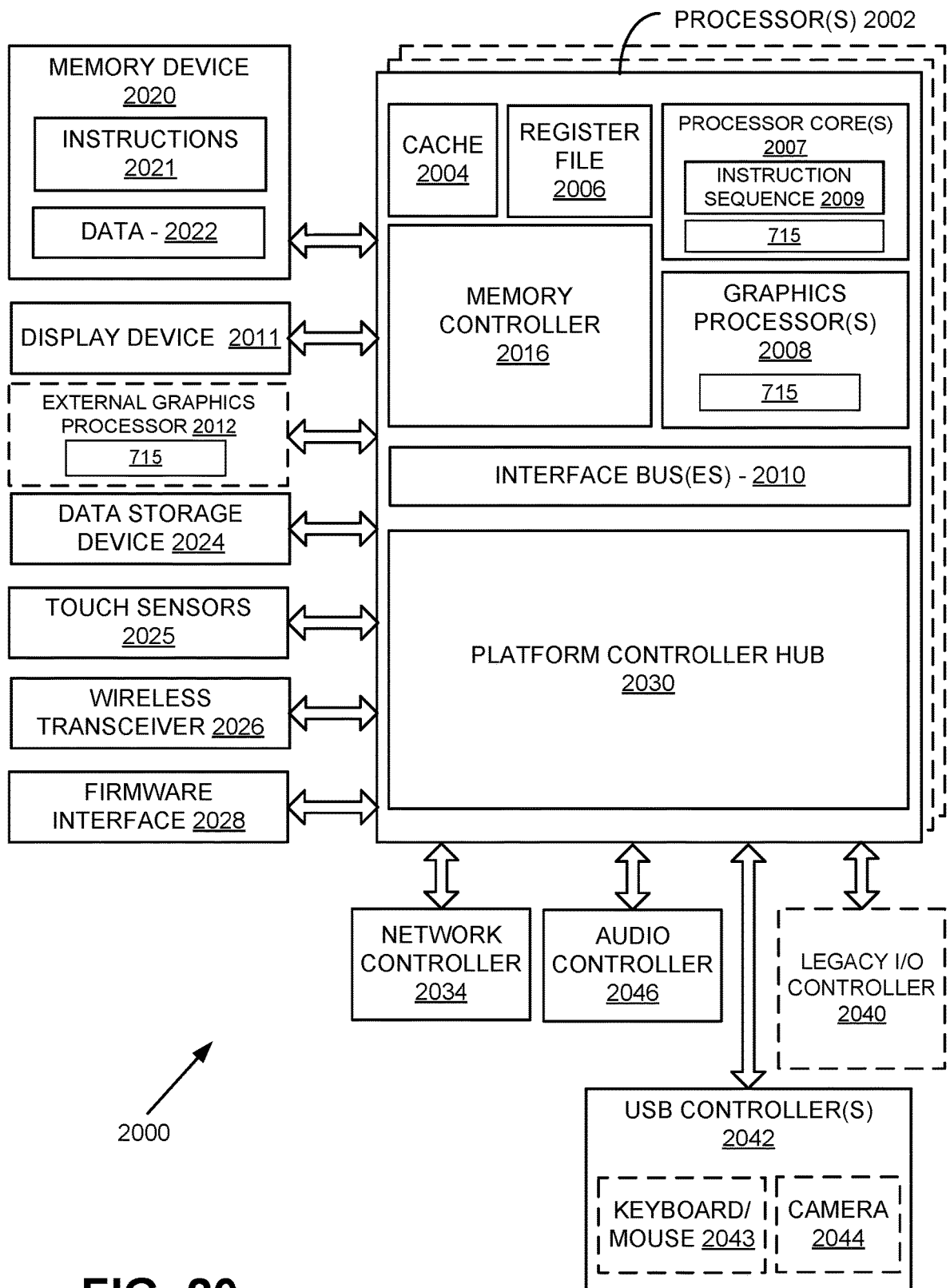
FIG. 20 illustrates at least portions of a graphics processor, according to one or more embodiments.

FIG. 20 is a block diagram of a processing system, according to at least one embodiment. In at least one embodiment, system 2000 includes one or more processors 2002 and one or more graphics processors 2008, and may be a single processor desktop system, a multiprocessor workstation system, or a server system having a large number of processors 2002 or processor cores 2007. In at least one embodiment, system 2000 is a processing platform incorporated within a system-on-a-chip (SoC) integrated circuit for use in mobile, handheld, or embedded devices. In at least one embodiment, one or more graphics processors 2008 include one or more graphics cores 1500.

In at least one embodiment, system 2000 can include, or be incorporated within a server-based gaming platform, a game console, including a game and media console, a mobile gaming console, a handheld game console, or an online game console. In at least one embodiment, system 2000 is a mobile phone, a smart phone, a tablet computing device or a mobile Internet device. In at least one embodiment, processing system 2000 can also include, couple with, or be integrated within a wearable device, such as a smart watch wearable device, a smart eyewear device, an augmented reality device, or a virtual reality device. In at least one embodiment, processing system 2000 is a television or set top box device having one or more processors 2002 and a graphical interface generated by one or more graphics processors 2008.

In at least one embodiment, one or more processors 2002 each include one or more processor cores 2007 to process instructions which, when executed, perform operations for system and user software. In at least one embodiment, each of one or more processor cores 2007 is configured to process a specific instruction sequence 2009. In at least one embodiment, instruction sequence 2009 may facilitate Complex Instruction Set Computing (CISC), Reduced Instruction Set Computing (RISC), or computing via a Very Long Instruction Word (VLIW). In at least one embodiment, processor cores 2007 may each process a different instruction sequence 2009, which may include instructions to facilitate emulation of other instruction sequences. In at least one embodiment, processor core 2007 may also include other processing devices, such a Digital Signal Processor (DSP).

In at least one embodiment, processor 2002 includes a cache memory 2004. In at least one embodiment, processor 2002 can have a single internal cache or multiple levels of internal cache. In at least one embodiment, cache memory is shared among various components of processor 2002. In at least one embodiment, processor 2002 also uses an external cache (e.g., a Level-3 (L3) cache or Last Level Cache (LLC)) (not shown), which may be shared among processor cores 2007 using known cache coherency techniques. In at least one embodiment, a register file 2006 is additionally included in processor 2002, which may include different types of registers for storing different types of data (e.g., integer registers, floating point registers, status registers, and an instruction pointer register). In at least one embodiment, register file 2006 may include general-purpose registers or other registers.

In at least one embodiment, one or more processor(s) 2002 are coupled with one or more interface bus(es) 2010 to transmit communication signals such as address, data, or control signals between processor 2002 and other components in system 2000. In at least one embodiment, interface bus 2010 can be a processor bus, such as a version of a Direct Media Interface (DMI) bus. In at least one embodiment, interface bus 2010 is not limited to a DMI bus, and may include one or more Peripheral Component Interconnect buses (e.g., PCI, PCI Express), memory busses, or other types of interface busses. In at least one embodiment processor(s) 2002 include an integrated memory controller 2016 and a platform controller hub 2030. In at least one embodiment, memory controller 2016 facilitates communication between a memory device and other components of system 2000, while platform controller hub (PCH) 2030 provides connections to I/O devices via a local I/O bus.

In at least one embodiment, a memory device 2020 can be a dynamic random access memory (DRAM) device, a static random access memory (SRAM) device, flash memory device, phase-change memory device, or some other memory device having suitable performance to serve as process memory. In at least one embodiment, memory device 2020 can operate as system memory for system 2000, to store data 2022 and instructions 2021 for use when one or more processors 2002 executes an application or process. In at least one embodiment, memory controller 2016 also couples with an optional external graphics processor 2012, which may communicate with one or more graphics processors 2008 in processors 2002 to perform graphics and media operations. In at least one embodiment, a display device 2011 can connect to processor(s) 2002. In at least one embodiment, display device 2011 can include one or more of an internal display device, as in a mobile electronic device or a laptop device, or an external display device attached via a display interface (e.g., DisplayPort, etc.). In at least one embodiment, display device 2011 can include a head mounted display (HMD) such as a stereoscopic display device for use in virtual reality (VR) applications or augmented reality (AR) applications.

In at least one embodiment, platform controller hub 2030 enables peripherals to connect to memory device 2020 and processor 2002 via a high-speed I/O bus. In at least one embodiment, I/O peripherals include, but are not limited to, an audio controller 2046, a network controller 2034, a firmware interface 2028, a wireless transceiver 2026, touch sensors 2025, a data storage device 2024 (e.g., hard disk drive, flash memory, etc.). In at least one embodiment, data storage device 2024 can connect via a storage interface (e.g., SATA) or via a peripheral bus, such as a Peripheral Component Interconnect bus (e.g., PCI, PCI Express). In at least one embodiment, touch sensors 2025 can include touch screen sensors, pressure sensors, or fingerprint sensors. In at least one embodiment, wireless transceiver 2026 can be a Wi-Fi transceiver, a Bluetooth transceiver, or a mobile network transceiver such as a 3G, 4G, or Long Term Evolution (LTE) transceiver. In at least one embodiment, firmware interface 2028 enables communication with system firmware, and can be, for example, a unified extensible firmware interface (UEFI). In at least one embodiment, network controller 2034 can enable a network connection to a wired network. In at least one embodiment, a high-performance network controller (not shown) couples with interface bus 2010. In at least one embodiment, audio controller 2046 is a multi-channel high definition audio controller. In at least one embodiment, system 2000 includes an optional legacy I/O controller 2040 for coupling legacy (e.g., Personal System 2 (PS/2)) devices to system 2000. In at least one embodiment, platform controller hub 2030 can also connect to one or more Universal Serial Bus (USB) controllers 2042 connect input devices, such as keyboard and mouse 2043 combinations, a camera 2044, or other USB input devices.

In at least one embodiment, an instance of memory controller 2016 and platform controller hub 2030 may be integrated into a discreet external graphics processor, such as external graphics processor 2012. In at least one embodiment, platform controller hub 2030 and/or memory controller 2016 may be external to one or more processor(s) 2002. For example, in at least one embodiment, system 2000 can include an external memory controller 2016 and platform controller hub 2030, which may be configured as a memory controller hub and peripheral controller hub within a system chipset that is in communication with processor(s) 2002.

Inference and/or training logic 715 are used to perform inferencing and/or training operations associated with one or more embodiments. In at least one embodiment portions or all of inference and/or training logic 715 may be incorporated into graphics processor 2008. For example, in at least one embodiment, training and/or inferencing techniques described herein may use one or more of ALUs embodied in a 3D pipeline. In at least one embodiment, weight parameters may be stored in on-chip or off-chip memory and/or registers (shown or not shown) that configure ALUs of graphics processor 2008 to perform one or more machine learning algorithms, neural network architectures, use cases, or training techniques described herein. Embodiments presented herein can allow for single cell architecture functionality to be added to existing hardware devices in a communications network deployment.

Figure 21:
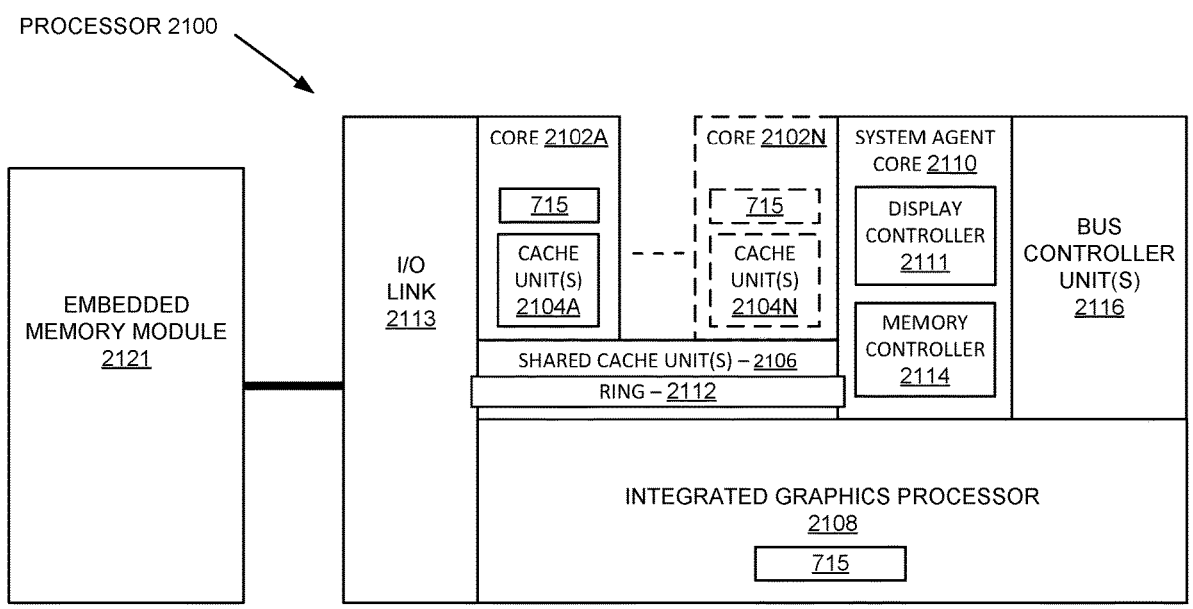
FIG. 21 illustrates at least portions of a graphics processor, according to one or more embodiments.

FIG. 21 is a block diagram of a processor 2100 having one or more processor cores 2102A-2102N, an integrated memory controller 2114, and an integrated graphics processor 2108, according to at least one embodiment. In at least one embodiment, processor 2100 can include additional cores up to and including additional core 2102N represented by dashed lined boxes. In at least one embodiment, each of processor cores 2102A-2102N includes one or more internal cache units 2104A-2104N. In at least one embodiment, each processor core also has access to one or more shared cached units 2106. In at least one embodiment, graphics processor 2108 includes one or more graphics cores 1500.

In at least one embodiment, internal cache units 2104A-2104N and shared cache units 2106 represent a cache memory hierarchy within processor 2100. In at least one embodiment, cache memory units 2104A-2104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 2106 and 2104A-2104N.

In at least one embodiment, processor 2100 may also include a set of one or more bus controller units 2116 and a system agent core 2110. In at least one embodiment, bus controller units 2116 manage a set of peripheral buses, such as one or more PCI or PCI express busses. In at least one embodiment, system agent core 2110 provides management functionality for various processor components. In at least one embodiment, system agent core 2110 includes one or more integrated memory controllers 2114 to manage access to various external memory devices (not shown).

In at least one embodiment, one or more of processor cores 2102A-2102N include support for simultaneous multi-threading. In at least one embodiment, system agent core 2110 includes components for coordinating and operating cores 2102A-2102N during multi-threaded processing. In at least one embodiment, system agent core 2110 may additionally include a power control unit (PCU), which includes logic and components to regulate one or more power states of processor cores 2102A-2102N and graphics processor 2108.

In at least one embodiment, processor 2100 additionally includes graphics processor 2108 to execute graphics processing operations. In at least one embodiment, graphics processor 2108 couples with shared cache units 2106, and system agent core 2110, including one or more integrated memory controllers 2114. In at least one embodiment, system agent core 2110 also includes a display controller 2111 to drive graphics processor output to one or more coupled displays. In at least one embodiment, display controller 2111 may also be a separate module coupled with graphics processor 2108 via at least one interconnect, or may be integrated within graphics processor 2108.

In at least one embodiment, a ring-based interconnect unit 2112 is used to couple internal components of processor 2100. In at least one embodiment, an alternative interconnect unit may be used, such as a point-to-point interconnect, a switched interconnect, or other techniques. In at least one embodiment, graphics processor 2108 couples with ring interconnect 2112 via an I/O link 2113.

In at least one embodiment, I/O link 2113 represents at least one of multiple varieties of I/O interconnects, including an on package I/O interconnect which facilitates communication between various processor components and a high-performance embedded memory module 2118, such as an eDRAM module. In at least one embodiment, each of processor cores 2102A-2102N and graphics processor 2108 use embedded memory module 2118 as a shared Last Level Cache.

In at least one embodiment, processor cores 2102A-2102N are homogeneous cores executing a common instruction set architecture. In at least one embodiment, processor cores 2102A-2102N are heterogeneous in terms of instruction set architecture (ISA), where one or more of processor cores 2102A-2102N execute a common instruction set, while one or more other cores of processor cores 2102A-2102N executes a subset of a common instruction set or a different instruction set. In at least one embodiment, processor cores 2102A-2102N are heterogeneous in terms of microarchitecture, where one or more cores having a relatively higher power consumption couple with one or more power cores having a lower power consumption. In at least one embodiment, processor 2100 can be implemented on one or more chips or as an SoC integrated circuit.

Inference and/or training logic 715 are used to perform inferencing and/or training operations associated with one or more embodiments. In at least one embodiment portions or all of inference and/or training logic 715 may be incorporated into graphics processor 2108. For example, in at least one embodiment, training and/or inferencing techniques described herein may use one or more of ALUs embodied in a 3D pipeline, graphics core(s) 2102, shared function logic, or other logic in FIG. 21. In at least one embodiment, weight parameters may be stored in on-chip or off-chip memory and/or registers (shown or not shown) that configure ALUs of processor 2100 to perform one or more machine learning algorithms, neural network architectures, use cases, or training techniques described herein.

Embodiments presented herein can allow for single cell architecture functionality to be added to existing hardware devices in a communications network deployment.

Figure 22:
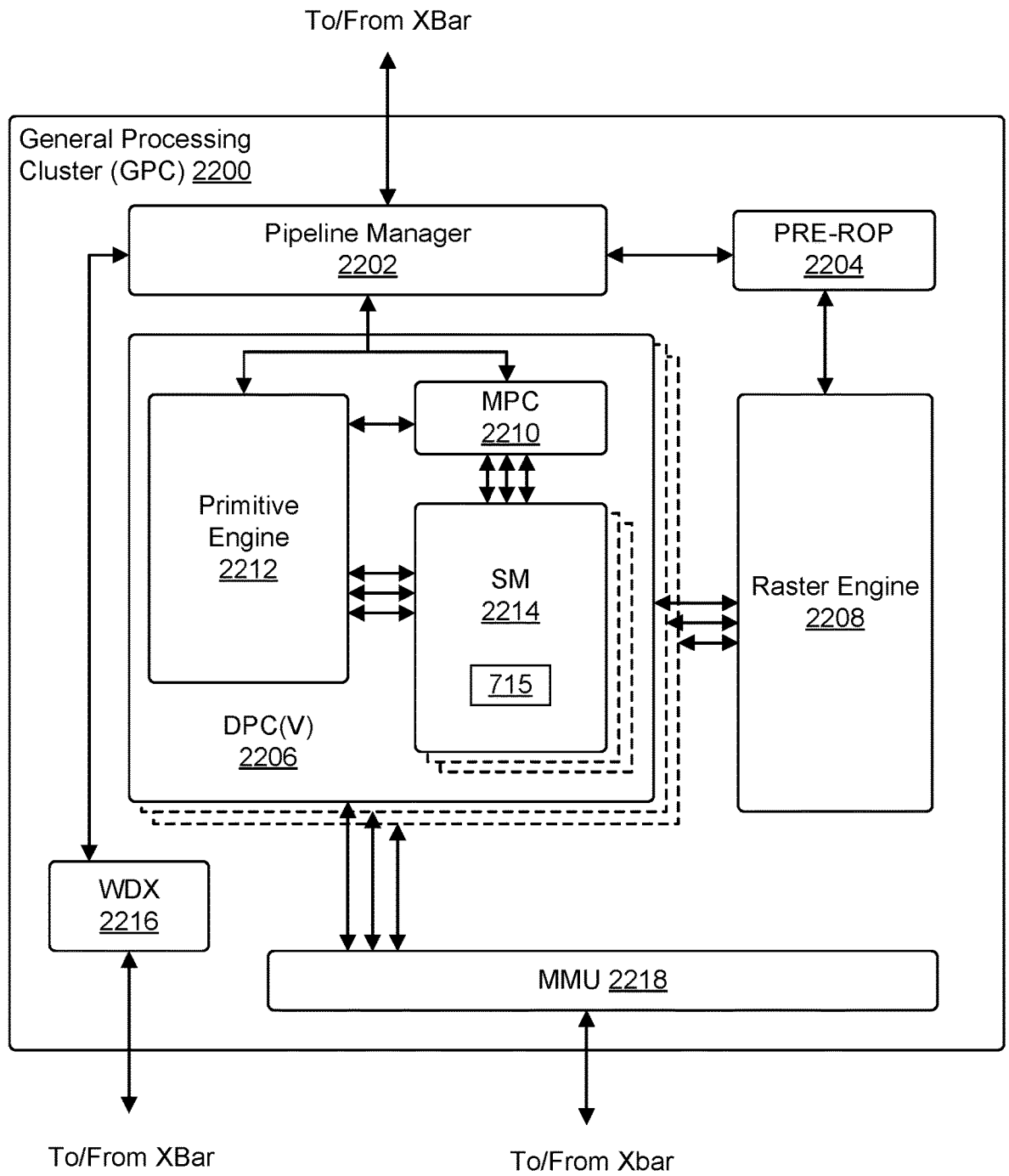
FIG. 22 illustrates a general processing cluster ("GPC"), according to at least one embodiment.

FIG. 22 illustrates a general processing cluster ("GPC") 2200, according to at least one embodiment. In at least one embodiment, each GPC 2200 includes, without limitation, a number of hardware units for processing tasks and each GPC 2200 includes, without limitation, a pipeline manager 2202, a pre-raster operations unit ("preROP") 2204, a raster engine 2208, a work distribution crossbar ("WDX") 2216, a memory management unit ("MMU") 2218, one or more Data Processing Clusters ("DPCs") 2206, and any suitable combination of parts.

In at least one embodiment, operation of GPC 2200 is controlled by pipeline manager 2202. In at least one embodiment, pipeline manager 2202 manages configuration of one or more DPCs 2206 for processing tasks allocated to GPC 2200. In at least one embodiment, pipeline manager 2202 configures at least one of one or more DPCs 2206 to implement at least a portion of a graphics rendering pipeline. In at least one embodiment, DPC 2206 is configured to execute a vertex shader program on a programmable streaming multi-processor ("SM") 2214. In at least one embodiment, pipeline manager 2202 is configured to route packets received from a work distribution unit to appropriate logical units within GPC 2200, in at least one embodiment, and some packets may be routed to fixed function hardware units in preROP 2204 and/or raster engine 2208 while other packets may be routed to DPCs 2206 for processing by a primitive engine 2212 or SM 2214. In at least one embodiment, pipeline manager 2202 configures at least one of DPCs 2206 to implement a neural network model and/or a computing pipeline.

In at least one embodiment, preROP unit 2204 is configured, in at least one embodiment, to route data generated by raster engine 2208 and DPCs 2206 to a Raster Operations ("ROP") unit in partition unit 2122, described in more detail above in conjunction with FIG. 21. In at least one embodiment, preROP unit 2204 is configured to perform optimizations for color blending, organize pixel data, perform address translations, and more. In at least one embodiment, raster engine 2208 includes, without limitation, a number of fixed function hardware units configured to perform various raster operations, in at least one embodiment, and raster engine 2208 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to a coarse raster engine to generate coverage information (e.g., an x, y coverage mask for a tile) for primitive; output of a coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, an output of raster engine 2208 comprises fragments to be processed by any suitable entity, such as by a fragment shader implemented within DPC 2206.

In at least one embodiment, each DPC 2206 included in GPC 2200 comprises, without limitation, an M-Pipe Controller ("MPC") 2210; primitive engine 2212; one or more SMs 2214; and any suitable combination thereof. In at least one embodiment, MPC 2210 controls operation of DPC 2206, routing packets received from pipeline manager 2202 to appropriate units in DPC 2206. In at least one embodiment, packets associated with a vertex are routed to primitive engine 2212, which is configured to fetch vertex attributes associated with a vertex from memory; in contrast, packets associated with a shader program may be transmitted to SM 2214.

In at least one embodiment, SM 2214 comprises, without limitation, a programmable streaming processor that is configured to process tasks represented by a number of threads. In at least one embodiment, SM 2214 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp, wavefront, wave) is configured to process a different set of data based on same set of instructions. In at least one embodiment, all threads in group of threads execute a common set of instructions. In at least one embodiment, SM 2214 implements a Single-Instruction, Multiple Thread ("SIMT") architecture wherein each thread in a group of threads is configured to process a different set of data based on that common set of instructions, but where individual threads in a group of threads are allowed to diverge during execution. In at least one embodiment, a program counter, call stack, and execution state is maintained for each warp (which may be referred to as wavefronts and/or waves), enabling concurrency between warps and serial execution within warps when threads within a warp diverge. In another embodiment, a program counter, call stack, and execution state is maintained for each individual thread, enabling equal concurrency between all threads, within and between warps. In at least one embodiment, execution state is maintained for each individual thread and threads executing common instructions may be converged and executed in parallel for better efficiency. At least one embodiment of SM 2214 is described in more detail herein.

In at least one embodiment, MMU 2218 provides an interface between GPC 2200 and a memory partition unit (e.g., partition unit 2122 of FIG. 21) and MMU 2218 provides translation of virtual addresses into physical addresses, memory protection, and arbitration of memory requests. In at least one embodiment, MMU 2218 provides one or more translation lookaside buffers ("TLBs") for performing translation of virtual addresses into physical addresses in memory.

Inference and/or training logic 715 are used to perform inferencing and/or training operations associated with one or more embodiments. In at least one embodiment, deep learning application processor is used to train a machine learning model, such as a neural network, to predict or infer information provided to GPC 2200. In at least one embodiment, GPC 2200 is used to infer or predict information based on a trained machine learning model (e.g., neural network) that has been trained by another processor or system or by GPC 2200. In at least one embodiment, GPC 2200 may be used to perform one or more neural network use cases described herein.

Embodiments presented herein can allow for single cell architecture functionality to be added to existing hardware devices in a communications network deployment.

Figure 23:
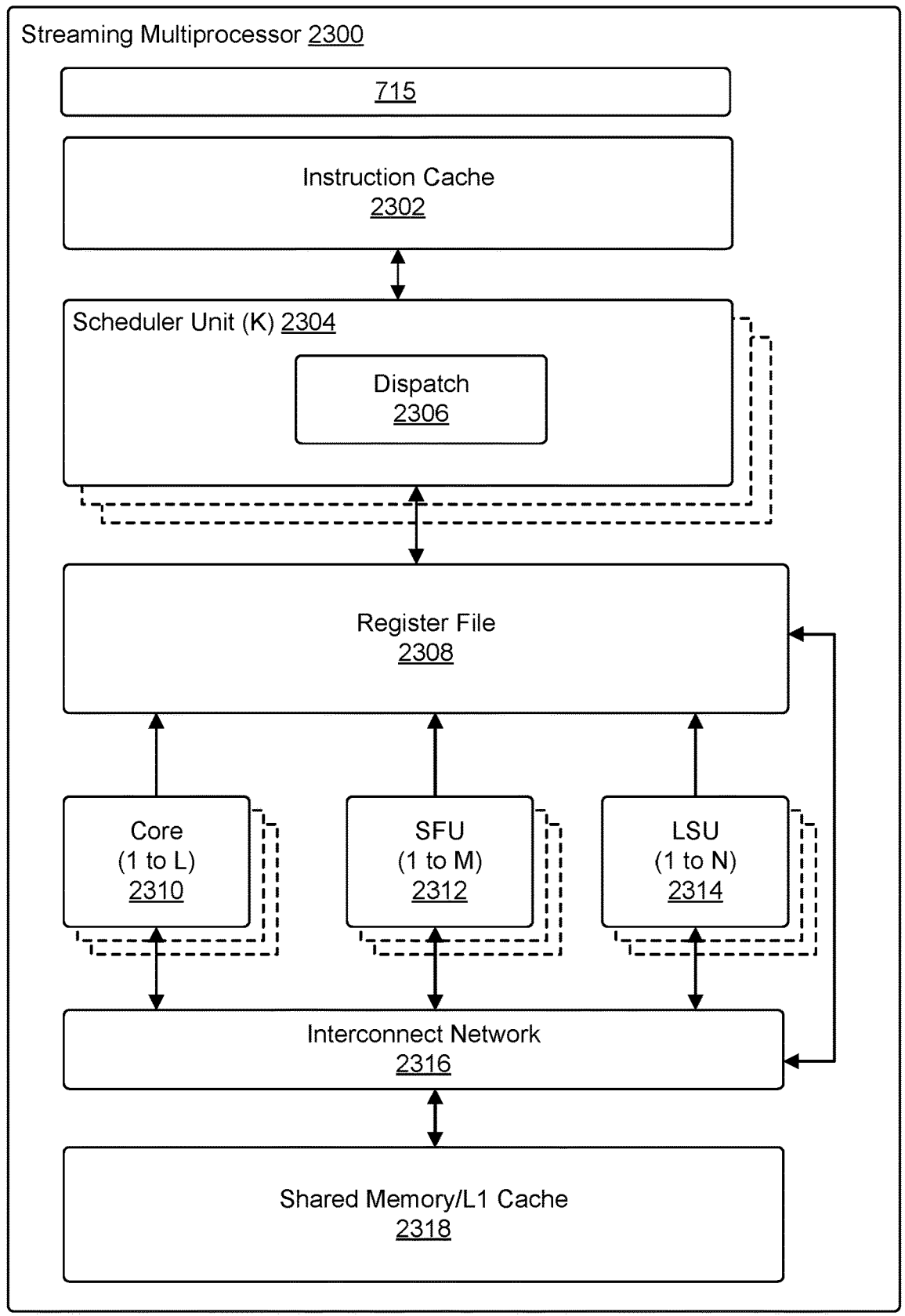
FIG. 23 illustrates a streaming multi-processor, according to at least one embodiment.

FIG. 23 illustrates a streaming multi-processor ("SM") 2300, according to at least one embodiment. In at least one embodiment, SM 2300 is SM of FIG. 22. In at least one embodiment, SM 2300 includes, without limitation, an instruction cache 2302, one or more scheduler units 2304 (which may be referred to as sequencer units), a register file 2308, one or more processing cores ("cores") 2310, one or more special function units ("SFUs") 2312, one or more load/store units ("LSUs") 2314, an interconnect network 2316, a shared memory/level one ("L1") cache 2318, and/or any suitable combination thereof. In at least one embodiment, LSUs 2314 perform load of store operations corresponding to loading/storing data (e.g., instructions) to perform an operation (e.g., perform an API, an API call).

In at least one embodiment, a work distribution unit dispatches tasks for execution on general processing clusters ("GPCs") of parallel processing units ("PPUs") and each task is allocated to a particular Data Processing Cluster ("DPC") within a GPC and, if a task is associated with a shader program, that task is allocated to one of SMs 2300 (which may be referred to as CUs and/or slices). In at least one embodiment, scheduler unit 2304 (which may be referred to as a sequencer and/or asynchronous compute engine) receives tasks from a work distribution unit and manages instruction scheduling for one or more thread blocks assigned to SM 2300. In at least one embodiment, scheduler unit 2304 schedules thread blocks for execution as warps (which may be referred to as wavefronts and/or waves) of parallel threads, wherein each thread block is allocated at least one warp. In at least one embodiment, each warp executes threads. In at least one embodiment, scheduler unit 2304 manages a plurality of different thread blocks, allocating warps to different thread blocks and then dispatching instructions from plurality of different cooperative groups to various functional units (e.g., processing cores 2310, SFUs 2312, and LSUs 2314) during each clock cycle.

In at least one embodiment, Cooperative Groups (which may also be referred to as wavefronts and/or waves) may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. In at least one embodiment, that programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 2306 is configured to transmit instructions to one or more functional units and scheduler unit 2304 and includes, without limitation, two dispatch units 2306 that enable two different instructions from a common warp to be dispatched during each clock cycle. In at least one embodiment, each scheduler unit 2304 includes a single dispatch unit 2306 or additional dispatch units 2306.

In at least one embodiment, each SM 2300 (which may be referred to as a CU and/or slice), in at least one embodiment, includes, without limitation, register file 2308 that provides a set of registers for functional units of SM 2300. In at least one embodiment, register file 2308 is divided between each functional unit such that each functional unit is allocated a dedicated portion of register file 2308. In at least one embodiment, register file 2308 is divided between different warps being executed by SM 2300 and register file 2308 provides temporary storage for operands connected to data paths of functional units. In at least one embodiment, each SM 2300 comprises, without limitation, a plurality of L processing cores 2310, where L is a positive integer. In at least one embodiment, SM 2300 includes, without limitation, a large number (e.g., 128 or more) of distinct processing cores 2310. In at least one embodiment, each processing core 2310 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 2310 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 2310. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation, D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA 9 C++ API, exposes specialized matrix load, matrix multiply and accumulate, and matrix store operations to efficiently use tensor cores from a CUDA-C++ program. In at least one embodiment, at a CUDA level, a warp-level interface assumes 16×16 size matrices spanning all 32 threads of warp (which may be referred to as a wavefront and/or wave).

In at least one embodiment, each SM 2300 comprises, without limitation, M SFUs 2312 that perform special functions (e.g., attribute evaluation, reciprocal square root, and like). In at least one embodiment, SFUs 2312 include, without limitation, a tree traversal unit configured to traverse a hierarchical tree data structure. In at least one embodiment, SFUs 2312 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 2300. In at least one embodiment, texture maps are stored in shared memory/L1 cache 2318. In at least one embodiment, texture units implement texture operations such as filtering operations using mip-maps (e.g., texture maps of varying levels of detail), in accordance with at least one embodiment. In at least one embodiment, each SM 2300 includes, without limitation, two texture units.

Each SM 2300 comprises, without limitation, N LSUs 2314 that implement load and store operations between shared memory/L1 cache 2318 and register file 2308, in at least one embodiment. Interconnect network 2316 connects each functional unit to register file 2308 and LSU 2314 to register file 2308 and shared memory/L1 cache 2318 in at least one embodiment. In at least one embodiment, interconnect network 2316 is a crossbar that can be configured to connect any functional units to any registers in register file 2308 and connect LSUs 2314 to register file 2308 and memory locations in shared memory/L1 cache 2318.

In at least one embodiment, shared memory/L1 cache 2318 is an array of on-chip memory that allows for data storage and communication between SM 2300 and primitive engine and between threads in SM 2300, in at least one embodiment. In at least one embodiment, shared memory/L1 cache 2318 comprises, without limitation, 128 KB of storage capacity and is in a path from SM 2300 to a partition unit. In at least one embodiment, shared memory/L1 cache 2318, in at least one embodiment, is used to cache reads and writes. In at least one embodiment, one or more of shared memory/L1 cache 2318, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of a capacity, and texture and load/store operations can use remaining capacity. Integration within shared memory/L1 cache 2318 enables shared memory/L1 cache 2318 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In a general purpose parallel computation configuration, a work distribution unit assigns and distributes blocks of threads directly to DPCs, in at least one embodiment. In at least one embodiment, threads in a block execute a common program, using a unique thread ID in calculation to ensure each thread generates unique results, using SM 2300 to execute program and perform calculations, shared memory/L1 cache 2318 to communicate between threads, and LSU 2314 to read and write global memory through shared memory/L1 cache 2318 and memory partition unit. In at least one embodiment, when configured for general purpose parallel computation, SM 2300 writes commands that scheduler unit 2304 can use to launch new work on DPCs.

In at least one embodiment, a PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In at least one embodiment, a PPU is embodied on a single semiconductor substrate. In at least one embodiment, a PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, a PPU may be included on a graphics card that includes one or more memory devices. In at least one embodiment, that graphics card may be configured to interface with a PCIe slot on a motherboard of a desktop computer. In at least one embodiment, that PPU may be an integrated graphics processing unit ("iGPU") included in chipset of a motherboard.

Inference and/or training logic 715 are used to perform inferencing and/or training operations associated with one or more embodiments. In at least one embodiment, deep learning application processor is used to train a machine learning model, such as a neural network, to predict or infer information provided to SM 2300. In at least one embodiment, SM 2300 is used to infer or predict information based on a trained machine learning model (e.g., neural network) that has been trained by another processor or system or by SM 2300. In at least one embodiment, SM 2300 may be used to perform one or more neural network use cases described herein.

Embodiments presented herein can allow for single cell architecture functionality to be added to existing hardware devices in a communications network deployment.

At least one embodiment of the disclosure can be described in view of the following clauses:

1. A method, comprising:
   receiving, to at least two radio units of a wireless communication cell, data transmitted from a client device;
   causing separate instances of the data to be transmitted from the two radio units to a hardware component to perform channel estimation for the separate instances, the channel estimation to identify one or more differences between the separate instances of the data before combining the data from the separate instances into a single instance of the data; and
   transmitting the single instance of the data to a base station.

2. The method of claim 1, wherein the wireless communication cell corresponds to a single cell network deployment architecture including a plurality of radio units at different physical locations.

3. The method of claim 1, further comprising:
   decompressing the separate instances of the data before performing channel estimation for the separate instances.

4. The method of claim 1, further comprising:
   receiving, from the base station to the hardware component, second data to be transmitted to the client device using the at least two radio units; and
   copying, in the hardware component, the second data into separate instances to be transmitted, separately, to the at least two radio units for transmission to the client device.

5. The method of claim 1, wherein the hardware component is a network switch to transmit the data between a plurality of radio units and the base station.

6. The method of claim 1, wherein the hardware component is a controller (NIC) installed in the base station.

7. The method of claim 1, wherein the one or more differences identified by performing the channel estimation include a difference in phase or a difference in phase and amplitude of received signals for the separate instances of the data.

8. The method of claim 1, wherein the wireless communication cell supports 5G communication using an O-RAN interface standard.

9. The method of claim 1, wherein the hardware component is further to read a job descriptor from a work queue and perform manipulation of the data to be transmitted based, at least in part, upon the job descriptor.

10. A system, comprising:
    two or more radio units in a communication cell to transmit data with respect to a client device associated with the communication cell;
    a base station; and
    a hardware component to transmit the data between the base station and the two or more radio units, the hardware component to perform channel estimation and combination of separate instances of the data, received from the client device by the two or more radio units, into a single instance to be transmitted to the base station.

11. The system of claim 10, wherein the wireless communication cell corresponds to a single cell network deployment architecture including a plurality of radio units.

12. The system of claim 10, wherein the hardware component is further to copy second data, received to the base station, into separate transmissions to be separately transmitted by the two or more radio units to the client device.

13. The system of claim 10, wherein the hardware component is a network switch, a data processing unit (DPU), or a network interface controller (NIC).

14. The system of claim 10, wherein the hardware component is further to decompress the separate instances of the data before performing channel estimation for the separate instances.

15. The system of claim 10, wherein the one or more differences identified by performing the channel estimation include a difference in phase or a difference in phase and amplitude of received signals for the separate instances of the data.

16. A telecommunication device, comprising:
    one or more processing units to perform channel estimation for separate instances of data from a client device that are received from two radio units of a wireless communication cell, the channel estimation to identify one or more differences between the separate instances of the data before combining the data from the separate instances into a single instance of the data, and transmit the single instance of the data to a base station.

17. The telecommunication device of claim 16, wherein the wireless communication cell corresponds to a single cell network deployment architecture including a plurality of radio units.

18. The telecommunication device of claim 16, wherein the one or more processing units are further to copy second data, received to the base station, into separate transmissions to be separately transmitted by the two or more radio units to the client device.

19. The telecommunication device of claim 16, wherein the telecommunication device is a network switch, a data processing unit (DPU), or a network interface controller (NIC).

20. The telecommunication device of claim 16, wherein the telecommunication device is comprised in at least one of:
  a system for performing simulation operations;
  a system for performing simulation operations to test or validate autonomous machine applications;
  a system for rendering graphical output;
  a system for performing deep learning operations;
  a system implemented using an edge device;
  a system for generating or presenting virtual reality (VR) content;
  a system for generating or presenting augmented reality (AR) content;
  a system for generating or presenting mixed reality (MR) content;
  a system incorporating one or more Virtual Machines (VMs);
  a system implemented at least partially in a data center;
  a system for performing hardware testing using simulation;
  a system for synthetic data generation;
  a collaborative content creation platform for 3D assets; or
  a system implemented at least partially using cloud computing resources.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, referring back to FIG. 10, computer programs in form of machine-readable executable code or computer control logic algorithms are stored in main memory 1004 and/or secondary storage. Computer programs, if executed by one or more processors, enable system 1000 to perform various functions in accordance with at least one embodiment. In at least one embodiment, memory 1004, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 1002, parallel processing system 1012, an integrated circuit capable of at least a portion of capabilities of both CPU 1002, parallel processing system 1012, a chipset (e.g., a group of integrated circuits designed to work and sold as a unit for performing related functions, etc.), and/or any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 1000 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 1012 includes, without limitation, a plurality of parallel processing units ("PPUs") 1014 and associated memories 1016. In at least one embodiment, PPUs 1014 are connected to a host processor or other peripheral devices via an interconnect 1018 and a switch 1020 or multiplexer. In at least one embodiment, parallel processing system 1012 distributes computational tasks across PPUs 1014 which can be parallelizable—for example, as part of distribution of computational tasks across multiple graphics processing unit ("GPU") thread blocks. In at least one embodiment, memory is shared and accessible (e.g., for read and/or write access) across some or all of PPUs 1014, although such shared memory may incur performance penalties relative to use of local memory and registers resident to a PPU 1014. In at least one embodiment, operation of PPUs 1014 is synchronized through use of a command such as _syncthreads( ), wherein all threads in a block (e.g., executed across multiple PPUs 1014) to reach a certain point of execution of code before proceeding.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, oneVPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

In at least one embodiment, any application programming interface (API) described herein is compiled into one or more instructions, operations, or any other signal by a compiler, interpreter, or other software tool. In at least one embodiment, compilation comprises generating one or more machine-executable instructions, operations, or other signals from source code. In at least one embodiment, an API compiled into one or more instructions, operations, or other signals, when performed, causes one or more processors such as graphics processors, graphics cores 1500, parallel processor 1700, processor, processor core, or any other logic circuit further described herein to perform one or more computing operations.

It should be noted that, while example embodiments described herein may relate to a CUDA programming model, techniques described herein can be utilized with any suitable programming model, such HIP, oneAPI, and/or variations thereof.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In the scope of this application, the term arithmetic logic unit, or ALU, is used to refer to any computational logic circuit that processes operands to produce a result. For example, in the present document, the term ALU can refer to a floating point unit, a DSP, a tensor core, a shader core, a coprocessor, or a CPU.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method, comprising:
   receiving, to at least two radio units of a wireless communication cell, first data transmitted from a client device;
   causing separate instances of the first data to be transmitted from the two radio units to a hardware component to perform channel estimation for the separate instances, the channel estimation to identify one or more differences between the separate instances of the first data before combining the first data from the separate instances into a single instance of the first data;
   transmitting the single instance of the first data to a base station; and
   copying, in the hardware component, second data received from the base station, into separate instances to be transmitted separately to the at least two radio units for transmission to the client device.

2. The method of claim 1, wherein the wireless communication cell corresponds to a single cell network deployment architecture including a plurality of radio units at different physical locations.

3. The method of claim 1, further comprising:
   decompressing the separate instances of the first data before performing channel estimation for the separate instances.

4. The method of claim 1, further comprising:
   receiving, from the base station to the hardware component, the second data to be transmitted to the client device using the at least two radio units.

5. The method of claim 1, wherein the hardware component is a network switch to transmit the first data between a plurality of radio units and the base station.

6. The method of claim 1, wherein the hardware component is a network interface controller (NIC) installed in the base station.

7. The method of claim 1, wherein the one or more differences identified by performing the channel estimation include a difference in phase or a difference in phase and amplitude of received signals for the separate instances of the first data and the second data.

8. The method of claim 1, wherein the wireless communication cell supports 5G communication using an O-RAN interface standard.

9. The method of claim 1, wherein the hardware component is further to read a job descriptor from a work queue and perform manipulation of the first data to be transmitted based, at least in part, upon the job descriptor.

10. A system, comprising:
    two or more radio units in a communication cell to transmit first data with respect to a client device associated with the communication cell;
    a base station; and
    a hardware component to:
    transmit the first data between the base station and the two or more radio units, the hardware component to perform channel estimation and combination of separate instances of the first data, received from the client device by the two or more radio units, into a single instance to be transmitted to the base station; and copy second data, received from the base station, into separate transmissions to be separately transmitted by the at least two radio units to the client device.

11. The system of claim 10, wherein the wireless communication cell corresponds to a single cell network deployment architecture including a plurality of radio units.

12. The system of claim 10, wherein the hardware component is a network switch, a data processing unit (DPU), or a network interface controller (NIC).

13. The system of claim 10, wherein the hardware component is further to decompress the separate instances of the first data before performing channel estimation for the separate instances.

14. The system of claim 10, wherein the hardware is further to identify one or more differences by performing the channel estimation include a difference in phase or a difference in phase and amplitude of received signals for the separate instances of the first data.

15. A telecommunication device, comprising:
one or more processing units to perform channel estimation for separate instances of first data from a client device that are received from two radio units of a wireless communication cell, the channel estimation to identify one or more differences between the separate instances of the first data before combining the first data from the separate instances into a single instance of the first data, and transmit the single instance of the first data to a base station, and copy second data, received from the base station, into separate transmissions to be separately transmitted by the two radio units to the client device.

16. The telecommunication device of claim 15, wherein the wireless communication cell corresponds to a single cell network deployment architecture including a plurality of radio units.

17. The telecommunication device of claim 15, wherein the telecommunication device is a network switch, a data processing unit (DPU), or a network interface controller (NIC).

18. The telecommunication device of claim 15, wherein the telecommunication device is comprised in at least one of:
a system for performing simulation operations;
a system for performing simulation operations to test or validate autonomous machine applications;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a collaborative content creation platform for 3D assets; or
a system implemented at least partially using cloud computing resources.

19. The telecommunication device of claim 15, wherein the one or more processing units are further to decompress the separate instances of the first data before performing channel estimation for the separate instances of the first data.

20. The telecommunication device of claim 15, wherein the one or more differences identified by performing the channel estimation include a difference in phase or a difference in phase and amplitude of received signals for the separate instances of the first data.

* * * * *